US012529683B2

(12) United States Patent
Jack et al.

(10) Patent No.: US 12,529,683 B2
(45) Date of Patent: Jan. 20, 2026

(54) SYSTEM AND METHOD FOR REAL-TIME VISUALIZATION OF DEFECTS IN A MATERIAL

(71) Applicant: Verifi Technologies, LLC, Waco, TX (US)

(72) Inventors: David A. Jack, Waco, TX (US); William Minnie, Temple, TX (US); Benjamin M. Blandford, Waco, TX (US)

(73) Assignee: BAYLOR UNIVERSITY, Waco, TX (US)

( * ) Notice: Subject to any disclaimer, the term of this patent is extended or adjusted under 35 U.S.C. 154(b) by 275 days.

(21) Appl. No.: 18/196,641

(22) Filed: May 12, 2023

(65) Prior Publication Data

US 2023/0280310 A1     Sep. 7, 2023

Related U.S. Application Data

(63) Continuation-in-part of application No. 17/148,205, filed on Jan. 13, 2021, now Pat. No. 11,650,182, (Continued)

(51) Int. Cl.
*G01N 29/06* (2006.01)
*G01N 29/28* (2006.01)

(52) U.S. Cl.
CPC ......... *G01N 29/0645* (2013.01); *G01N 29/28* (2013.01); *G01N 2291/0231* (2013.01); *G01N 2291/101* (2013.01)

(58) Field of Classification Search
CPC ............... G01N 29/0645; G01N 29/28; G01N 2291/0231; G01N 2291/101;
(Continued)

(56) References Cited

U.S. PATENT DOCUMENTS 3,239,801 A   3/1966   Mcgaughey
4,184,373 A   1/1980   Evans et al.
(Continued)

OTHER PUBLICATIONS

"Full 3D characterisation of composite laminates using ultrasonic analytic signals" by Smith et al. (Year: 2018).*
(Continued)

*Primary Examiner* — Xin Y Zhong
(74) *Attorney, Agent, or Firm* — NEO IP

(57) ABSTRACT

The present disclosure provides a system and method for real-time visualization of a material during ultrasonic non-destructive testing. The system includes a graphical user interface (GUI) capable of showing a three-dimensional (3-D) image of a composite laminate constructed of a series of two-dimensional (2-D) cross sections. The GUI is capable of displaying the 3-D image as each additional 2-D cross section is scanned by an ultrasonic testing apparatus in real time or near real time, including probable defect regions that contain a flaw such as a hole, crack, wrinkle, or foreign object within the composite. Furthermore, in one embodiment, the system includes an artificial intelligence capable of highlighting defect areas within the 3-D image in real time or near real time and providing data regarding each defect area, such as the depth, size, and/or type of each defect.

16 Claims, 41 Drawing Sheets
(15 of 41 Drawing Sheet(s) Filed in Color)

Related U.S. Application Data which is a continuation-in-part of application No. 17/123,970, filed on Dec. 16, 2020, now Pat. No. 11,630,084, which is a continuation-in-part of application No. 17/122,410, filed on Dec. 15, 2020, now Pat. No. 11,726,065, which is a continuation-in-part of application No. 17/108,472, filed on Dec. 1, 2020, now Pat. No. 11,686,707, which is a continuation-in-part of application No. 17/091,774, filed on Nov. 6, 2020, now Pat. No. 11,860,131.

(60) Provisional application No. 63/001,608, filed on Mar. 30, 2020.

(58) Field of Classification Search
CPC ............... G01N 29/226; G01N 29/449; G01N 2291/02827; G01N 2291/044; G01N 29/069; G01N 29/11; G01N 29/348; G01N 29/46; G01N 29/48
See application file for complete search history.

(56) References Cited

U.S. PATENT DOCUMENTS

| | | | |
|---|---|---|---|
| 4,215,583 A | 8/1980 | Botsco et al. | |
| 5,009,104 A | 4/1991 | Johnson | |
| 5,088,327 A | 2/1992 | Gammell | |
| 5,408,882 A | 4/1995 | McKinley et al. | |
| 5,494,038 A | 2/1996 | Wang et al. | |
| 5,631,425 A | 5/1997 | Wang et al. | |
| 6,490,501 B1 | 12/2002 | Saunders | |
| 6,945,111 B2 | 9/2005 | Georgeson | |
| 6,959,602 B2 | 11/2005 | Peterson, Jr. et al. | |
| 7,010,980 B2 | 3/2006 | Meier | |
| 7,017,422 B2 | 3/2006 | Heyman et al. | |
| 7,574,915 B2 | 8/2009 | Kollgaard et al. | |
| 7,895,895 B2 | 3/2011 | Kollgaard et al. | |
| 7,975,549 B2 | 7/2011 | Fetzer et al. | |
| 8,234,924 B2 | 8/2012 | Saxena et al. | |
| 8,265,886 B2 | 9/2012 | Bisiaux et al. | |
| 8,347,723 B2 | 1/2013 | Questo et al. | |
| 8,522,615 B1 | 9/2013 | Brady et al. | |
| 9,121,817 B1 | 9/2015 | Roach et al. | |
| 9,207,639 B2 | 12/2015 | Ratering | |
| 9,297,789 B2 | 3/2016 | Djordjevic et al. | |
| 9,360,418 B2 | 6/2016 | Georgeson | |
| 9,494,562 B2 | 11/2016 | Lin et al. | |
| 10,161,910 B2 | 12/2018 | Niri et al. | |
| 10,302,600 B2 | 5/2019 | Palmer et al. | |
| 10,345,272 B2 | 7/2019 | Holmes et al. | |
| 10,444,195 B2 | 10/2019 | Bingham | |
| 10,605,781 B2 | 3/2020 | Grewal et al. | |
| 10,697,941 B2 | 6/2020 | Jack et al. | |
| 10,761,067 B2 | 9/2020 | Jack et al. | |
| 2003/0089171 A1 | 5/2003 | Kenefick et al. | |
| 2004/0020296 A1 | 2/2004 | Moles et al. | |
| 2004/0031337 A1 | 2/2004 | Masaniello et al. | |
| 2006/0225508 A1 | 10/2006 | Sfeir | |
| 2007/0175282 A1 | 8/2007 | Fetzer et al. | |
| 2007/0258858 A1 | 11/2007 | Rasnow et al. | |
| 2008/0000299 A1 | 1/2008 | Georgeson | |
| 2010/0251822 A1 | 10/2010 | Isobe et al. | |
| 2011/0274369 A1 | 11/2011 | Smith et al. | |
| 2012/0250970 A1 | 10/2012 | Tsubaki et al. | |
| 2013/0031979 A1 | 2/2013 | Bergman | |
| 2013/0228015 A1 | 9/2013 | Wimplinger | |
| 2014/0216158 A1 | 8/2014 | Martin et al. | |
| 2016/0320344 A1 | 11/2016 | Spencer et al. | |
| 2017/0284971 A1 | 10/2017 | Hall | |
| 2017/0299381 A1 | 10/2017 | Bingham | |
| 2018/0101944 A1 | 4/2018 | Sakai et al. | |
| 2018/0120268 A1 | 5/2018 | Georgeson et al. | |
| 2018/0231502 A1 | 8/2018 | Kahmann et al. | |
| 2019/0004013 A1 | 1/2019 | Choi et al. | |
| 2019/0187107 A1 | 6/2019 | Asadollahi et al. | |
| 2019/0257799 A1 | 8/2019 | Palmer et al. | |
| 2019/0277808 A1* | 9/2019 | Grewal | G01N 29/0609 |
| 2019/0293610 A1 | 9/2019 | Campbell et al. | |
| 2020/0047425 A1 | 2/2020 | Jahanbin et al. | |
| 2020/0072796 A1 | 3/2020 | Fiseni et al. | |
| 2020/0173964 A1 | 6/2020 | Hudson et al. | |
| 2020/0230899 A1 | 7/2020 | Tyson | |
| 2020/0232951 A1 | 7/2020 | Fetzer et al. | |
| 2021/0078177 A1 | 3/2021 | Troy et al. | |
| 2021/0128102 A1 | 5/2021 | Negishi | |
| 2021/0302374 A1 | 9/2021 | Jack | |
| 2021/0302375 A1 | 9/2021 | Jack et al. | |
| 2021/0302376 A1 | 9/2021 | Jack et al. | |
| 2021/0302385 A1 | 9/2021 | Jack et al. | |
| 2021/0372969 A1 | 12/2021 | Giurgiutiu et al. | |

OTHER PUBLICATIONS

Beatriz Larrañaga-Valsero, Robert A. Smith, Rostand B. Tayong, Antonio Fernández-López, Alfredo Güemes, Wrinkle measurement in glass-carbon hybrid laminates comparing ultrasonic techniques: A case study, Aug. 15, 2018, Composites Part A: Applied Science and Manufacturing, vol. 114 (Year: 2018).

Nelson Luke, Smith Robert, Fibre Direction and Stacking Sequence Measurement in Carbon Fibre Composites using Radon Transforms of Ultrasonic Data, Mar. 2019, Composites Part A: Applied Science and Manufacturing, vol. 118 (Year: 2018).

* cited by examiner

SYSTEM AND METHOD FOR REAL-TIME VISUALIZATION OF DEFECTS IN A MATERIAL

CROSS-REFERENCES TO RELATED APPLICATIONS

This application relates to and claims priority from the following U.S. Patent Applications. This application is a continuation-in-part of U.S. patent application Ser. No. 17/148,205, filed Jan. 13, 2021, which is a continuation-in-part of U.S. patent application Ser. No. 17/123,970, filed Dec. 16, 2020, which is a continuation-in-part of U.S. patent application Ser. No. 17/122,410, filed Dec. 15, 2020, which is a continuation-in-part of U.S. patent application Ser. No. 17/108,472, filed Dec. 1, 2020, which is a continuation-in-part of U.S. patent application Ser. No. 17/091,774, filed Nov. 6, 2020, which claims priority from U.S. Provisional Patent Application No. 63/001,608, filed Mar. 30, 2020. Each of the above-mentioned applications is incorporated herein by reference in its entirety.

BACKGROUND OF THE INVENTION

1. Field of the Invention

The disclosure relates to the field of non-destructive testing and non-destructive inspection and more specifically to a systems and methods for visualizing defects within a structure during non-destructive testing.

2. Description of Related Art

Non-destructive Testing (NDT), also known as Non-destructive Evaluation (NDE) or Non-destructive Inspection (NDI), has achieved popularity in testing materials and parts of larger machines as the methods do not generally render the material or part unfit for its intended purpose. Traditional methods of NDT include ultrasonic and thermographic techniques, as well as ones based on the use of eddy currents, radiation (including gamma, X-ray, and microwave), magnetic particles, dye penetrants, and more. NDT has traditionally been used to detect surface flaws of a material, detect delamination between different layers of a material, or indicate the presence of other defects within the material.

Prior art patent documents include the following:

U.S. Pat. No. 9,207,639 for Transforming A-scan data samples into a three-dimensional space for facilitating visualization of flaws by inventor Ratering, filed Jan. 24, 2013 and issued Dec. 8, 2015, is directed to visualizing one-dimensional A-scan data samples in a three-dimensional space. Each of the data samples represents ultrasonic signals received from a test material. The data samples are transformed into the three-dimensional space as a geometric shape corresponding to a relative amount of ultrasonic energy reflected back from the test material. The data samples as transformed into the three-dimensional space with the geometric shapes rendered therein can be displayed.

U.S. Pat. No. 8,265,886 for Non-destructive testing, in particular for pipes during manufacture or in the finished state by inventors Bisiaux et al., filed Jun. 25, 2007 and issued Sep. 11, 2012, is directed to A non-destructive testing device for pipes is provided. The device extracts information on defects from signals captured by ultrasound receivers following the selective excitation of ultrasound transmitters according to a selected time rule. The receivers form an arrangement with a selected geometry, coupled in an ultrasound fashion, with relative rotation/translation movement, with the pipe. The device includes a converter that selectively isolates a digital representation of echoes in designated time windows, as a function of the movement, and by extracting an image of defects, a filter which determines presumed defect zones and properties of these, a combiner to prepare working digital inputs from an extract of images of a defect zone, a neural circuit receiving the working inputs, a digital decision and alarm stage working on the basis of the output of the neural circuit, and a sorting and marking robot.

U.S. Pat. No. 9,121,817 for Ultrasonic testing device having an adjustable water column by inventors Roach et al., filed Jul. 9, 2012 and issued Sep. 1, 2015, is directed to an ultrasonic testing device having a variable fluid column height is disclosed. An operator is able to adjust the fluid column height in real time during an inspection to produce optimum ultrasonic focus and separate extraneous, unwanted UT signals from those stemming from the area of interest.

U.S. Pat. No. 10,302,600 for Inspection devices and related systems and methods by inventors Palmer et al., filed Jan. 19, 2016 and issued May 28, 2019, is directed to inspection devices include a nozzle portion having at least one opening and a transducer disposed in a rear chamber of the housing. The housing has at least one fluid channel defined in the housing and extending along at least a portion of the rear chamber. The at least one fluid channel is configured to supply a fluid into a forward chamber of the housing proximate the transducer. Related methods include operating an inspection device.

U.S. Pat. No. 4,215,583 for Apparatus and method for bondtesting by ultrasonic complex impedance plane analysis by inventors Botsco et al., filed Nov. 14, 1978 and issued Aug. 5, 1980, is directed to a non-destructive bond testing apparatus utilizes impedance variation represented by both the phase and amplitude of the signal vector response of a sonic energy generating and receiving probe, which is applied to a laminar, honeycomb or fiber composite structure under test. Typical bonding methods for which this bondtester and method are applicable include adhesive bonding, diffusion bonding, brazing, resistance and impact/friction bonding. A cathode ray tube displays the tip of the vector (as a bright dot) which represents the impedance characteristic affected by the structure under test. A null circuit deletes the response of a non-flawed (or normal) portion of the structure under test so that a flawed (or abnormal) portion of the structure produces an impedance variation from the null point, the variation being represented on a polar coordinate display by the amplitude and angular position of the vector tip, thereby providing diagnostic information regarding the location and type of the bondline condition being detected. Bondline conditions/flaws detectable include, disbonds, adhesive thickness, adhesive porosity, degree of adhesive cure, adhesive (cohesive) strength and forms of in-service adhesive or bondline degradation.

U.S. Pat. No. 4,184,373 for Apparatus for evaluating a bond by inventors Evans et al., filed May 24, 1978 and issued Jan. 22, 1980, is directed to a means and method for evaluating a bond between first and second structures bonded together by an intermediate layer of adhesive. Means are provided for transmitting a pulse of ultrasonic wave energy into the bonded structures whereby a first reflected pulse may be reflected from a first surface of the first structure, a second reflected pulse reflected from the layer of adhesive, and a third pulse possibly reflected from the surface of the second structure adjacent the adhesive layer. Circuit means are provided for sensing the first, second, and third reflected pulses and for providing an indication of the quality of the bond by comparing the amplitudes of the reflected pulses and determining if the ratios lie within predetermined ranges.

U.S. Pat. No. 8,347,723 for Sonic resonator system for testing the adhesive bond strength of composite materials by inventors Questo et al., filed May 21, 2010 and published Jan. 8, 2013, is directed to a sonic resonator system for use in testing the adhesive bond strength of composite materials. Also disclosed herein are a method of calibrating the sonic resonator system to work with a particular composite bond joint, and a method of non-destructive testing the "pass-fail" of the bonded composite bond strength, based on a required bond strength.

US Patent Publication No. 2019/0293610 for Detection of kiss bonds within composite components by inventors Campbell et al., filed Mar. 22, 2019 and issued Sep. 26, 2019, is directed to systems and methods for detecting a kiss bond in a composite component are provided. Using reflected ultrasound data representative of reflected ultrasound energy from the composite component, a first threshold amplitude value between 2% and 5% higher than a predetermined baseline noise amplitude value of expected material noise in the reflected ultrasound energy from the composite component, and a second threshold amplitude value higher than the first threshold amplitude value, one or more occurrences of an amplitude of the reflected ultrasound energy exceeding the threshold amplitude value and less than the second threshold amplitude value are identified. The kiss bond is detected in the composite component based on the identified one or more occurrences of the amplitude of the reflected ultrasound energy.

U.S. Pat. No. 7,574,915 for Simplified impedance plane bondtesting inspection by inventors Kollgaard et al., filed Dec. 28, 2006 and issued Aug. 18, 2009, is directed to an NDI system includes an ultrasonic transducer and an electronic device having an indicator, such as a light source. The electronic device energizes the transducer, receives sinusoidal signals from the transducer, determines impedance-plane coordinates corresponding to quadrature-phase separated components of the sinusoidal signals, and automatically activates the indicator if impedance-plane coordinates exceed a preset threshold. The system may be used in methods of inspecting layered structures such as composite aircraft components and repair patches applied to such structures.

U.S. Pat. No. 8,234,924 for Apparatus and method for damage location and identification in structures by inventors Saxena et al., filed Jul. 16, 2009 and issued Aug. 7, 2012, is directed to an apparatus and method for testing composite structures in which ultrasonic waves are used to detect disbonds in the structures are described. The apparatus comprises a flexible structure carrying acousto-optical transducers such as fiber Bragg gratings. During use, the apparatus is mechanically and conformally coupled to the structure under test.

U.S. Pat. No. 7,017,422 for Bond testing system, method, and apparatus by inventors Heyman et al., filed Apr. 2, 2004 and issued Mar. 28, 2006, is directed to a bond strength tester and method for determining certain bond strength parameters of a bonded component, including a phaselocker, a transducer, a loading device that is capable of applying stress-loads to the bond, a controller for controlling the loading device, a data recording device to acquire data, and a computer device to analyze data calculating certain bond strength parameters.

US Patent Publication No. 2014/0216158 for Air coupled ultrasonic contactless method for non-destructive determination of defects in laminated structure by inventors Martin et al., filed Aug. 9, 2012 and published Aug. 7, 2014, is directed to an air coupled ultrasonic contactless method and an installation for non-destructive determination of defects in laminated structures with a width (W) and a multiplicity of n lamellas with intermediate N−1 bonding plants (B), whereas at least one transmitter (T) in a fixed transmitter distance (WTS) radiates ultrasound beams at multiple positions and at least one receiver (R) in a sensor distance (WSR) is receiving re-radiated ultrasound beams at multiple positions relative to the laminated structure (S). The method images the position and geometry of for example lamination defects and allows for inspection of laminated structure (S) of arbitrary height (H) and length (L), and an individual assessment of specific bonding planes (e.g. B1, B2, B3), as well in situations with constrained access to the faces of the sample parallel to the bonding planes.

U.S. Pat. No. 9,360,418 for Nondestructive inspection using hypersound by inventor Georgeson, filed Jul. 17, 2014 and issued Jun. 7, 2016, is directed to a method and apparatus for inspecting an object. The apparatus comprises a wave generator and a detection system. The wave generator is positioned away from an object. The wave generator emits an ultrasonic wave in a direction towards a location on the object such that the ultrasonic wave encounters a portion of the object. The detection system is positioned at a same side of the object as the wave generator. The detection system detects a feature response of a feature within the portion of the object to the ultrasonic wave encountering the portion of the object.

US Patent Publication No. 2020/0230899 for In-situ monitoring of thermoformable composites by inventor Tyson, filed Feb. 1, 2020 and published Jul. 23, 2020, is directed to a method and system for determining the quality and configuration of a structure that is constructed from a thermoformable material, such as a thermoplastic or thermoset material, and in particular thermoplastic composite tapes, where heat is applied to cure the thermoformable material. The quality of the build is monitored during the construction of the structure by determining the differential heat flux in the material as it cools from its elevated temperature. The system and method also may determine the location of defects in a structure being constructed so that remedial measures may be taken or production operations halted to address the defect. A transient thermal effect is applied to the structure being monitored, such as the thermoformable material being applied, which may be implemented from the applied heating of the thermoformable construction application process or additional heating.

U.S. Pat. No. 9,494,562 for Method and apparatus for defect detection in composite structures by inventors Lin et al., filed May 27, 2011 and issued Nov. 15, 2016, is directed to methods and apparatus for non-destructive testing of a composite structure utilizing sonic or ultrasonic waves. In response to a wideband chirp wave sonic excitation signal transmitted from a probe to the composite structure, a probe signal received is correlated with a library of predetermined probe signals and a graphical representation of defects detected is generated. The graphical representation provides detailed information on defect type, defect location and defect shape. Also contemplated is a probe for non-destructive testing of a composite structure comprising three or more transducers wherein each transducer is separately configurable as a transmitter or as a receiver; and a controller coupled to each of transducer for providing signals thereto and receiving signals therefrom, wherein the signals provided thereto include signals for configuring each transducer as either a transmitter or a receiver, and signals for providing an excitation signal from each transducer which is configured as a transmitter.

U.S. Pat. No. 10,444,195 for Detection of near surface inconsistencies in structures by inventor Bingham, filed May 5, 2016 and issued Oct. 15, 2019, is directed to a method of detecting near surface inconsistencies in a structure is presented. A pulsed laser beam is directed towards the structure. Wide-band ultrasonic signals are formed in the structure when radiation of the pulsed laser beam is absorbed by the structure. The wide-band ultrasonic signals are detected to form data. The data is processed to identify a frequency associated with the near surface inconsistency.

US Patent Publication No. 2019/0187107 for Methods for ultrasonic non-destructive testing using analytical reverse time migration by inventors Asadollahi et al., filed Dec. 17, 2018 and published Jun. 20, 2019, is directed to systems and methods for nondestructive testing using ultrasound transducers, such as dry point contact ("DPC") transducers or other transducers that emit horizontal shear waves, are described. An analytical reverse time migration ("RTM") technique is implemented to generate images from data acquired using the ultrasound transducers.

US Patent Publication No. 2018/0120268 for Wrinkle Characterization and Performance Prediction for Composite Structures by inventors Georgeson et al., filed Oct. 31, 2016 and published May 3, 2018, is directed to methods that provide wrinkle characterization and performance prediction for wrinkled composite structures using automated structural analysis. In accordance with some embodiments, the method combines the use of B-scan ultrasound data, automated optical measurement of wrinkles and geometry of cross-sections, and finite element analysis of wrinkled composite structure to provide the ability to assess the actual significance of a detected wrinkle relative to the intended performance of the structure. The disclosed method uses an ultrasonic inspection system that has been calibrated by correlating ultrasonic B-scan data acquired from reference standards with measurements of optical cross sections (e.g., micrographs) of those reference standards.

U.S. Pat. No. 10,605,781 for Methods for measuring out-of-plane wrinkles in composite laminates by inventors Grewel et al., filed Mar. 9, 2018 and issued Mar. 31, 2020, is directed to methods for measuring out-of-plane wrinkles in composite laminates are described. An example method includes scanning a first side of a composite laminate with an ultrasonic transducer. The method further includes locating an out-of-plane wrinkle of the composite laminate on a B-scan ultrasound image generated in response to the scanning of the first side of the composite laminate. The method further includes associating a first marker with the B-scan ultrasound image, the first marker determined based on a location of a crest of the out-of-plane wrinkle on the B-scan ultrasound image. The method further includes associating a second marker with the B-scan ultrasound image, the second marker determined based on a location of a trough focal point of the out-of-plane wrinkle on the B-scan ultrasound image. The method further includes determining an amplitude of the out-of-plane wrinkle based on a distance between the first marker and the second marker.

U.S. Pat. No. 10,161,910 for Methods of non-destructive testing and ultrasonic inspection of composite materials by inventors Dehghan-Niri et al., filed Jan. 11, 2016 and issued Dec. 25, 2018, is directed to a method of non-destructive testing includes locating an ultrasonic transducer with respect to a component having a visually-inaccessible structure to collect B-scan data from at least one B-scan of the component and to collect C-scan data from at least one C-scan of the component. The method also includes filtering the B-scan data and the C-scan data to remove random noise and coherent noise based on predetermined geometric information about the visually-inaccessible structure to obtain filtered data. The method further includes performing linear signal processing and nonlinear signal processing to determine a damage index for a plurality of voxels representing the visually-inaccessible structure from the filtered B-scan data and the filtered C-scan data to generate a V-scan image. A method of non-destructive testing of a wind turbine blade and an ultrasound system are also disclosed.

U.S. Pat. No. 7,895,895 for Method and apparatus for quantifying porosity in a component by inventors Kollgaard et al., filed Jul. 23, 2007 and issued Mar. 1, 2011, is directed to a computer implemented method, or hardware filtration apparatus, and computer usable program code for measuring porosity in materials. An ultrasonic signal is emitted from a transmitting transducer in an ultrasonic measurement system into a material. A response signal is received at a receiving transducer in the ultrasonic measurement system from the material. The response signal is filtered to pass only frequencies in the response signal within a selected frequency range to form a filtered response signal. A porosity level of the material is identified using the filtered response signal.

U.S. Pat. No. 8,522,615 for Simplified direct-reading porosity measurement apparatus and method by inventors Brady et al., filed Nov. 30, 2010 and issued Sep. 3, 2013, is directed to an apparatus for measuring porosity of a structure includes an ultrasonic transducer device configured to be pressed against a structure, the ultrasonic transducer device being further configured to emit ultrasonic pulses into the structure and detect echo profiles; and an electronic device including: a manager having an interface gate, a back-surface sensing gate and a back surface analysis gate; a pulse generator interfacing with the manager and the ultrasonic transducer device; a data acquisition device interfacing with the ultrasonic transducer device and the manager; and a display having a porosity indicator interfacing with the manager.

U.S. Pat. No. 7,010,980 for Method of determining the porosity of a workpiece by inventor Meier, filed Jun. 28, 2004 and issued Mar. 14, 2006, is directed to the porosity of a workpiece, in particular a workpiece made of a fiber composite material is determined. An ultrasonic signal is injected into the workpiece and an ultrasonic echo signal is received from the workpiece. The variation of the amplitude of the ultrasonic echo signal with respect to the depth is used as a measure of the porosity of the workpiece material at the respective depth.

U.S. Pat. No. 6,959,602 for Ultrasonic detection of porous medium characteristics by inventors Peterson et al., filed Mar. 12, 2003 and issued Nov. 1, 2005, is directed to plate waves are used to determine the presence of defects within a porous medium, such as a membrane. An acoustic wave can be propagated through a porous medium to create a plate wave within the medium. The plate wave creates fast compression waves and slow compression waves within the medium that relate to the material and structural properties of the medium. The fast compression wave provides information about the total porosity of a medium. While the slow compression wave provides information about the presence of defects in the medium or the types of materials that form the medium.

U.S. Pat. No. 9,297,789 for Differential ultrasonic waveguide cure monitoring probe by inventors Djordjevic et al., filed Sep. 20, 2012 and issued Mar. 29, 2016, is directed to a new methodology, testing system designs and concept to enable in situ real time monitoring of the cure process. Apparatus, system, and method for the non-destructive, in situ monitoring of the time dependent curing of advanced materials using one or more differential ultrasonic waveguide cure monitoring probes. A differential ultrasonic waveguide cure monitoring probe in direct contact with the material to be cured and providing in situ monitoring of the cure process to enable assessment of the degree of cure or cure level in a non-cure related signal variances (e.g., temperature) independent calibrated response manner. A differential ultrasonic waveguide cure monitoring probe including a transducer coupled to a waveguide and incorporating correction and calibration methodology to accurately and reproducibly monitor the cure process and enable assessment of cure level via ultrasonic reflection measurements. The amplitude of the corrected interface response signal reflected from the probe-resin interface indicating changes in the modulus of the material during the cure.

U.S. Pat. No. 6,945,111 for System and method for identifying incompletely cured adhesive by inventor Georgeson, filed Sep. 28, 2004 and issued Sep. 20, 2005, is directed to a system for inspecting adhesive in a composite structure, such as for soft or improperly cured regions, includes a transducer and a processing element. The transducer can transmit a signal, such as an ultrasonic signal, into the adhesive such that at least a portion of the ultrasonic signal can propagate through the adhesive, reflect off of an interface between the adhesive and another material, and propagate back through the adhesive. Upon exiting the adhesive, then, the transducer can receive a reflected portion of the ultrasonic signal. Thereafter, the processing element can identify a defect, such as soft or improperly cured regions, in the adhesive upon a relationship of an amplitude of the reflected portion of the reflected ultrasonic signal to a predefined threshold.

U.S. Pat. No. 10,697,941 for Method and system of non-destructive testing for composites by inventors Jack et al., filed Mar. 20, 2013 and issued Jun. 30, 2020, is directed to method and system are disclosed for characterizing and quantifying composite laminate structures. The method and system take a composite laminate of unknown ply stack composition and sequence and determine various information about the individual plies, such as ply stack, orientation, microstructure, and type. The method and system can distinguish between weave types that may exhibit similar planar stiffness behaviors, but would produce different failure mechanisms. Individual ply information may then be used to derive the laminate bulk properties from externally provided constitutive properties of the fiber and matrix, including extensional stiffness, bending-extension coupling stiffness, bending stiffness, and the like. The laminate bulk properties may then be used to generate a probabilistic failure envelope for the composite laminate. This provides the ability to perform non-destructive QA to ensure that individual lamina layup was accomplished according to specifications, and results may be used to identify a numerous laminate properties beyond purely structural.

U.S. Pat. No. 10,345,272 for Automated calibration of non-destructive testing equipment by inventors Holmes et al., filed Jul. 13, 2015 and issued Jul. 9, 2019, is directed to a method for auto-calibrating a non-destructive testing instrument. In accordance with some embodiments, the method comprises: (a) determining a first set of coordinates in a test object coordinate system of the test object, the first coordinates representing a target position on a surface of the test object; (b) storing a calibration file in a memory of the non-destructive testing instrument, the calibration file containing calibration data which is a function of structural data representing a three-dimensional structure of the test object in an area containing the target position; (c) calibrating the non-destructive testing instrument using the calibration data in the calibration file; and (d) interrogating the target position using the calibrated non-destructive testing instrument.

U.S. Pat. No. 5,408,882 for Ultrasonic device and method for non-destructive evaluation of polymer composites by inventors McKinley et al., filed Jul. 21, 1993 and issued Apr. 25, 1995, is directed to an ultrasonic measurement device and a method for a non-destructive evaluation of polymer composites having discontinuous fibers distributed therein. The device has one or a plurality of substantially matched pairs of transducers disposed on wedge shaped focuser and a relay, the focuser and relay each have their impedances substantially matched to that of the polymer composite being analyzed. The device is placed on a surface of the composite with the apexes of the focuser and relay in close contact with the surface. A velocity of a substantially longitudinal ultrasonic wave generated by the first transducer and received by the second transducer after its passage through the composite is determined at several angles of orientations about a center point, and the measured velocities of the ultrasonic wave are processed through a computer having software to determine the physical attributes of the composite, such as weight percentage of fibers present in the composite, Young's modulus, shear modulus and Poisson's ratio of the composite.

U.S. Pat. No. 10,761,067 for Method and system for non-destructive testing of curved composites by inventors Jack et al., filed Sep. 8, 2015 and issued Sep. 1, 2020, is directed to characterizing and quantifying composite laminate structures, including structures with surfaces that are curved in two and three dimensions. The embodiments take a composite laminate of unknown ply stack composition and sequence and determine various information about the individual plies, such as ply stack, orientation, microstructure, and type. The embodiments can distinguish between weave types that may exhibit similar planar stiffness behaviors, but would produce different failure mechanisms. Individual ply information may then be used to derive the laminate bulk properties from externally provided constitutive properties of the fiber and matrix, including extensional stiffness, bending-extension coupling stiffness, bending stiffness, and the like. The laminate bulk properties may then be used to generate a probabilistic failure envelope for the composite laminate. In some embodiments, ply stack type and sequence may also be determined for a curved carbon fiber composite using the disclosed embodiments by adding a rotational stage.

US Patent Publication No. 2020/0047425 for Structural Health Monitoring of Curved Composite Structures Using Ultrasonic Guided Waves by inventors Jahanbin et al., filed Aug. 9, 2018 and published Feb. 13, 2020, is directed to systems and methods for non-destructive inspection of curved composite laminate structures using interface guided waves. In particular, if the curved composite laminate structure has a noodle, then the noodle area may be inspected using interface guided waves. The systems and methods provide a repeatable and reliable nondestructive technique for monitoring the structural health of the noodle area of an adhesively bonded curved composite laminate structure by comparing detection data acquired from an inspected curved composite laminate structure with prediction data derived using a simulated curved composite laminate structure.

U.S. Pat. No. 7,975,549 for Method, apparatus and system for inspecting a workpiece having a curved surface by inventors Fetzer et al., filed Jun. 19, 2007 and issued Jul. 12, 2011, is directed to a non-destructive inspection method, apparatus and system are provided for inspecting a workpiece having a curved surface with at least one predefined radius of curvature. The apparatus, such as an inspection probe, includes a plurality of transducer elements positioned in an arcuate configuration having a predefined radius of curvature and a curved delay line. The curved delay line has an outer arcuate surface having a predefined radius of curvature that matches the predefined radius of curvature of the transducer elements. The curved delay line also has an inner arcuate surface that has at least one predefined radius of curvature that matches the at least one predefined radius of curvature of the curved surface of the workpiece. In addition to the inspection probe, the system includes an excitative source for triggering the transducer elements to emit signals into the workpiece and a computing device to receive the return signals.

SUMMARY OF THE INVENTION

The present invention relates to systems and methods of non-destructive testing using ultrasonic transducers.

It is an object of this invention to provide a system for real-time visualization of defects within a material using ultrasonic non-destructive testing.

In one embodiment, the present invention is directed to a system for non-destructive testing of composite materials, including an ultrasonic transducer in communication with a processor and a display means, wherein the ultrasonic transducer is operable to emit ultrasonic waves into and receive ultrasonic waves from a test object to produce scan data, wherein the test object includes a multiplicity of layers, wherein one or more of the multiplicity of layers includes at least one wrinkle, having an average wavelength, an average amplitude, and an average aspect ratio, wherein the average aspect ratio of at least one wrinkle is less than 0.1, and wherein the processor calculates the aspect ratio, the average amplitude, and/or the average wavelength of the at least one wrinkle.

In another embodiment, the present invention is directed to a system for non-destructive testing of composite materials, including an ultrasonic transducer in communication with a processor and a display means, wherein the ultrasonic transducer is operable to emit ultrasonic waves into and receive ultrasonic waves from a test object to produce scan data, wherein the test object includes a multiplicity of layers, wherein the processor generates a plurality of B-scans for the test object, wherein, based on the plurality of B-scans, the processor determines whether at least one wrinkle exists between any two of the multiplicity of layers, and wherein, if at least one wrinkle exists within the test object, the processor determines an initial depth at which the amplitude of each of the at least one wrinkle exceeds a predetermined threshold amplitude and a final depth at which the amplitude of each of the at least one wrinkle falls below a predetermined amplitude.

In yet another embodiment, the present invention to directed to a system for non-destructive testing of composite materials, including an ultrasonic transducer in communication with a processor and a display means, wherein the ultrasonic transducer is operable to emit ultrasonic waves into and receive ultrasonic waves from a test object to produce scan data, wherein the test object includes a multiplicity of layers, wherein the processor generates a plurality of B-scans for the test object, and wherein the processor generates at least one three-dimensional (3-D) graphical representation of one of the multiplicity of layers having at least one wrinkle based on the plurality of B-scans.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
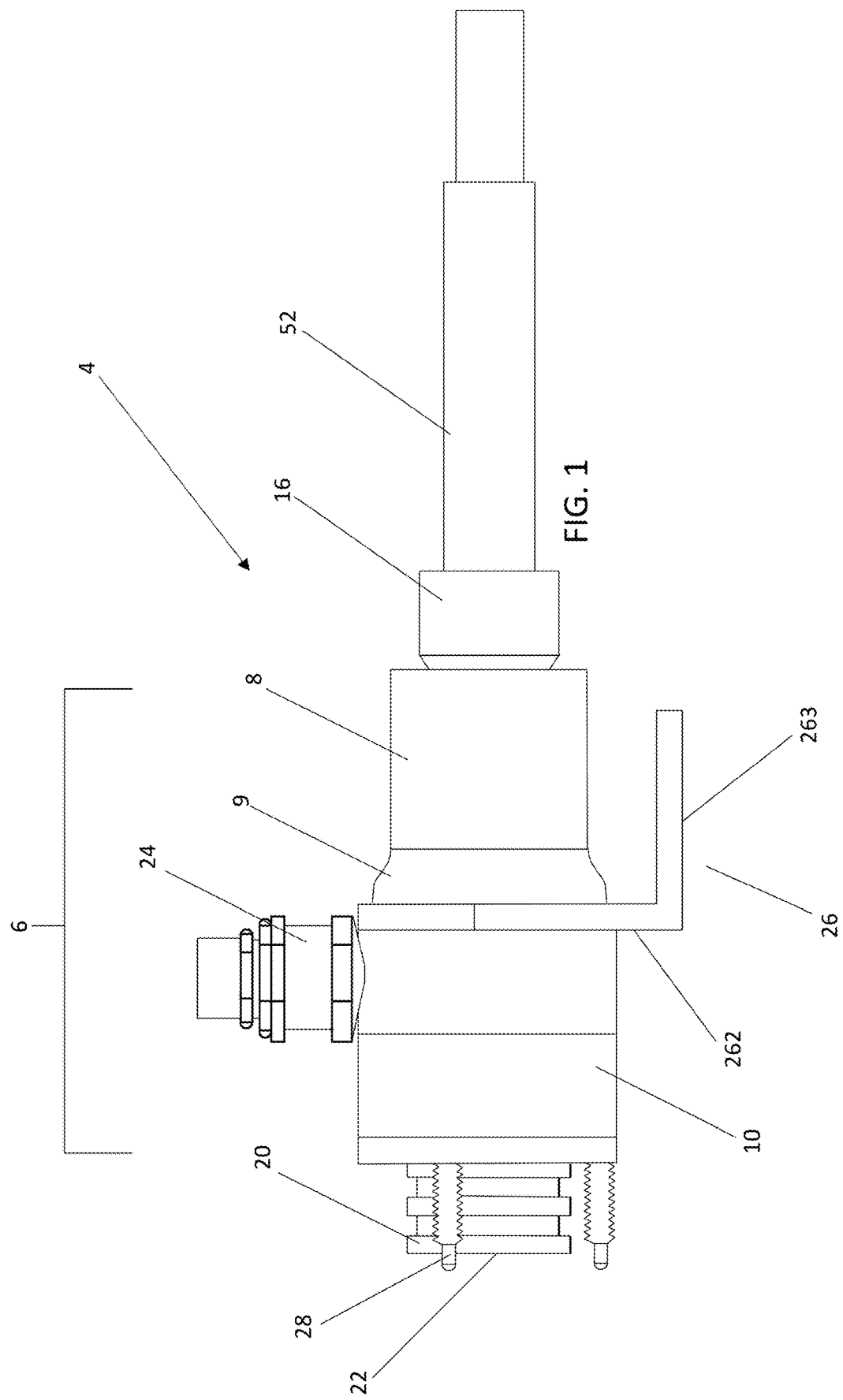
FIG. 1 illustrates an orthogonal side view of a transducer housing assembly according to one embodiment of the present invention.

The present invention is generally directed to systems and methods of non-destructive testing using ultrasonic transducers.

In one embodiment, the present invention is directed to a system for non-destructive testing of composite materials, including an ultrasonic transducer in communication with a processor and a display means, wherein the ultrasonic transducer is operable to emit ultrasonic waves into and receive ultrasonic waves from a test object to produce scan data, wherein the test object includes a multiplicity of layers, wherein one or more of the multiplicity of layers includes at least one wrinkle, having an average wavelength, an average amplitude, and an average aspect ratio, wherein the average aspect ratio of at least one wrinkle is less than 0.1, and wherein the processor calculates the aspect ratio, the average amplitude, and/or the average wavelength of the at least one wrinkle.

In another embodiment, the present invention is directed to a system for non-destructive testing of composite materials, including an ultrasonic transducer in communication with a processor and a display means, wherein the ultrasonic transducer is operable to emit ultrasonic waves into and receive ultrasonic waves from a test object to produce scan data, wherein the test object includes a multiplicity of layers, wherein the processor generates a plurality of B-scans for the test object, wherein, based on the plurality of B-scans, the processor determines whether at least one wrinkle exists between any two of the multiplicity of layers, and wherein, if at least one wrinkle exists within the test object, the processor determines an initial depth at which the amplitude of each of the at least one wrinkle exceeds a predetermined threshold amplitude and a final depth at which the amplitude of each of the at least one wrinkle falls below a predetermined amplitude.

In yet another embodiment, the present invention to directed to a system for non-destructive testing of composite materials, including an ultrasonic transducer in communication with a processor and a display means, wherein the ultrasonic transducer is operable to emit ultrasonic waves into and receive ultrasonic waves from a test object to produce scan data, wherein the test object includes a multiplicity of layers, wherein the processor generates a plurality of B-scans for the test object, and wherein the processor generates at least one three-dimensional (3-D) graphical representation of one of the multiplicity of layers having at least one wrinkle based on the plurality of B-scans.

Ultrasonic testing is one of the most popular methods of non-destructive testing (NDT), also known as non-destructive inspection (NDI) or non-destructive evaluation (NDE). Ultrasonic testing involves the emission of ultrasonic waves into a test material by a transducer and the subsequent sensing of reflecting or transmitted waves by a receiver. In pulse-echo, or reflection, configurations, the ultrasonic energy is introduced to and transmitted through the surface of the test material in waves. The use of such systems typically requires an acoustic medium (e.g., water, gel) to bridge the gap between the transducer and the test material. As the waves propagate through the thickness of the test material, discontinuities within the test material (due to material changes, cracks, delaminations, foreign objects, etc.) cause a reflection of the wave, which can then be detected by the transducer and displayed or characterized. In contrast, in through transmission, or attenuation, configurations, a transducer generates high frequency ultrasonic energy, which is transmitted through one side of a test material and then received by a corresponding receiver on the opposite side of the test material. As the waves propagate through the thickness of the test material, discontinuities within the test material may cause waves in some areas to be slowed or fully attenuated before they reach the receiver.

The receiver can then characterize the test material by measuring the degree of attenuation of the ultrasonic wave.

When the ultrasonic waves emitted by an ultrasonic transducer contact a material with different properties than the ones they are initially traveling through, some waves are reflected back in accordance with Equation 1 below.

$$R = \frac{Z_2 - Z_1}{Z_1 + Z_2} \quad \text{(Equation 1)}$$

In Equation 1, R is a reflection coefficient, which is a decimal value representing the percentage of waves reflected at the boundary between two materials. $Z_1$ and $Z_2$ are the acoustic impedances of the two materials that make up the material boundary. The acoustic impedance of a material is found by multiplying the speed of sound for the material by its density. Additionally, the speed of sound for the material is found by dividing the square root of the Young's modulus of the material by the square root of the density of the material. Therefore, based on the percentage of waves reflected, a user is able to calculate the reflection coefficient for the interaction. If the acoustic impedance for one material is known, the identity of the other material is able to found using Equation 1.

In selecting ultrasonic inspection systems, the constraints of portability and robustness are often inversely proportional to high resolution and fidelity. When attempting to optimize both portability and robustness, most inspectors currently select a contact transducer. Contact transducers allow an inspector to quickly place a thin gel on a part to be inspected and place the transducer in intimate contact with the part. Data can be quickly gathered and at the same time, the system can operate on a variety of surfaces and environmental conditions. The primary downside of this approach is the resolution of the acquired data. The planar resolution of the transducer is dictated by the physical footprint of the transducer. This footprint can be mitigated by fabricating smaller and smaller transducers. The through-thickness resolution of the transducer, however, is determined by the frequency of the transducer and the power with which it can be fired. As a transducer's planar dimension is reduced, both the power that can be sent to fire the transducer and the frequency is simultaneously reduced. Thus, improvements to planar resolution are in direct conflict with improvements in through thickness resolution.

An alternative to the contact transducer is a spherically focused transducer. These transducers are capable of operating at high frequencies (25-50 MHz) and have a planar resolution as fine as can be machined into the transducer housing lens, which may be less than ¹/₁₀th of a millimeter. However, spherically focused transducers can only operate when the transducer is fully acoustically coupled to the surface of a component being inspected. Acoustically coupling the transducer to the test material requires immersing the transducer in an acoustic medium while ensuring the transducer has a viable acoustic path between it and the surface to be tested. Water is the most widely used acoustic medium for immersion transducers, as the difference in acoustic impedance between the water and transducer lens is minimal.

Currently, there are two main techniques to achieve a viable acoustic coupling water path: full immersion tank testing or water jets. The full immersion tank requires the part to be submerged in water, thus preventing many larger components, such as aircraft wings and fuselages, from being tested without a substantial (and often impractical) infrastructure investment. Water jets, on the other hand, require water to be spraying in all directions, which causes water to pool under the component being scanned. Water jets therefore also require infrastructure investments, often in the form of grates to collect the sprayed water, pumps to circulate the water, and framing to protect equipment in the area that can be damaged by water.

One alternative to the use of traditional water jets is a "bubbler". To use a bubbler, a temporary watertight box is built around a region of a component to be scanned for inspection. Water is then poured into a column that houses the transducer and is allowed to slowly leak out from a base of the box. This approach requires a new box to be installed at every new location for the scan. In order for a bubbler to work, the membrane must be pressed tightly against the object to be tested, as water leaks out slowly enough from the bubbler that it cannot maintain the blast pressure necessary to allow the device to be placed at an offset from the test material. Not only does this create the risk of impact between the bubbler and the test material, which may cause damage, but it also greatly reduces the resolution of the device. Bubblers rely on permeable membranes that slowly allow the water to leak out, but when the bubbler is operating and the membrane is pressed firmly against the test surface, the systems cannot effectively distinguish between waves in the membrane and in the test material, rendering the devices less effective if not entirely inoperable. Furthermore, bubblers suffer from similar drawbacks as traditional water jets, in that they require water to be pumped in constantly and require a means to catch leaking water. Additionally, full immersion, traditional water jets, and the bubbler all require the test material to be exposed to water, which is undesirable in some situations.

Traditional water jets and bubblers also suffer similar problems of being unable to scan hard to reach areas of a device. Hard to reach areas are often semi-contained within a device or component to be tested and therefore, the use of traditional water jets is highly likely to cause water to pool within the device, which may cause damage or be difficult to pump out. Furthermore, both traditional water jet systems and bubblers require the continuous pumping in of water via a water column. However, the need for this water column eliminates the ability of those devices to effectively navigate to hard-to-reach areas of a device or component to be tested.

As of yet, no other efforts to produce a robust functional ultrasonic scanner utilizing water-filled chambers have been successful. Some existing systems require the chamber to leak around a rolling ball, through a permeable membrane, or otherwise, to span the gap between the chamber and the surface to be measured. Such systems still require a flow of water into the chamber to replenish the water loss to maintain the acoustic coupling and require contact between the water and the test material. Other systems sacrifice the use of a spherically focused transducer and therefore have decreased resolution. Still other systems have fixed focal lengths, and other systems have fixed lengths of lens housing and lens that preclude reaching portions of surfaces for scanning.

Ultrasonic testing typically results in the formation of multiple types of scan data, as the transducer emits waves into different sections of the test material, such as A-scans, B-scans, and C-scans. An A-scan is formed for each individually scanned point of the test material. A-scans typically show a signal amplitude as a function of time, wherein signals appearing later in time are reflected from boundary changes at greater depths in the material and the presence of greater than two signals (more than the initial entry into the test material and the reflection off the back wall of the test material) indicates the presence of a defect, or internal layering within the test material. A-scans can be useful in determining whether a defect or layer boundary is present at a particular point in an object, but lacks specificity regarding the size or type of defect in question and can only characterize one specific area of the material.

B-scans are constructed as combinations of individual A-scans as an ultrasonic testing device is swept along an axis of the test material. As the ultrasonic testing device is moved, the B-scan is able to form a cross-sectional view of the device, indicating at what depth defects are found based on the peaks of the A-scan for each point along the test material. This creates a sort of side view of the test material, which is useful for providing information regarding impact damage and delaminations.

A C-scan provides a cross-sectional view of the test material that is orthogonal to that of the B-scan. C-scans combine A-scans for different X and Y coordinates along a plane to produce a cross sectional view that can provide not only position data for an internal defect or layer, but also an indication of the defect or layer's cross-sectional area at a given depth. C-scans are formed by selecting a gate start time and a gate end time and then obtaining intensity information within the gate region for every A-scan that is taken. Some systems utilize phase array technology with transducers aimed in different directions, such as that the system is able to gain a wider array of A-scans before the transducer is moved across each point of the test area. C-scans are however, two dimensional images and are unable to accurately provide for the depth of a defect or precisely observe defects that would appear more predominately in a view orthogonal to the cross-sections of the C-scans.

In order to find irregularities within a test material, most current systems rely on the use of calibration blocks, with the A-scan, B-scan, and C-scans of current systems being incapable of accurately detecting many imperfections in isolation. Before testing, the testing device is used on one or more calibration blocks, which typically are either an exemplary form of the material to be tested or a material with known defects. Traditional ultrasonic inspection systems use this calibration method as a means of comparison in determining whether the signals reflected from the test material match or differ from those of the calibration block. However, reliance on calibration blocks weakens the ability to specifically indicate important properties of a test material. For example, porosity testing, traditional systems may recognize calibration blocks with porosities of 0.2, 0.4 and 0.6, but a test material which most closely aligns with the 0.4 porosity calibration block may still have a porosity of anywhere between 0.3 and 0.5, with further specificity being limited. Furthermore, testing using calibration blocks may be hindered by unknown flaws in the calibration blocks or unconsidered confounding variables that differ between the calibration blocks and the actual test material. Therefore, a system is needed that is capable of directly determining qualities of a material, such as ply orientation, porosity, bond line thickness, the presence of wrinkles, unevenness in the bond line, or other important physical properties of a test material without reference to a calibration block.

Due to their high strength-to-weight ratios, composites are becoming increasingly common, particularly for structural applications in the aerospace, automotive, and defense industries. A composite is defined as the combination of two or more materials to form a new material, including, but not limited to, concrete, straw reinforced clay bricks, carbon fiber laminates, and fiberglass. Manufacturing defects as well as damage caused during use of the composite can have a significant impact on the laminate's structural performance and sometimes lead to structural failure. Damage to a composite can frequently occur as a result of hail strikes, lightning, bird collisions, mishandling of the part, or general fatigue. Examples of defects that can lead to the failure of a composite material during use include foreign objects within the material, insufficient bonding between the layers of the composite, wrinkling of the layers of the composite, delamination within at least one layer of the composite, incomplete curing of the composite, and excessively large pores within the composite. Therefore, properties such as the bond line thickness, porosity, ply type, and weave type of the composite can have significant effects on the overall material properties and performance of a composite structure, and they may even serve as crack initiation points.

Current portable transducer systems are inadequate for properly characterizing composite laminates due to the acoustic impedance and thickness of many composite materials. Composite laminates typically range between several millimeters to nearly ¾ of an inch in thickness, frequently with individual lamina with a thickness of about ¼ mm. As a general rule, the wavelength of waves used to detect individual lamina should be no larger than half the thickness of the material, or less the material may go entirely unnoticed by the wave. Therefore, due to the combination of the small layer size in composites and high attenuation of waves within the composite, in order to characterize meaningful defects within or between layers of these composites with sufficient resolution, transducers need to be able to emit frequencies between 7.5 and 15 MHz. This is an issue for current portable transducer systems, which are generally only able to emit frequencies on the order of about 2-3 MHz. Many existing systems, furthermore, only use frequencies up to approximately 5 MHz, as this is understood to approximate the natural frequency of the material being tested. However, limiting the frequency to 5 MHz or lower limits the resolution of the scan, leading systems to overlook potentially relevant features and flaws. An alternative solution to portable transducers is an immersion type system, which usually involves completely immersing the test material in a water tank or continually spraying water jets at the material in order to maintain sufficient acoustic coupling between the transducer and the surface of the test material. However, immersion techniques are typically inconvenient in terms of both a large cost and additional necessary set-up time for testing.

As the frequency of the transducer increases, the resolution quality of the transducer increases. However, as the frequency of the transducer increases, the depth of a material visible to the system decreases. In one embodiment, the transducer is able to operate at frequencies between 0.5 MHz and 50 MHz. In another embodiment, the transducer is able to operate at frequencies between 1 and 25 MHz. In yet another embodiment, the transducer is able to operate at frequencies between 5 and 15 MHz. In still another embodiment, the transducer is able to operate between 10 and 15 MHz. In a preferred embodiment, the transducer operates between 7.5 and 15 MHz.

Additionally, traditional ultrasonic testing devices utilize calibration blocks. Before testing, the testing device is used on one or more calibration blocks, which typically are either an exemplary form of the material to be tested or a material with known defects. Traditional ultrasonic inspection systems use this calibration method as a means of comparison in determining whether the signals reflected from the test material match or differ from those of the calibration block. However, reliance on calibration blocks weakens the ability to specifically indicate important properties of a test material. For example, porosity testing, traditional systems often recognize calibration blocks with porosities of 0.2, 0.4 and 0.6, but a test material which most closely aligns with the 0.4 porosity calibration block could still have a porosity of anywhere between 0.3 and 0.5, with further specificity being limited. Furthermore, testing using calibration blocks may be hindered by unknown flaws in the calibration blocks or unconsidered confounding variables that differ between the calibration blocks and the actual test material. Therefore, a system is needed that is capable of directly determining qualities of a material, such as ply orientation, porosity, bond line thickness, the presence of wrinkles, unevenness in the bond line, or other important physical properties of a composite material without reference to a calibration block.

In one embodiment, a portable transducer housing assembly contains a transducer used to scan a test material. The portable transducer housing assembly includes a central housing with an interior sealed chamber, with the transducer disposed within the interior sealed chamber. The interior sealed chamber is detachably connected to a fluid pump, which is operable to both pump air out of the interior sealed chamber and pump water or other coupling fluid into the interior sealed chamber. At a front end of the central housing is a membrane, which seals the interior sealed chamber. The membrane is acoustically transparent or acoustically translucent to the coupling fluid within the interior sealed chamber. In one embodiment, the transducer is movable relative to the central housing of the portable transduce housing assembly, which allows a user to adjust the focus of the device depending on the size and nature of the transducer and the nature of the test material.

In one embodiment, the portable transducer housing assembly used by the present system is placed at an offset from the test material, with an external couplant disposed between the membrane of the portable transducer housing assembly and the test material. In one embodiment, the external couplant is an acoustic gel, such as glycerin, couplant D12, couplant H, a shear wave couplant, or another suitable acoustic gel. In one embodiment, at least one offset element extends longitudinally outwardly from the central housing toward the test material in order to ensure that the portable transducer housing assembly does not come into harmful contact with the test material and that the portable transducer housing assembly is kept at a minimum fixed offset from the test material.

In one embodiment, the distance that the transducer housing assembly is offset from the test material is determined using a calibration wave. An initial wave is transmitted via the transducer into the test material. Time of flight data is gathered regarding ultrasonic waves reflecting off of a membrane covering the opening of the lens housing, waves reflecting off the front surface of the test material, and waves reflecting off the back surface of the test material. Without the need to input material properties or dimensions of the test material, the transducer housing assembly is able to automatically offset by a fixed distance from the test material based on the results of the time of flight data. In another embodiment, the material properties of the test material, such as the speed of sound, and dimensional data of the test material, such as the thickness, is manually entered, allowing the transducer housing assembly to automatically offset by a fixed distance from the test material without the need for a calibration wave.

In one embodiment, the transducer housing assembly mounted on a robotic arm. The transducer housing assembly includes a mounting bracket with an attachment bore able to receive a screw, bolt, pin, or other affixing means attached to the robotic arm. The robotic arm both allows the transducer housing assembly to reach tighter spaces and allows the device to be held steadily for the duration of the testing, increasing the accuracy of the test. In another embodiment, the mounting bracket is attached to a translation stage. The translation stage operates to move the transducer housing assembly to different positions along an X-Y plane. This is especially advantageous in situations wherein the operator desires to scan large sections of a relatively flat test material.

In one embodiment, the transducer housing assembly is attached to an array element. In another embodiment, the array element includes attachment points for more than one transducer housing assembly, allowing multiple transducer housing assemblies to be attached to a single array element, which acts as an array of transducers. The array of transducers is therefore able to scan multiple points of a test material simultaneously, with each individual transducer housing assembly being adjustable, so as to allow the array of transducers to scan components with uneven surfaces or scan components having multiple different material types.

In another embodiment, the transducer housing assembly is manually operated. By way of example, the transducer housing assembly is placed into an assembly attached to the test material. An operator is then able to manually slide the transducer housing assembly within the assembly while the assembly ensures that the transducer housing assembly remains at a substantially fixed distance from the test material. In still another embodiment, the transducer housing assembly is able to automatically move to a plurality of different points on the test object based on preset position data entered into a computer or attached display.

In another embodiment, the transducer housing assembly lacks membrane, leaving the interior chamber unsealed. The water is pumped in at a high flow rate, allowing water jets to form spray the test material, acoustically coupling the transducer to the test material. In yet another embodiment, the transducer is not disposed within a transducer housing assembly and is placed in an immersion tank in order to ensure acoustic coupling with the test material.

In one embodiment, the transducer housing assembly is attached to a connection receiving end. In another embodiment, the connection receiving end is connected to a computer or another processor and a waveform generator, such as a pulser receiver, via a cable. The computer or processor includes a display means, such as a monitor or a touch screen. In one embodiment, a single waveform generator is able to connect to multiple transducer housing assemblies simultaneously. In one embodiment, the connection receiving end is a UHF connector, a Bayonet Neill-Concelman (BNC) connector, or a Universal Serial Bus (USB) connector. In another embodiment, the connection receiving end is a wireless adapter, allowing the transducer housing assembly 4 to wireless connect with the pulser receiver. The pulser receiver is connected to a computer, having a processor and memory. Furthermore, the computer includes display means for outputting graphical results of ultrasonic testing performed using the transducer housing assembly. In yet another embodiment, the computer is also connected with the robotic arm, translation stage, or array element to which the transducer housing assembly 4 is attached and is operable to issue control instructions to the robotic arm, translation stage, or array element.

The computer is connected to a display means able to display a graphical user interface (GUI), which is able to display the results of the testing after processing by the pulser receiver. In another embodiment, a display is directly mounted to the transducer housing assembly, which allows results to be displayed to the user of the transducer housing assembly without the operator needing to step away to check the computer. The GUI is able to accept a variety of input factors before each test, including the operator's name, the time, and material properties including the speed of sound of the material to be tested, the thickness of the material to be tested, the stiffness of the material to be tested, and/or the type of material to be tested. In one embodiment, the GUI is also able to accept a range of locations and a run time, indicating where the robotic arm, the array element, or the translation stage should position itself for testing.

The present system is capable of displaying information regarding a variety of factors of a laminate, including the location and depth of foreign objects within the laminate, the ply orientation of the laminate, the location of wrinkles within the laminate, the thickness of the bond line of the laminate, areas of incomplete bonding along the bond line of the laminate, the porosity of the laminate, and the location, depth, and size of internal defects and areas of delamination within the laminate.

1. Transducer

FIG. 1 illustrates an orthogonal side view of a transducer housing assembly 4 according to one embodiment of the present invention. The transducer housing assembly 4 includes a central housing 6 with a front portion 10 and a back portion 8. In one embodiment, the front portion 10 and back portion 8 are hollow cylindrical pieces and are integrally formed with each other. Alternatively, the front portion 10 and back portion 8 are not integrally formed but are separately formed and are joined together via any chemical and/or mechanical means known in the art. In another embodiment, the front portion 10 and back portion 8 are another shape, such as rectangular prisms. In one embodiment, the diameter of the front portion 10 is greater than that of the back portion 8, with the diameter of the central housing 6 tapering down between the front portion 10 and back portion 8 at a midsection 9. The central housing 6 is attached to a fluid connector 24. In one embodiment, the fluid connector 24 is attached to the front portion 10 of the central housing 6, while in another embodiment, the fluid connector 24 is attached to the midsection 9 or back portion 8 of the central housing 6. In one embodiment, a mounting bracket 26 extends from the front portion 10 of the central housing 6. In another embodiment, the mounting bracket 26 extends from the midsection 9 or back portion 8 of the central housing 6.

The front portion 10 of the central housing 6 is connected to a lens housing 20, which extends outwardly from the front end of the central housing 6. The front end of the lens housing 20 includes an opening 22. In one embodiment, at least one surface offset element 28 extends from the front end of the central housing 6. In another embodiment, the surface offset elements 28 extend outwardly directly from the lens housing 20. Transducer is disposed within the central housing 6. In some embodiments, the transducer is directly attached to an elongate member 52. The elongate member 52 is attached to the central housing 6 by means of a coupling element 16. In one embodiment, the position of the elongate member 52, and therefore the transducer, can be adjusted relative to the central housing 6 by rotating or otherwise adjusting the coupling element 16.

In one embodiment, the elongate member 52 and coupling element 16 include a metal material, such as, but not limited to, steel or aluminum. In another embodiment, the elongate member 52 and coupling element 16 are formed of the same metal material. Forming both the elongate member 52 and coupling element 16 from the same metal material is advantageous, as it prevents one of the elements acting as a cathode or an anode, which would allow for galvanic cell activity in the transducer housing assembly 4, shortening the useful life of the device. In one embodiment, the central housing 6 is formed from a plastic, such as polycarbonate or polyethylene. In another embodiment, the central housing 6 is formed via 3D printing of the device using an ultraviolet (UV) curable polymer, which is then cured after formation.

Figure 2:
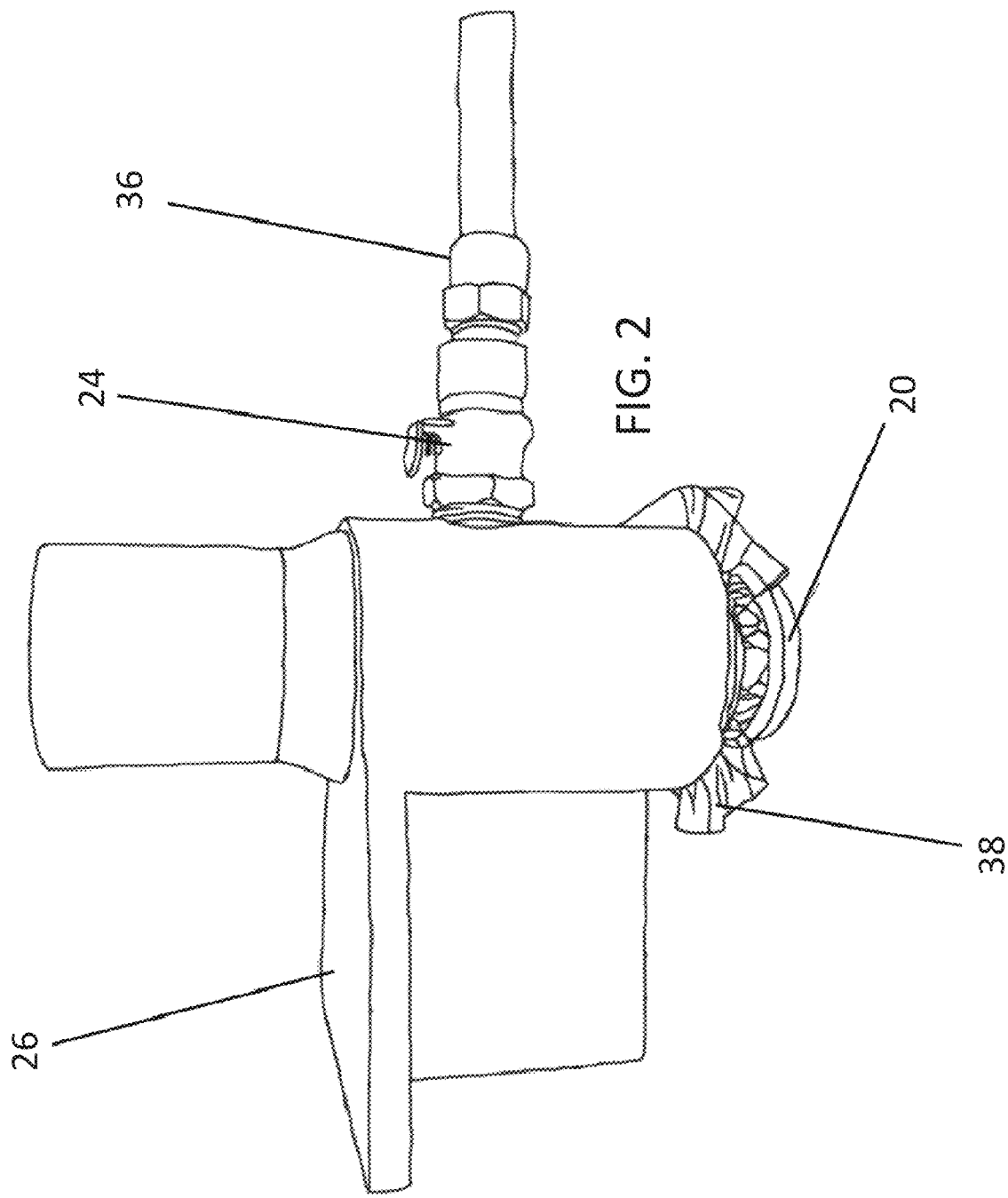
FIG. 2 illustrates an orthogonal side view of a transducer housing assembly according to one embodiment of the present invention.
Figure 5:
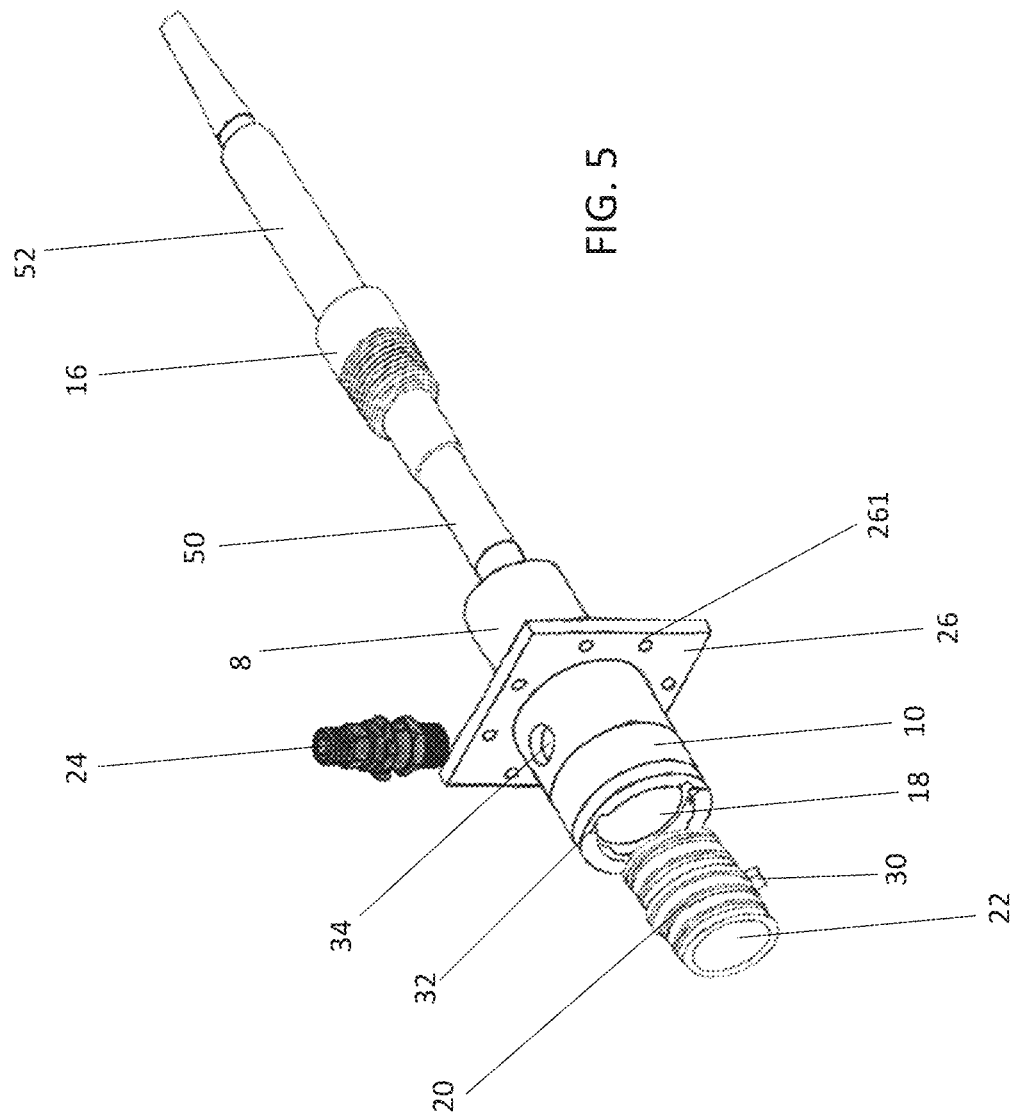
FIG. 5 illustrates an isometric exploded view of a transducer housing assembly according to another embodiment of the present invention.

In one embodiment, as shown in FIG. 1, the mounting bracket 26 includes a first plane 262 extending away from the central housing 6 at an angle and a second plane 263 extending from the end of the first plane 262 in a direction substantially parallel to a central axis of the transducer housing assembly 4. In another embodiment, as shown in FIG. 5, the mounting bracket 26 is a substantially rectangular piece disposed between and orthogonal to the front portion 10 and back portion 8 of the central housing 6. As can be seen in FIG. 2, in other embodiments, the mounting bracket 26 takes different shapes, depending on the device to which it is to be attached.

Figure 3:
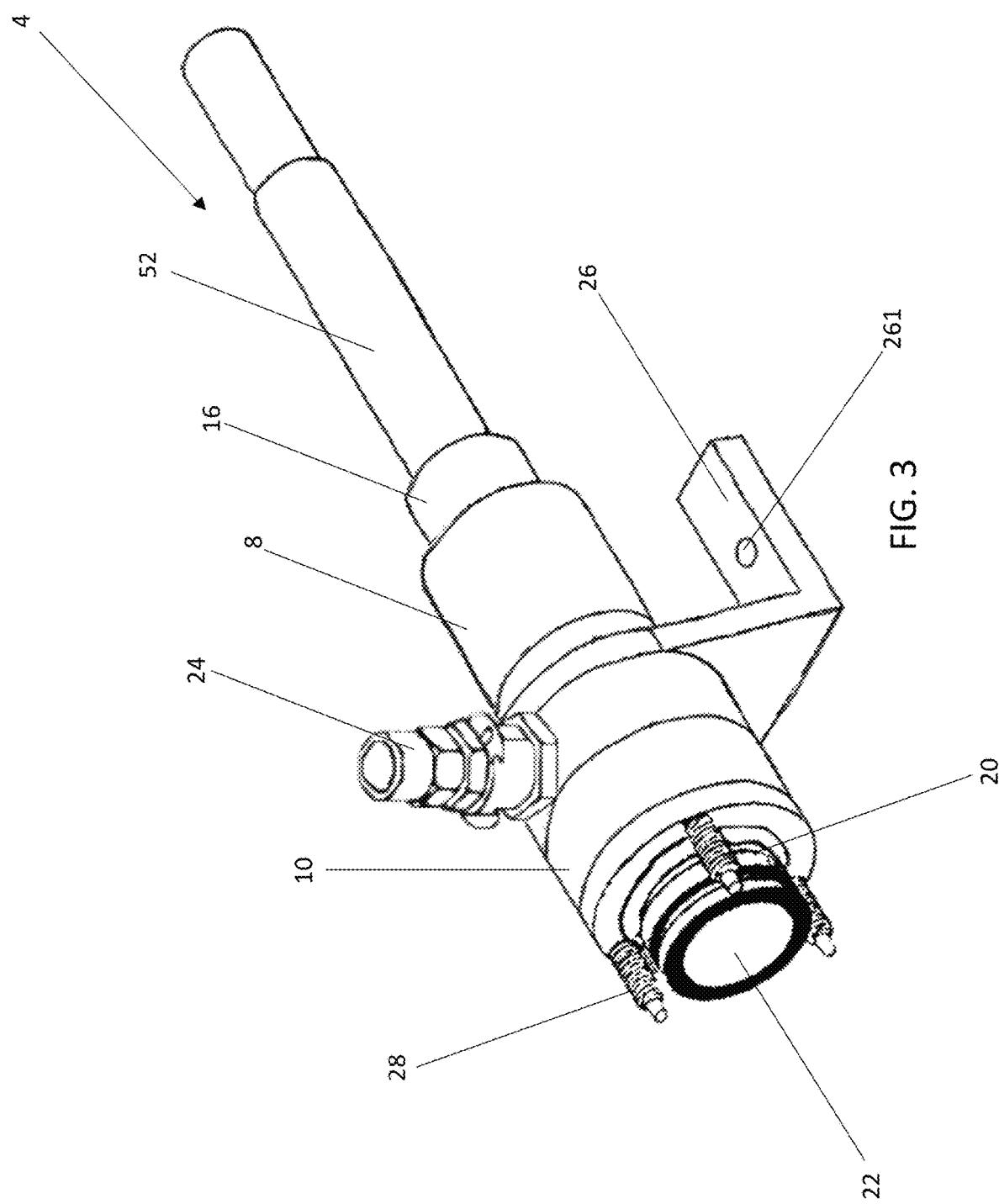
FIG. 3 illustrates an isometric view of the transducer housing assembly shown in FIG. 1.
Figure 4:
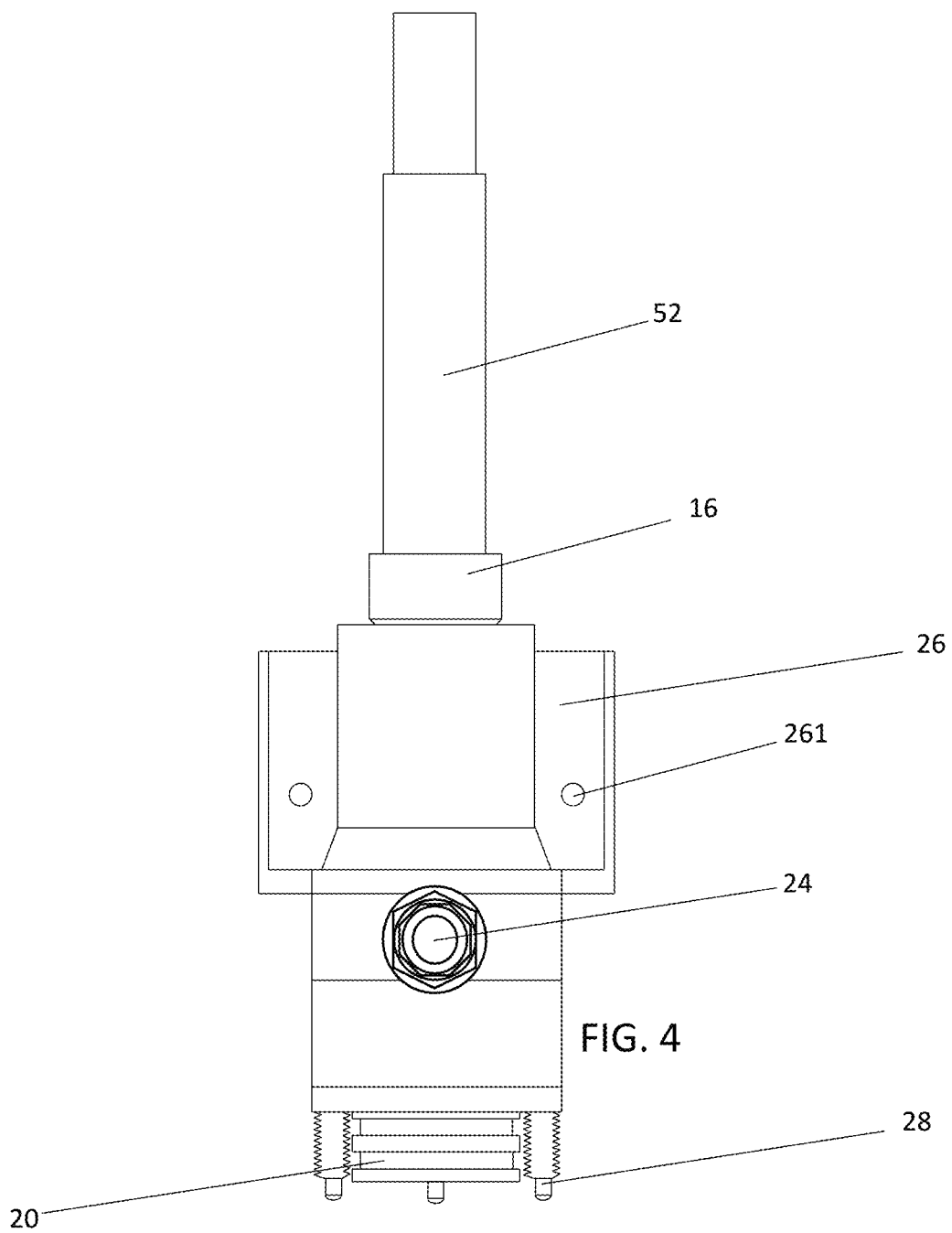
FIG. 4 illustrates a top view of the transducer housing assembly shown in FIG. 1.

FIG. 3 illustrates an isometric view of the transducer housing assembly 4 shown in FIG. 1. FIG. 4 illustrates a top view of the transducer housing assembly shown in FIG. 1. As can be seen in FIGS. 3 and 4, in one embodiment, the transducer housing assembly 4 includes three surface offset elements 28. In one embodiment, the mounting bracket 26 includes at least one attachment bore 261

FIG. 5 illustrates an isometric exploded view of a transducer housing assembly 4 according to another embodiment of the present invention. In one embodiment, the fluid connector 24 is attached to the central housing 6 of the transducer housing assembly 4 by connecting to a connection port 34. In one embodiment, the fluid connector 24 connects to the connection port 34 by means of threading located on the outside surface of the fluid connector 24 and the interior surface of the connector port 34.

Figure 6:
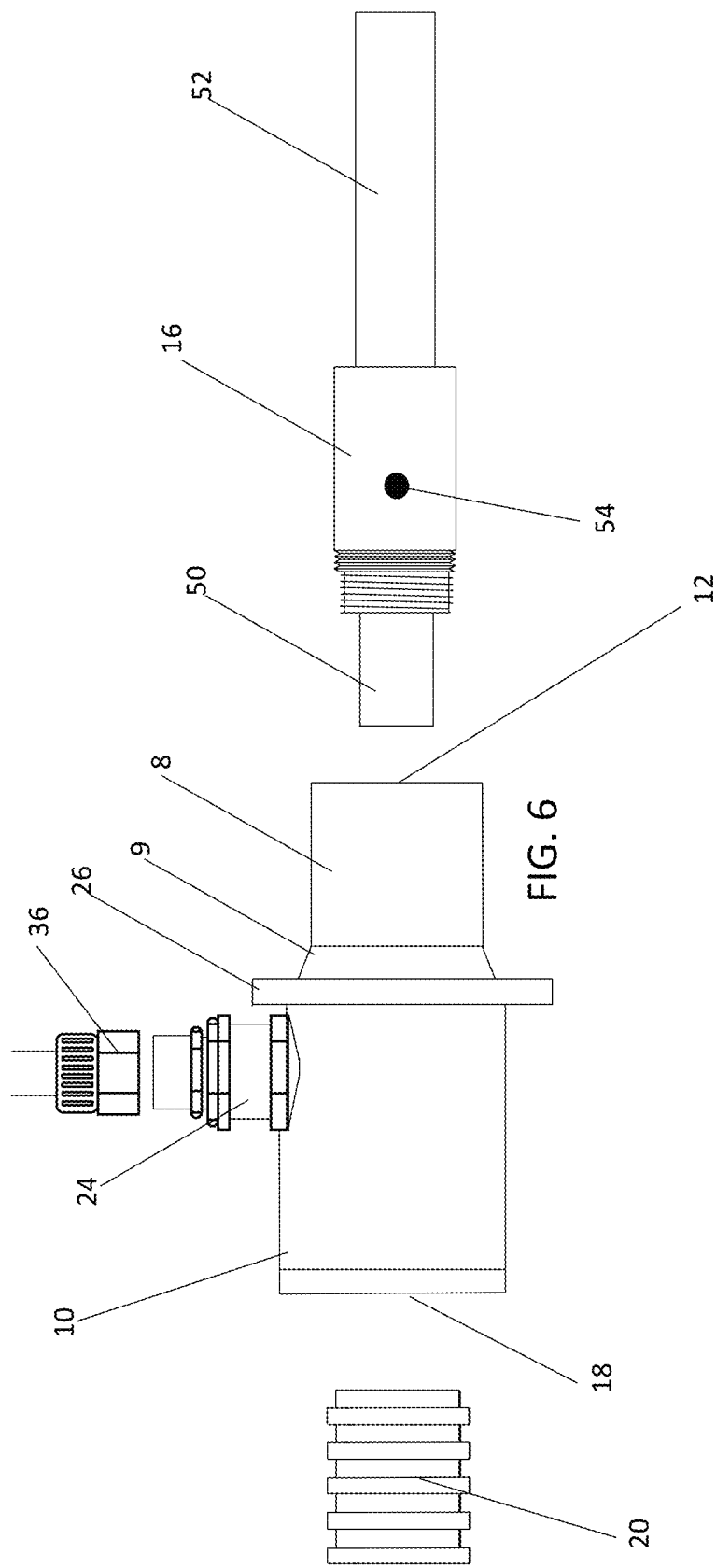
FIG. 6 illustrates an orthogonal exploded view of components of the transducer housing assembly shown in FIG. 5.

In one embodiment, the coupling element 16 is a hollow cylinder and the elongate member 52 extends through the coupling element 16. The elongate member 52 and the coupling element 16 are held together by frictional contact between the outside surface of the search tube 52 and the interior surface of the coupling element. As shown in FIG. 6, in another embodiment, the elongate member 52 is secured to the coupling element 16 by a securing element 54. In one embodiment, the securing element 54 is a screw, bolt, or compressible pin. In one embodiment, the elongate member 52 is a hollow cylinder with the transducer 50 being frictionally engaged within a front end of the elongate member 52.

In one embodiment, the coupling element 16 connects to the central housing 6 by means of threading on part of the surface of the coupling element 16 and on the inner surface of a first opening 12 in the back portion 8 of the central housing 6. In another embodiment, when the coupling element 16 is engaged with the central housing 6, the coupling element 16 can be rotated so as move the coupling element 16 and the elongate member 52 longitudinally relative to the central housing 6. In yet another embodiment, the securing element 54 can be removed, compressed or otherwise altered, which allows the coupling element 16 and the elongate member 52 to move longitudinally relative to the central housing 6. By moving the elongate member 52 longitudinally relative to the central housing 6, the position of the transducer 50 is able to be changed, which allows for accommodation of a range of sizes for transducers 50, as well as greater precision in the focusing on the transducer.

In one embodiment, the first opening 12 includes sealing elements, which prevent fluid leakage through the first opening 12. In one embodiment, the sealing elements include O-rings lining the inner surface of the first opening 12. In another embodiment, the chamber within the central housing 6 is not fully sealed during operation, with either the back end of the central housing 6 or the interface with the fluid connector 24 being left unsealed. The option to use the transducer housing assembly 4 without sealing the chamber of the central housing provides flexibility in the parts used to construct the device, including allowing for the reduction of manufacturing cost. However, for use of the transducer housing assembly 4 that involves putting the transducer housing assembly 4 at an angle, it is advisable to sealed the interior chamber to prevent fluid leakage, which could cause decoupling of the transducer to the test material.

Figure 7:
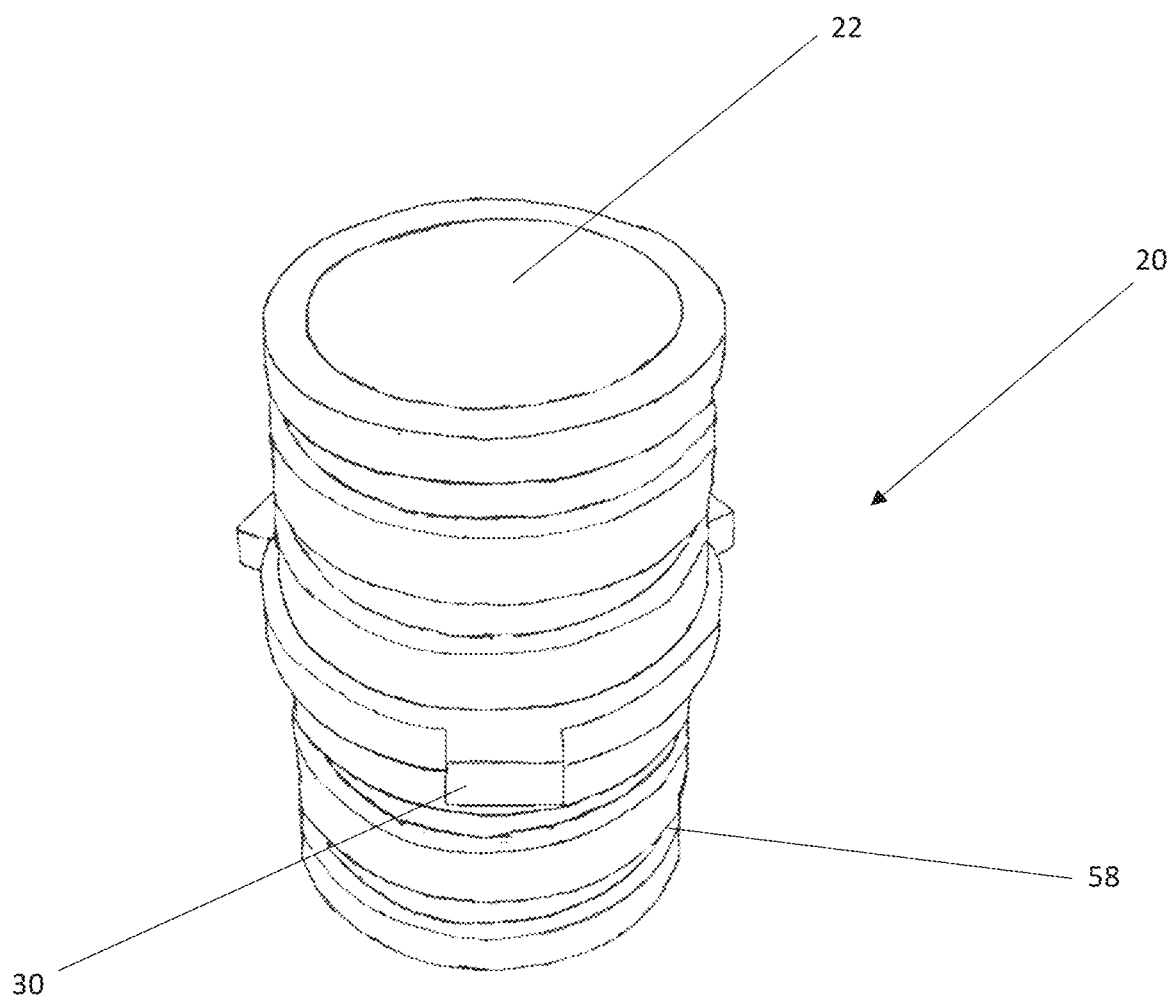
FIG. 7 illustrates an isometric view of a lens housing according to one embodiment of the present invention.
Figure 8:
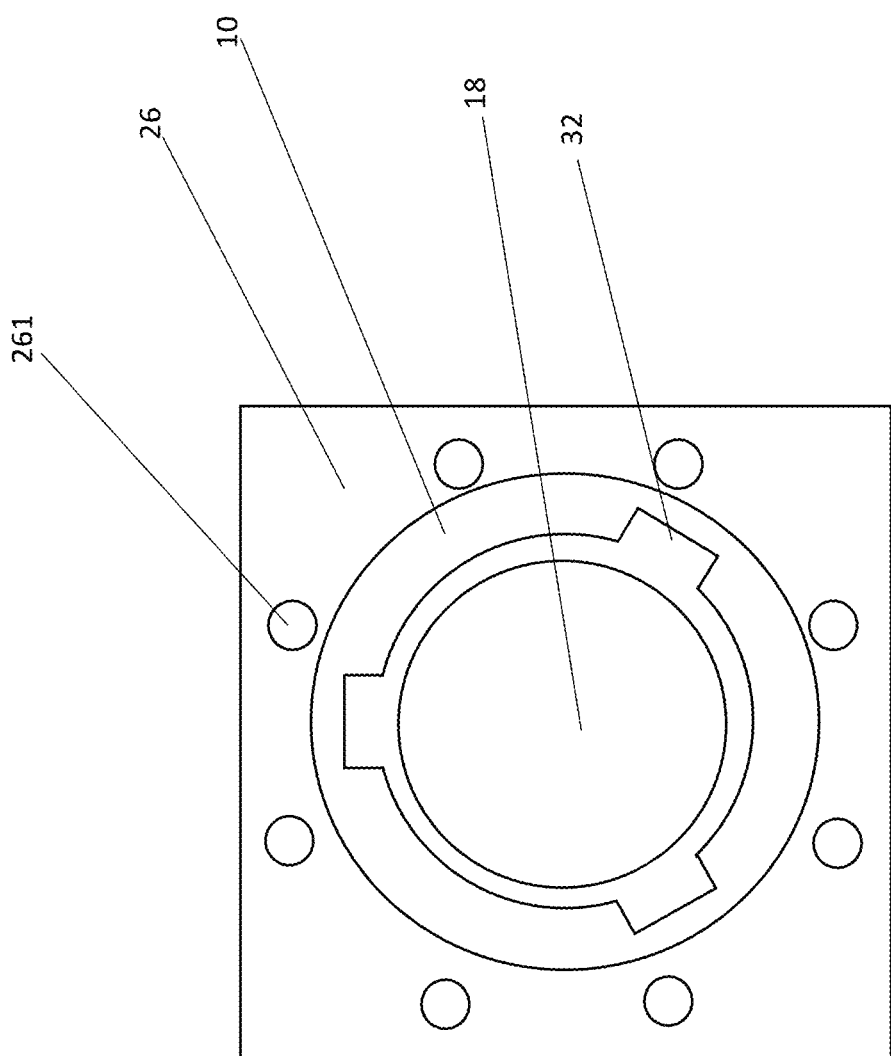
FIG. 8 illustrates an orthogonal front view of a central housing according to one embodiment of the present invention.
Figure 9:
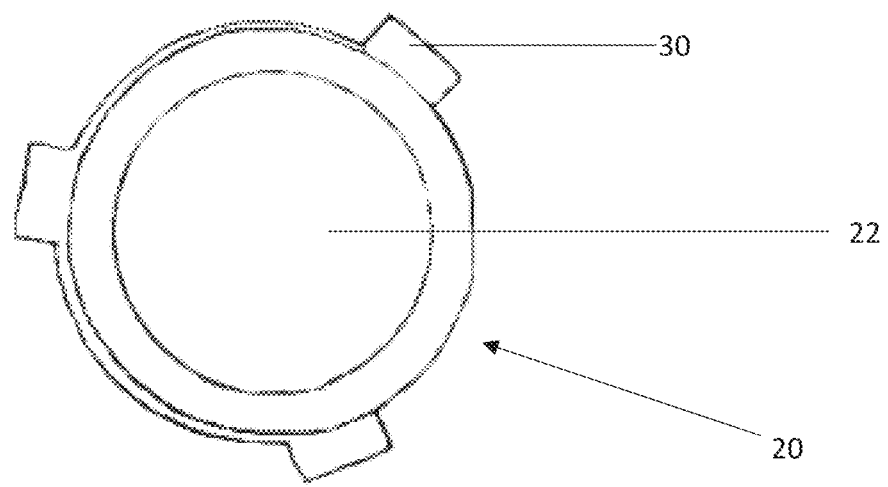
FIG. 9 illustrates an orthogonal front view of a lens housing according to one embodiment of the present invention.
Figure 10:
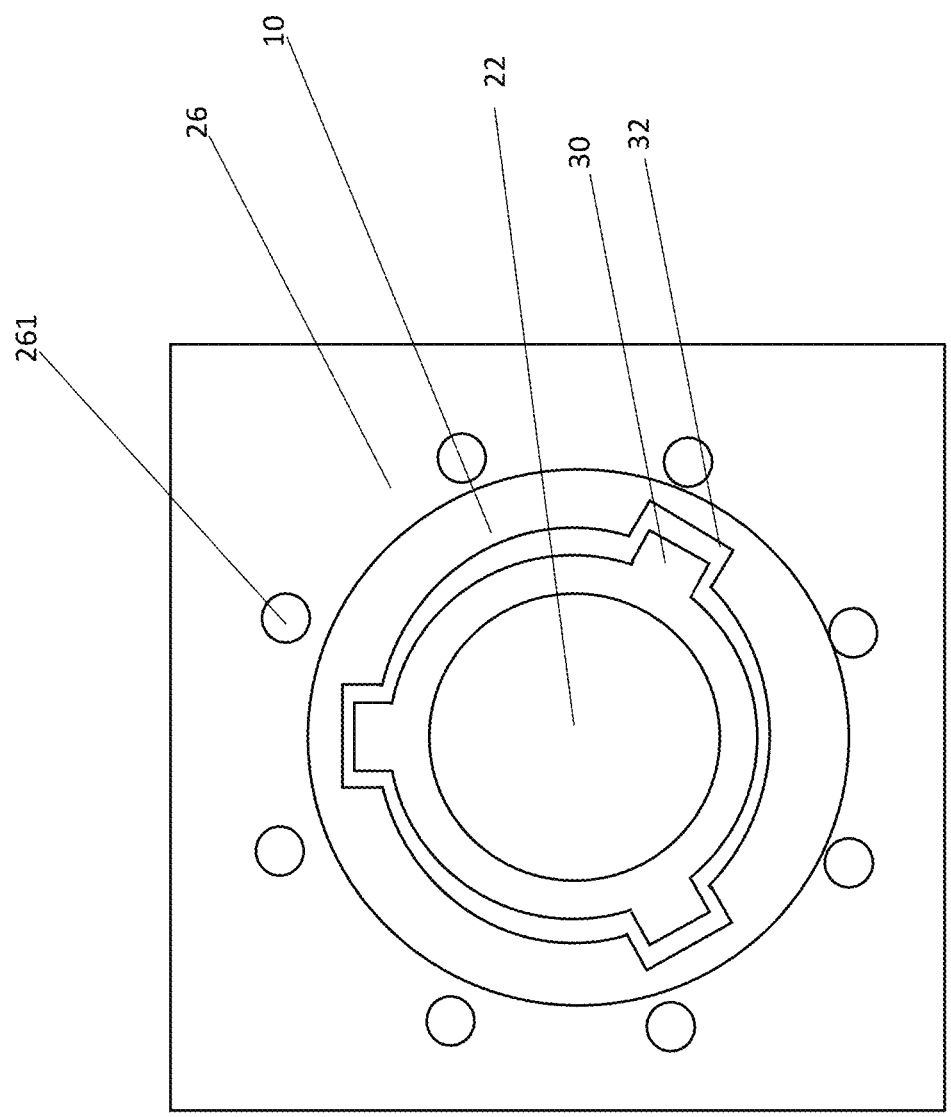
FIG. 10 illustrates an orthogonal front view of a transducer housing assembly, including the housing shown in FIG. 8 paired with the lens housing shown in FIG. 9.
Figure 11:
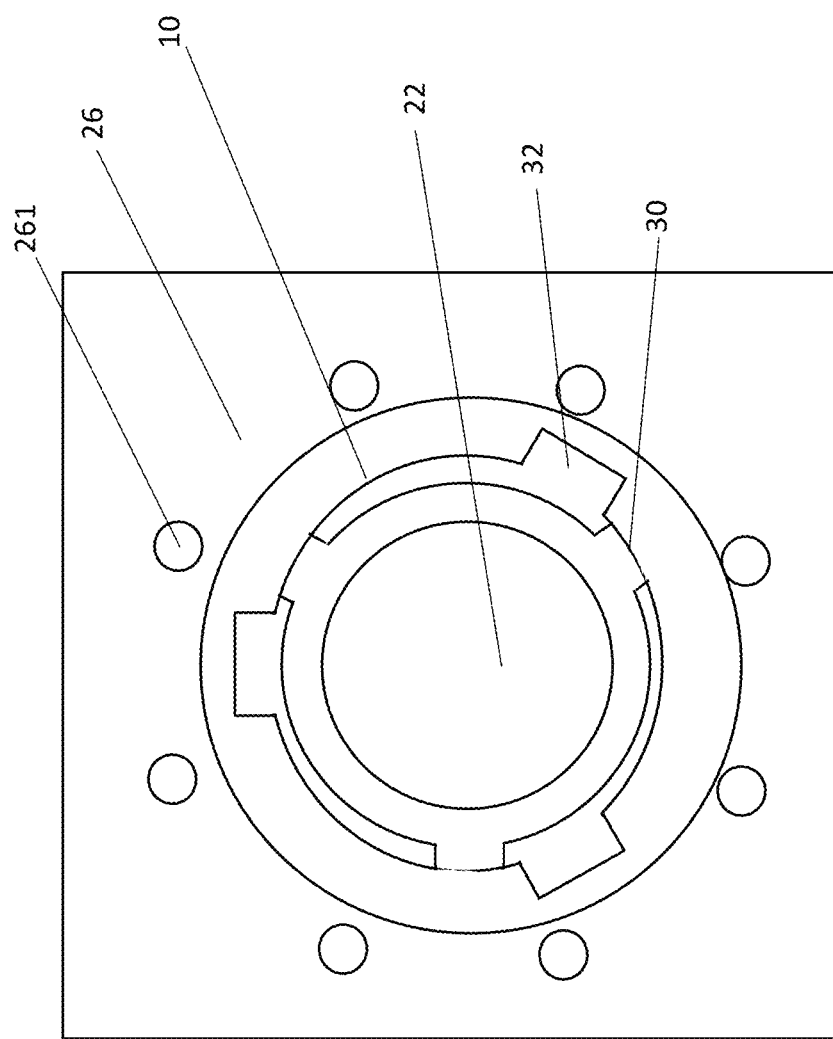
FIG. 11 illustrates an orthogonal front view of the transducer housing assembly shown in FIG. 10, with the lens housing secured in the housing.

The front portion 10 of the central housing 6 further includes a second opening 18. The lens housing 20 is inserted into the second opening 18 in order to engage the lens housing 20 with the central housing 6. In one embodiment, the lens housing 20 and central housing 6 are engaged by means of threading on the exterior surface of the lens housing 20 and on the interior surface of the second opening 18. In another embodiment, the lens opening 20 includes annular or helical grooves 58, within which sealing elements are attached. When the lens opening 20 placed into the second opening 18, the sealing elements engage with the interior surface of the second opening 18 and form a fluid-tight seal. In one embodiment, the sealing elements are O-rings. In yet another embodiment, the second opening 18 includes at least one engagement notch 32 and the lens housing 20 includes at least one engagement protrusion 30, as shown in FIG. 7. As shown in FIGS. 8-11, in order for the lens housing 20 to be placed within the second opening 18, the at least one engagement protrusion 30 of the lens housing 20 must align with the at least one engagement notch 32 of the second opening 18. After the lens housing 20 is placed within the second opening 18, the lens housing 20 is turned such that the at least one engagement protrusion 30 no longer aligns with the at least one engagement notch 32. In one embodiment, the lens housing 20 is easily separated from the central housing 6 by twisting the lens housing 20 and pulling it out. This is advantageous in the event that the lens housing 20 becomes damaged and needs to be replaced, or where lens housings 20 of different sizes are needed in order examine different parts of a component.

FIG. 6 illustrates an orthogonal exploded view of components of the transducer housing assembly shown in FIG. 5. The fluid connector 24 is able to be connected to one end of a conduit 36, such as a hose or a pipe. In one embodiment, the other end of the conduit 36 is connected to a fluid pump or fluid reservoir, from which fluid is able to be introduced through the conduit 36 and the fluid connector 24 into the sealed chamber. In another embodiment, the transducer housing assembly 4 is not connected to a fluid pump and fluid is added to the central housing 6 by other means, such as manual pouring.

In one embodiment, the fluid connector 24 includes a pressure relief valve, which allows fluid to escape when the volume of fluid exceeds the volume of the sealed chamber. The pressure relief valve therefore advantageously provides an adjustable volume of fluid into the sealed chamber, depending on the distance between the transducer 50 and the front end of the central housing 6. In one embodiment, the fluid connector 24 is able to be connected to a pump and air is pumped out of the sealed chamber before or while filling the chamber with a coupling fluid. Pumping out air helps to assure a lack of bubbles in the fluid, which improves the acoustic coupling path between the transducer 50 and a component to be tested. Furthermore, after testing has completed, the air pump is able to be used to pump air into sealed chamber, which assists in removing remaining fluid, reducing prolonged exposure to the coupling fluid, which could cause damage to the transducer housing assembly, such as corrosion.

Figure 12:
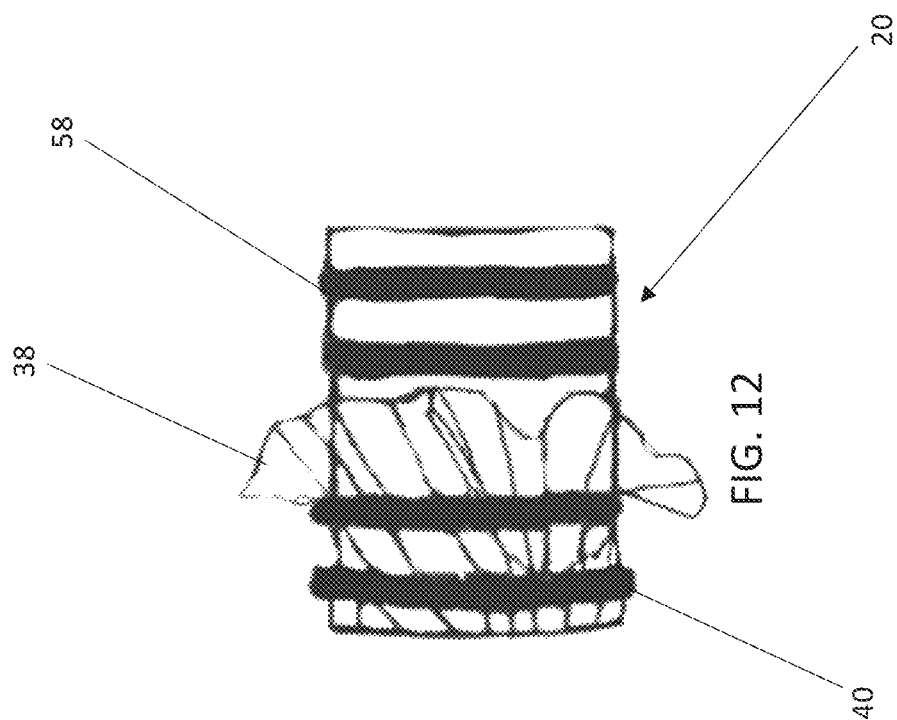
FIG. 12 illustrates an orthogonal view of a lens housing according to one embodiment of the present invention.

FIG. 12 illustrates an orthogonal view of a lens housing 20 according to one embodiment of the present invention. A membrane 38 is placed over the front end of the lens housing 20. The membrane 38 creates a fluid-tight seal on the front end of the lens-housing 20. When the lens housing 20 with the membrane 38 is placed into the central housing 6, a sealed chamber is formed within the central housing 6. The sealed chamber is a fluid-tight chamber, which is sealed by a combination of the interface between the coupling element 16 and first opening 12 of the back portion 8 of the central housing 6, the interface between the lens housing 20 and the second opening 18 of the front portion 10 of the central housing 6, the membrane 38, and the fluid connector 24. In one embodiment, the membrane 38 is secured to the lens housing 20 by at least one retainer 40. In one embodiment, the at least one retainer 40 includes at least one O-ring surrounding a portion of the lens housing 20 and pressing the membrane 38 tightly against the lens housing 20. Advantageously, in the event that membrane 38 is punctured or otherwise is unable to effectively seal the sealed chamber, it may easily be replaced by removing the retainer 40, refitting a new membrane, and then reapplying the retainer 40.

The membrane 38 is acoustically transparent or translucent with respect to fluid in the sealed chamber. The material used for the membrane 38 is selected to have a similar acoustic impedance, and therefore similar stiffness and density, as the fluid in the sealed chamber. In one embodiment, the fluid is water or another fluid with an index of refraction approximately equal to 1. In another embodiment, the index of refraction of the membrane 38 is between 0.9 and 1.2. In yet another embodiment, the membrane is made from AQUALENE.

As the frequency of the transducer 50 increases, the temporal resolution quality of the transducer increases. However, as the frequency of the transducer 50 increases, the depth of a material visible to the system decreases due to high frequency attenuation. In one embodiment, the transducer 50 is able to operate at frequencies between 1 and 50 MHz. In a preferred embodiment, the transducer 50 operates between 5 and 15 MHz.

An external couplant can be used to fill the gap between the transducer housing assembly 4 and the test material. In one embodiment, the external couplant is an acoustic gel, such as glycerin, couplant D12, couplant H, a shear wave couplant, or another suitable acoustic gel.

Figure 13:
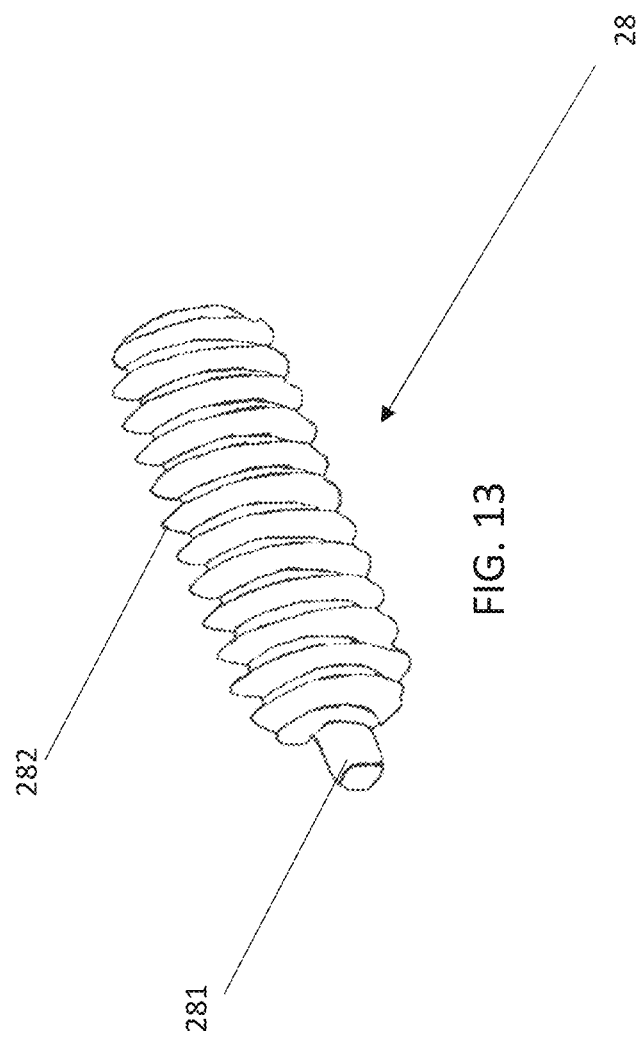
FIG. 13 illustrates an orthogonal side view of a surface offset element according to one embodiment of the present invention.

FIG. 13 illustrates an orthogonal side view of a surface offset element according to one embodiment of the present invention. In one embodiment, the surface offset elements 28 include pins 281 attached to a biasing member 282. The biasing member 282 allows the surface offset elements 28 to retract when pressed against the surface of a test material. Furthermore, when the pin 281 is pressed against a test material, the biasing member 282 is able to absorb some of the displacement that would otherwise be imparted to the test material through a force or the transducer housing assembly 4, preventing potential damage to both the transducer housing assembly 4 and the test material. In one embodiment, the degree to which the surface offset elements 28 are able to retract is limited by a stop. When the front of the transducer housing assembly 4 is pressed against a component to be tested, the surface offset elements 28 contact the component first, which prevents damage to the component or to the transducer housing assembly 4 that can be caused by quick and direct contact between the lens housing 20 and the component. Furthermore, by providing a stop to limit the retraction of the surface offset elements 28, the lens housing 20 is able to stay at a fixed and known distance from the component, which allows for improved accuracy during the testing process. In another embodiment, the surface offset elements 28 are threadably connected to the front portion 10 of the central housing 6 and can be manually adjusted before use with different test materials. In one embodiment, the transducer housing assembly 4 operates at an offset distance from the test material approximately equal to one half the thickness of the test material.

In one embodiment, the distance that the transducer housing assembly 4 is offset from the test material is determined using a calibration wave. An initial wave is transmitted via the transducer into the test material. Time of flight data is gathered regarding ultrasonic waves reflecting off of a membrane covering the opening 22 of the lens housing 20, waves reflecting off the front surface of the test material, and waves reflecting off the back surface of the test material. Without the need to input material properties or dimensions of the test material, the transducer housing assembly 4 is able to automatically offset by a fixed distance from the test material based on the results of the time of flight data. In another embodiment, the material properties of the test material, such as the speed of sound, and dimensional data of the test material, such as the thickness, is manually entered, allowing the transducer housing assembly 4 to automatically offset by a fixed distance from the test material without the need for a calibration wave.

Figure 14:
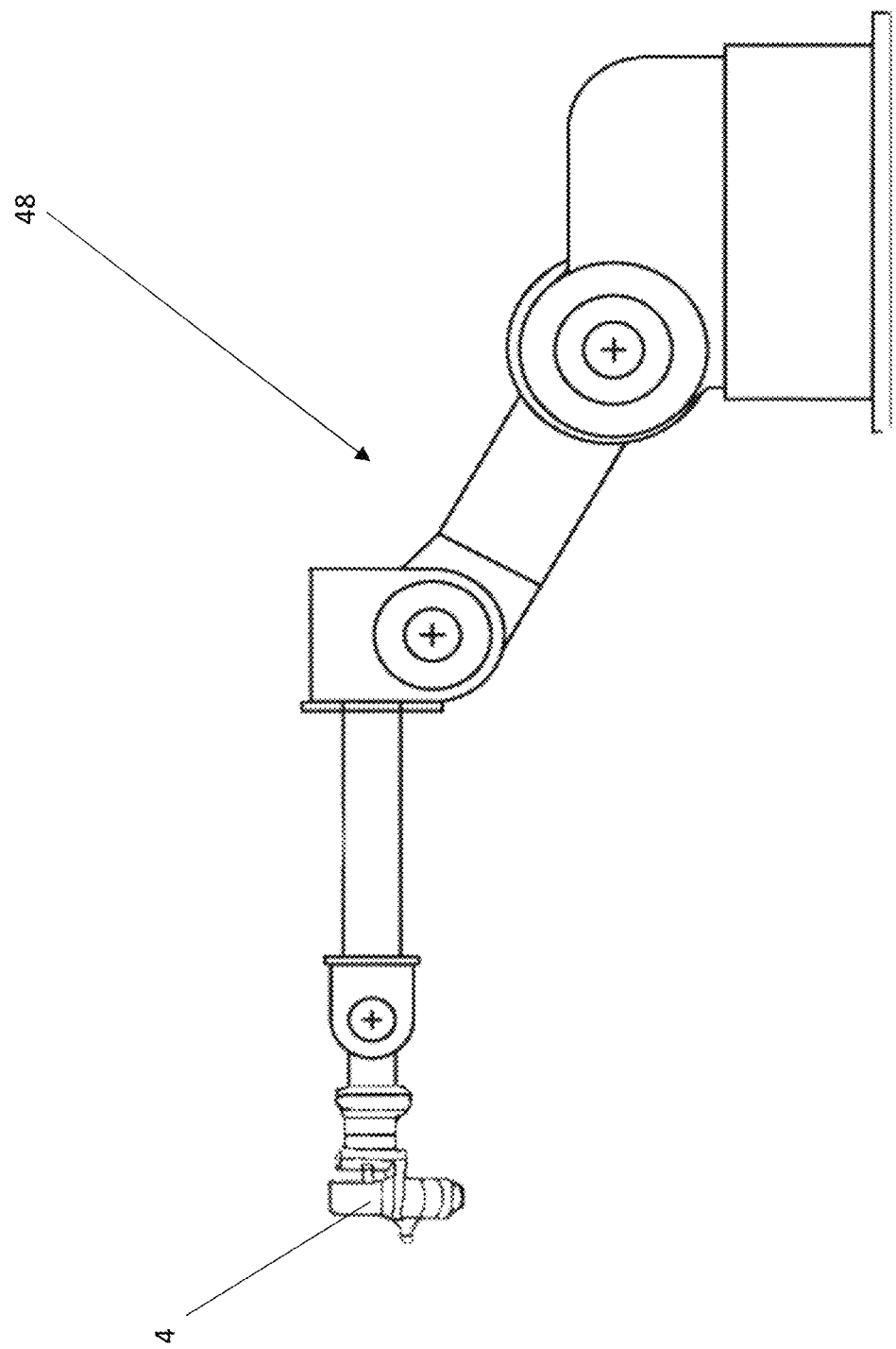
FIG. 14 illustrates an orthogonal side view of a transducer housing assembly mounted on a robotic arm.

FIG. 14 illustrates an orthogonal side view of a transducer housing assembly mounted on a robotic arm. The attachment bore 261 is able to receive a screw, bolt, pin, or other affixing means attached to a robotic arm 48. The robotic arm 48 both allows the transducer housing assembly 4 to reach tighter spaces and allows the device to be held steadily for the duration of the testing, increasing the accuracy of the test. In another embodiment, the mounting bracket 26 is attached to a translation stage. The translation stage operates to move the transducer housing assembly 4 to different positions along an X-Y plane. This is especially advantageous in situations wherein the operator desires to scan large sections of a relatively flat test material.

In one embodiment, the transducer housing assembly 4 is attached to an array element. In another embodiment, the array element includes attachment points for more than one transducer housing assembly 4, allowing multiple transducer housing assemblies 4 to be attached to a single array element, which acts as an array of transducers. The array of transducers is therefore able to scan multiple points of a test material simultaneously, with each individual transducer housing assembly 4 being adjustable, so as to allow the array of transducers to scan components with uneven surfaces or scan components having multiple different material types.

In another embodiment, the transducer housing assembly 4 is manually operated. By way of example, the transducer housing assembly 4 may be placed into an assembly attached to the test material. An operator is then able to manually slide the transducer housing assembly 4 within the assembly while the assembly ensures that the transducer housing assembly 4 remains at a substantially fixed distance from the test material. In still another embodiment, the transducer housing assembly 4 is able to automatically move to a plurality of different points on the test object based on preset position data entered into a computer or attached display.

Figure 15:
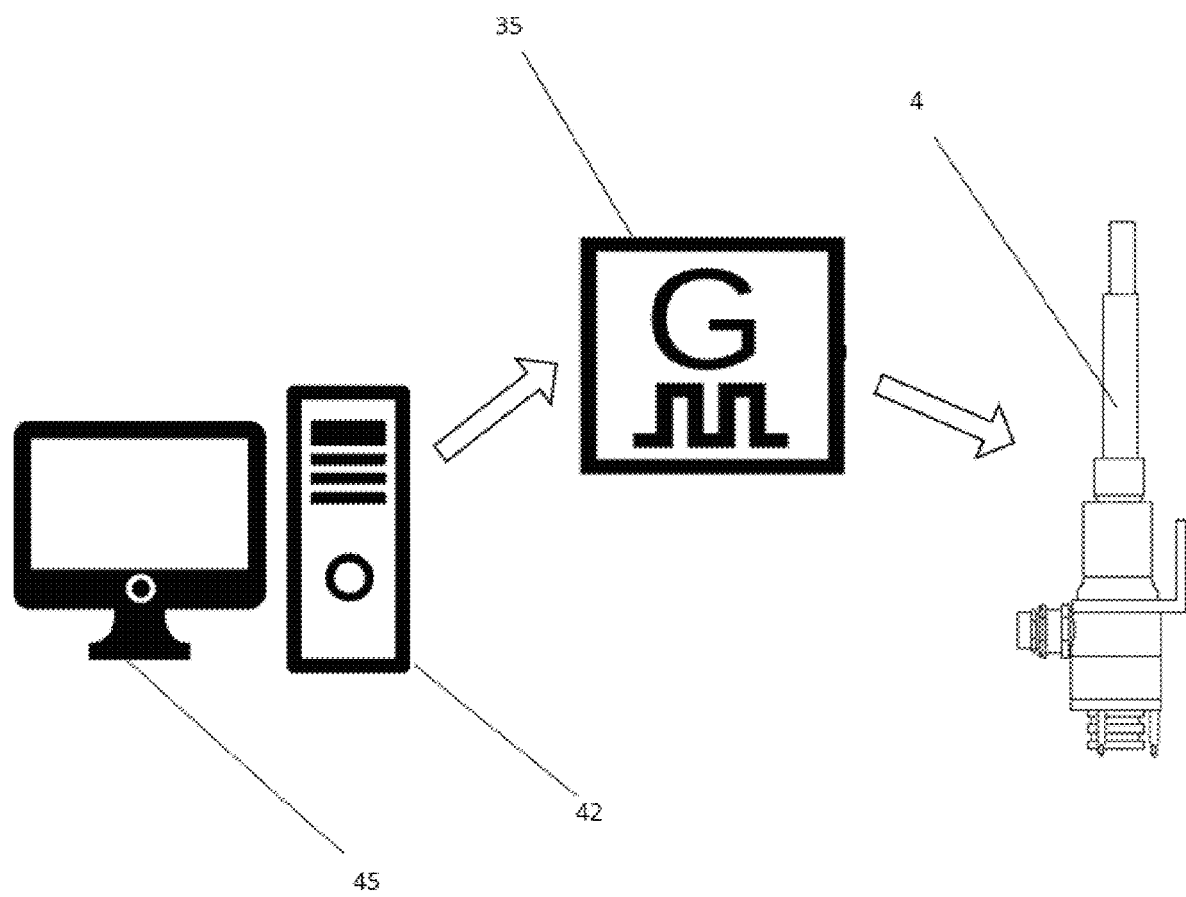
FIG. 15 is a schematic diagram of a transducer housing assembly in communication with a processor and a display means according to one embodiment of the present invention.

FIG. 15 is a schematic diagram of a transducer housing assembly in communication with a processor and a display means according to one embodiment of the present invention. The transducer housing assembly 4 is connected to a pulser receiver 35, which generates a waveform from the signal produced by the transducer within the transducer housing assembly 4. The waveform is then processed by a processor 42 in communication with the pulser receiver 35 to produce one or more visualizations of the data that are displayed by a display means 45.

Figure 16:
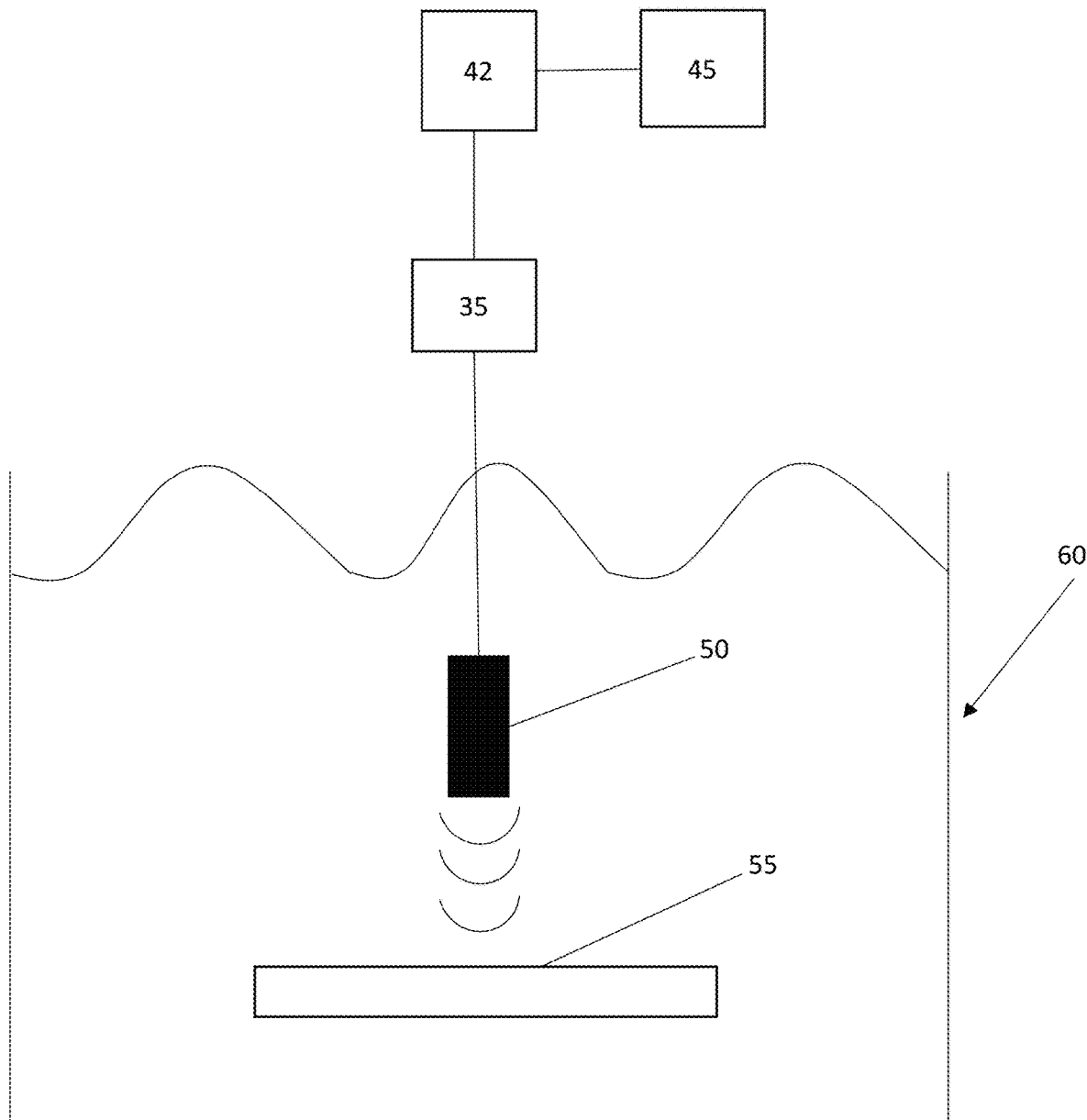
FIG. 16 illustrates an immersion tank transducer configuration for use in one embodiment of the present invention.

FIG. 16 illustrates an immersion tank transducer configuration for use in one embodiment of the present invention. In one embodiment, the transducer 50 used to produce the ultrasonic waves and receive a signal from a test material 55 is not within a transducer housing assembly 4 and is acoustically coupled with the test material 55 via an immersion tank 60. The transducer 50 is connected to a pulser receiver 35, which generates a waveform from the signal produced by the transducer 50. The waveform is then processed by a processor 42 in communication with the pulser receiver 35 to produce one or more visualizations of the data that are displayed by a display means 45.

2. Data Input and Calibration

Figure 17:
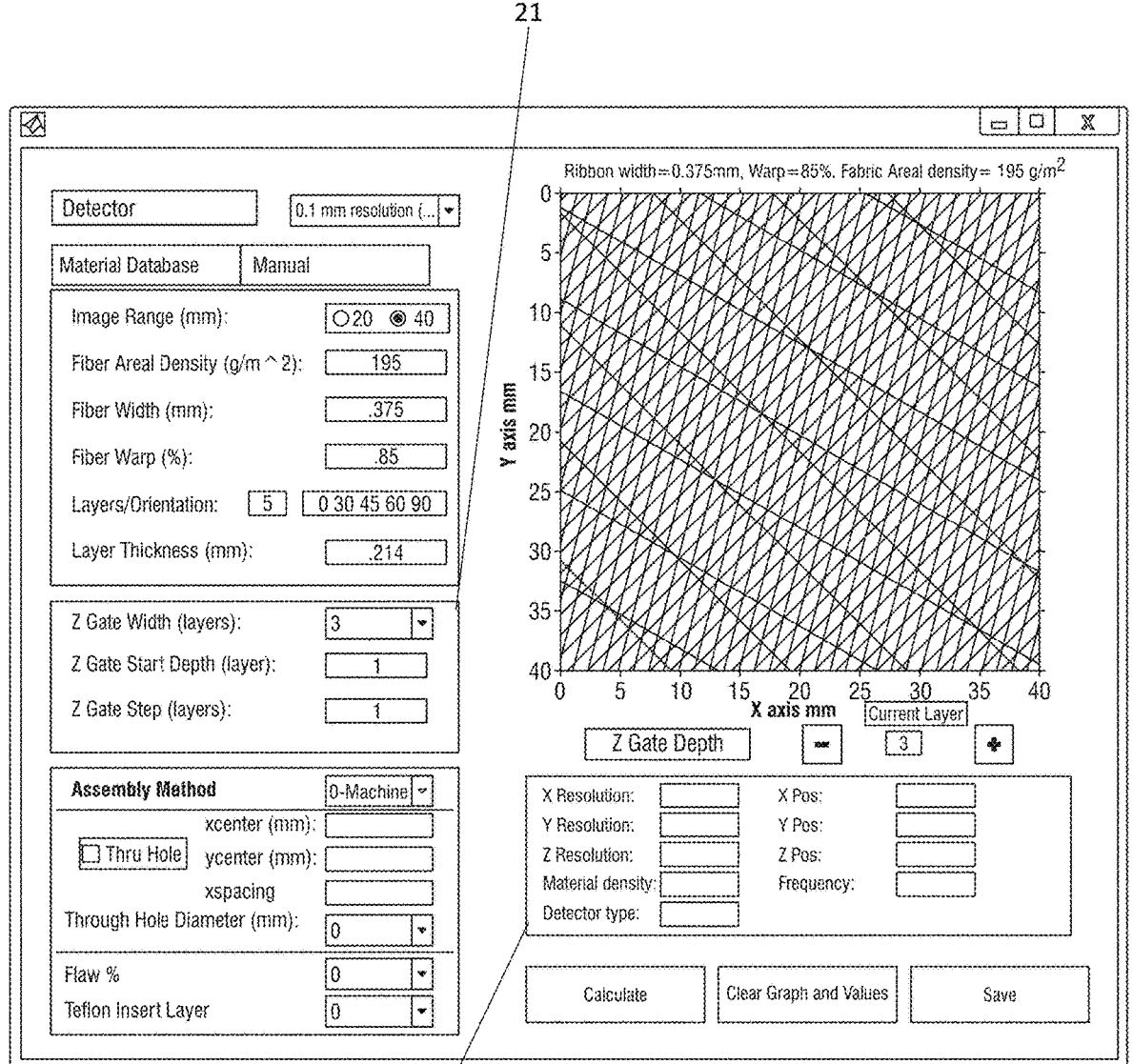
FIG. 17 illustrates a data input screen according to one embodiment of the present invention.

FIG. 17 illustrates a data input screen according to one embodiment of the present invention. As shown in FIG. 17, the GUI allows a user to enter parameters for the test material to be tested. In one embodiment, the user is able to select materials from a predetermined material database, which includes specific listings mentioning the fiber width, fiber wrap, number of layers of the composite, layer thickness, fiber areal density, speed of sound, stiffness, and/or other material and physical properties of the material, in addition to more general listings, such as "fiberglass" or "carbon fiber," which provide quantities like the speed of sound for the material without more detailed information regarding the layering of the material. In another embodiment, the user enters mechanical and physical properties of the test material manually, selecting qualities such as the speed of sound, stiffness, thickness of the material, and/or other material and physical properties of the material. The user is able to select the option to save manually entered materials into the material database in order to more easily select those materials at a later date. In yet another embodiment, the GUI includes an option to use a calibration wave to gather the parameters of the material and no material parameters need to be entered by the user before testing of the device.

In one embodiment, a user is able to select parameters for the data output, such as the X, Y, and Z resolution of the scan via a coordinate selection module 31. Additionally, for situations in which the transducer is coupled to a robotic arm, translation stage, or array element, the user is able to select an X, Y, or Z position at which the scan should commence or a range of X, Y, and Z positions across which the transducer should move via the coordinate selection module 31. In one embodiment, the range of X, Y, and Z positions is selected by manually entering data points for each coordinate through the coordinate selection module 31. In another embodiment, the GUI features a virtual projection of a plane and allows the user to drag and drop a virtual device in order to indicate the path along which the transducer should move.

In one embodiment, the user is able to select a z-gate start time and a z-gate end time, defining a gate region for the scan via a z-gate selection module 21. Selecting the gate region allows the system to determine between which depths of the test material to take intensity data from A-scans in order to compile a C-scan for the test material. In another embodiment, the gate is moved through the entirety of the A-scan, creating a plurality of C-scans that form a 3-D image of the material.

Existing systems utilize a method of gating, wherein a designated gated region is the only portion of a waveform that is retrieved and processed by the system. Therefore, in order to analyze, for example, 50 different gated regions within a material, existing systems would need to scan the material 50 different times, one for each designated gate region. The present system improves upon existing systems by retrieving the full waveform for each A-scan of a material. References to selection of a z-gate start time, z-gate end time, or gate regions in the present application refer not to a hardware limitation on what portions of the waveform are designated to be received, but instead refer to which areas of the fully retrieved waveform are analyzed for a particular purpose. By analyzing the full waveform from a material, the present system improves upon existing systems both in the amount of time taken in to scan the material and the resolution of images generated for the material.

3. Foreign Object Detection

One common issue with manufacturing composites is the remainder of foreign objects, such as portions of gloves, paper, tape, or other objects used during the manufacture of the composite. The presence of such foreign objects in a composite facilitates the formation of cracks within the composite, the propagation of which frequently causes parts to fail. Furthermore, the different material properties of the foreign object contribute to decreased strength of the composite, also leading to an increased chance of failure.

Current ultrasonic testing systems lack adequate resolution sizes to detect many of the most commonly sized foreign objects. Foreign objects capable of causing issues within a test material are often as small as 1 mm$^2$, meaning that testing systems require high accuracy in order to even report the presence of the objects, let alone precise and accurate data regarding the size of the objects. One study entitled "Improving Depth Resolution of Ultrasonic Phased Array Imaging to Inspect Aerospace Composite Structures" by Mohammadkhani et al., which is hereby incorporated in its entirety, tested a series of foreign objects made of several different materials, each of which were square pieces having an area of approximately 36 mm2. The study found that for a Teflon piece, an automated method of detecting the size of the object overestimated by 43.8%, while a manual method underestimated by 17%. Results with other materials were even further off, with the automated method underestimating the size of a peel ply defect by 66.7% and the manual method underestimating its size by 77%.

In one embodiment, the present invention is directed to a system able to detect foreign objects of sizes as small as 5 mm2 and report the areas of the objects with an error lower than 10%. In another embodiment, the present invention is directed to a system able to detect foreign objects of sizes of 1 mm2 or greater and report the areas of the objects with an error lower than 25%. In still another embodiment, the present invention is directed to a system able to detect objects with diameters less than 15 mm and report the diameters of the objects with an error of less than half a millimeter. In yet another embodiment, the present invention is directed to a system able to detect objects with diameters less than 5 mm and report the diameters of the objects with an error of less than 0.1 mm. In one study, Teflon pieces of four different sizes (denoted by different letters) were placed at three different depths (denoted by different numbers) each within a 12-lamina composite, with the first depth being between laminas 3 and 4 of the composite, the second depth being between laminas 6 and 7 of the composite, and the third depth being between laminas 9 and 10 of the composite. Those results are shown below in Tables 1 and 2.

TABLE 1

Teflon Object True Area vs. Detected Area

| Object | True Area [mm$^2$] | Testing Area [mm$^2$] | Area Error [%] |
|---|---|---|---|
| A1 | 126.71 | 133.25 | 5% |
| A2 | 123.99 | 127.63 | 3% |
| A3 | 123.88 | 124.73 | 1% |
| B1 | 28.87 | 30.63 | 6% |
| B2 | 29.67 | 30.23 | 2% |
| B3 | 29.13 | 28.43 | −2% |
| C1 | 7.52 | 9.59 | 28% |
| C2 | 7.67 | 8.01 | 4% |
| C3 | 7.52 | 6.82 | −9% |
| D1 | 1.81 | 1.82 | 0% |
| D2 | 1.99 | 1.80 | −10% |
| D3 | 1.81 | 1.34 | −26% |

TABLE 2

Teflon Object True Diameter vs. Detected Diameter

| Object | True Diameter [mm] | Testing Diameter [mm] | Diameter Error [mm] |
|---|---|---|---|
| A1 | 12.70 | 13.03 | 0.323 |
| A2 | 12.56 | 12.75 | 0.183 |
| A3 | 12.56 | 12.60 | 0.043 |
| B1 | 6.06 | 6.24 | 0.182 |
| B2 | 29.67 | 30.23 | 0.057 |
| B3 | 29.13 | 28.43 | 0.073 |
| C1 | 7.52 | 9.59 | 0.400 |
| C2 | 7.67 | 8.01 | 0.068 |
| C3 | 7.52 | 6.82 | 0.148 |
| D1 | 1.81 | 1.82 | 0.002 |
| D2 | 1.99 | 1.80 | 0.081 |
| D3 | 1.81 | 1.34 | 0.213 |
| AVERAGE | | | 0.148 |

Figure 18:
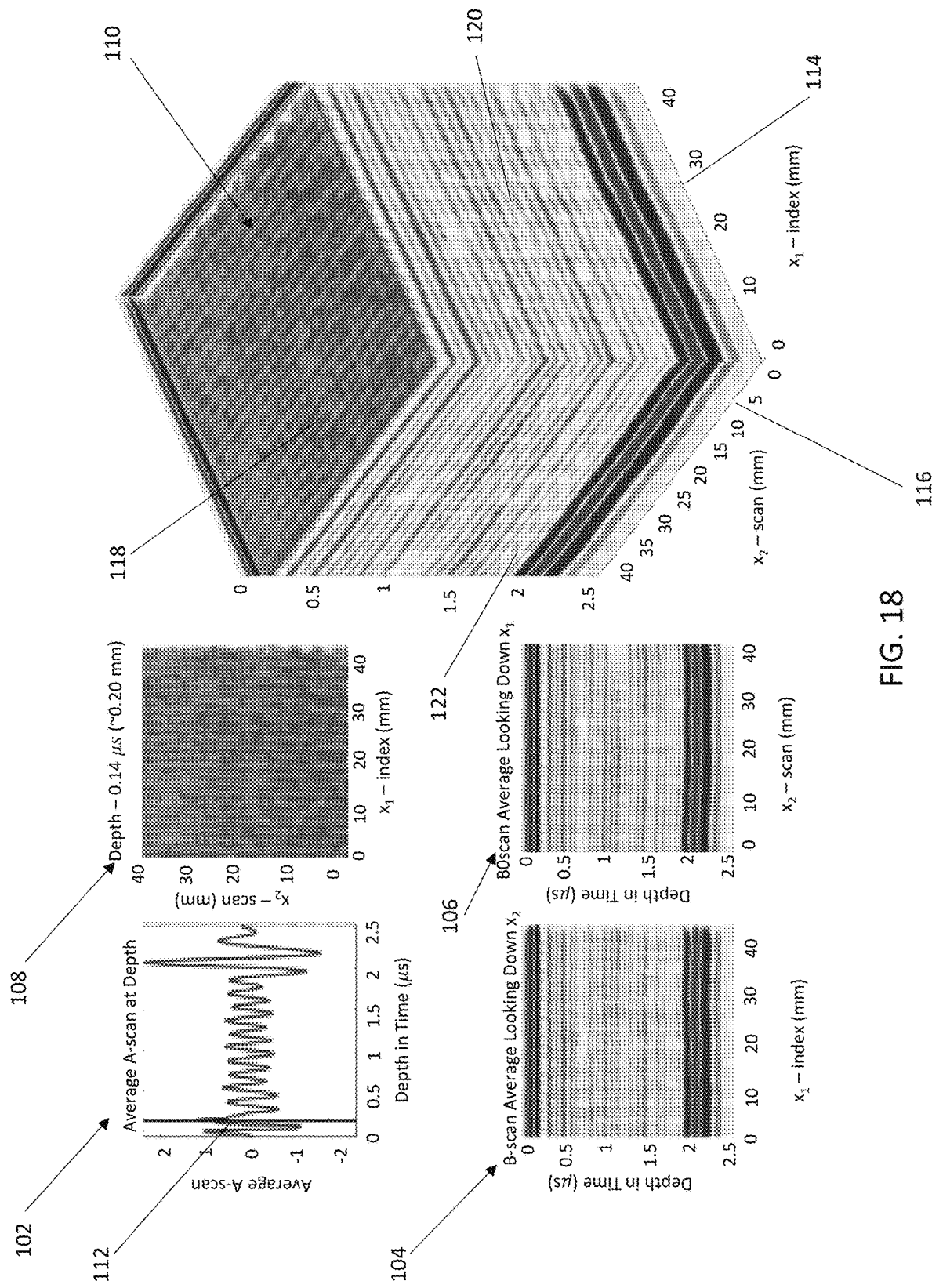
FIG. 18 illustrates a group of graphical representations of a test material provided by one embodiment of the present invention.

FIG. 18 illustrates a group of graphical representations of a test material provided by one embodiment of the present invention. As shown in FIG. 18, the GUI is capable of providing a single view with a corresponding A-scan image 102, B-scan images 104, 106, C-scan image 108 and a three-dimensional (3-D) layered image 110, constructed by combining data from corresponding B-scan images 104, 106 and C-scan images 108. The A-scan image 102 represents an average amplitude value for signals returning at a given time. As the values on the A-Scan image 102 represent averages, it is unlikely that the A-scan image 102 by itself would be able to show defects in the test material unless the defects persisted across the entire cross section of the material. However, the difference in amplitudes over time in the A-scan image 102 is useful for characterizing different layers of the laminate or large scale delaminations within the material. A reference line 112 on the A-scan image 102 indicates a depth within the test material, which is the same depth at which the C-scan image 108 displays a cross-sectional surface of a layer of the test material and is the depth at which the 3-D layered image 110 displays a cross-section of the test material.

The B-scan images 104, 106 include a first B-scan image 104 showing the cross-section of the test material parallel to a first axis 114 and a second B-scan image 106 showing the cross-section of the test material parallel to a second axis 116, such that the first B-scan image 104 and the second B-scan image 106 display cross-sections that are orthogonal to one another. The 3-D layered image 110 includes a top surface 118 equivalent to the C-scan image 108, a first side surface 120 equivalent to the first B-scan image 104, and a second side surface 122 equivalent to the second B-scan image 106.

As the ultrasonic testing device is performing the scan, the 3-D layered image 110 increases in height until the testing is complete. In one embodiment, after the testing has been completed, a user of the GUI selects a time point, which causes the GUI to display versions of the C-scan image 108 and the 3-D layered image 110 taken during the testing at the selected time point. In one embodiment, the time point is selectable by dragging the reference line 112 on the A-scan image 102. In another embodiment, the user selects the time point by entering in a number value associated with the time point.

Figure 19:
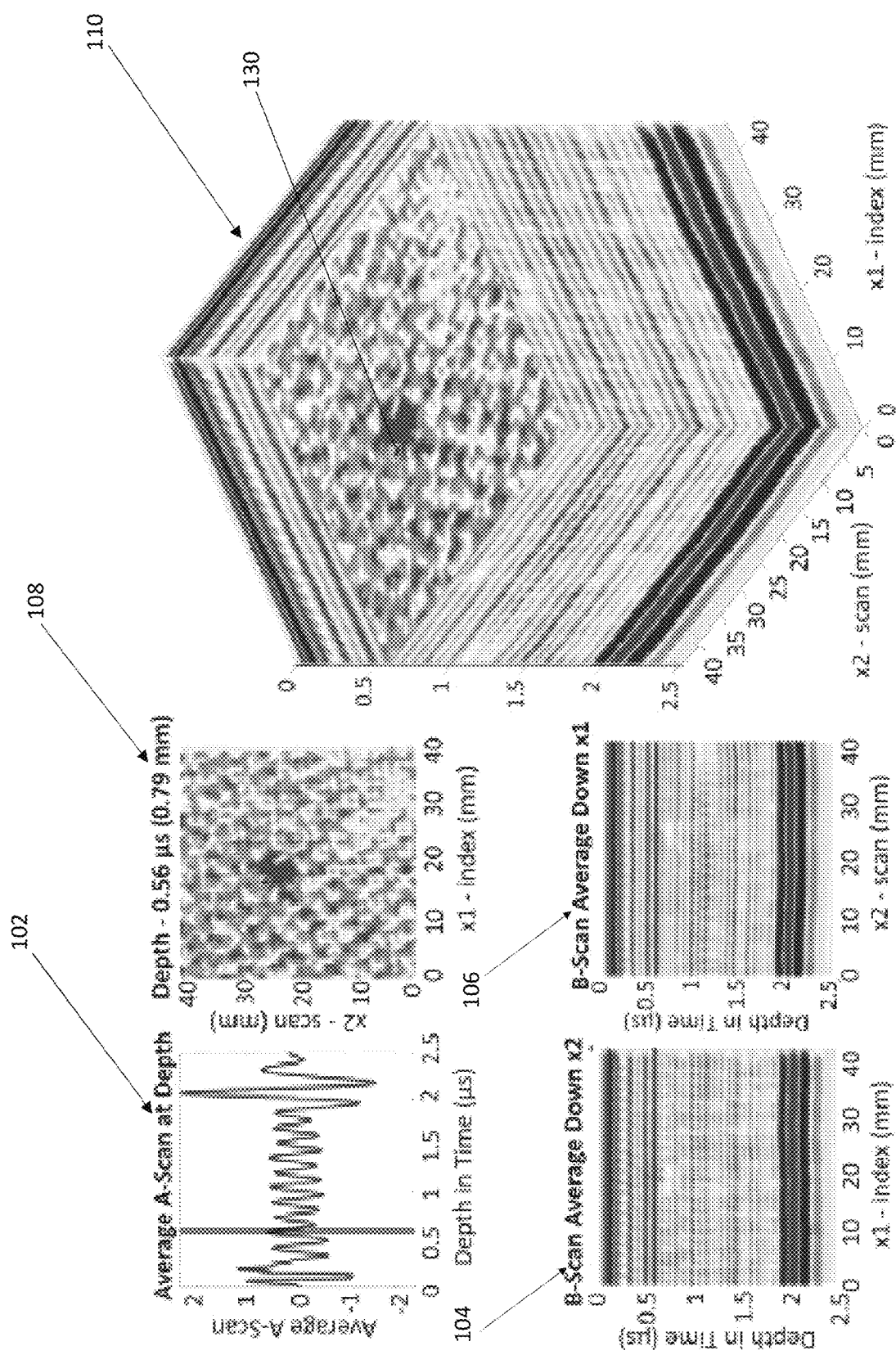
FIG. 19 illustrates a group of graphical representations of a test material provided by another embodiment of the present invention.

As shown in FIG. 19, in one embodiment, a foreign object 130 is represented as an area of color substantially different from the color of the surrounding area. The foreign object 130 often presents itself as an area on one or more C-scan images 108 of the GUI, but in some instances, presents itself on the B-scans images 104, 106, depending on where the foreign object is in the material. In another embodiment, the foreign object 130 does not appear as a different color and instead, the 3-D layered image 110 is presented as a 3-D textured map, with the foreign object 130 being indicated as a recession or impression in the surface of the image 110.

Figure 20:
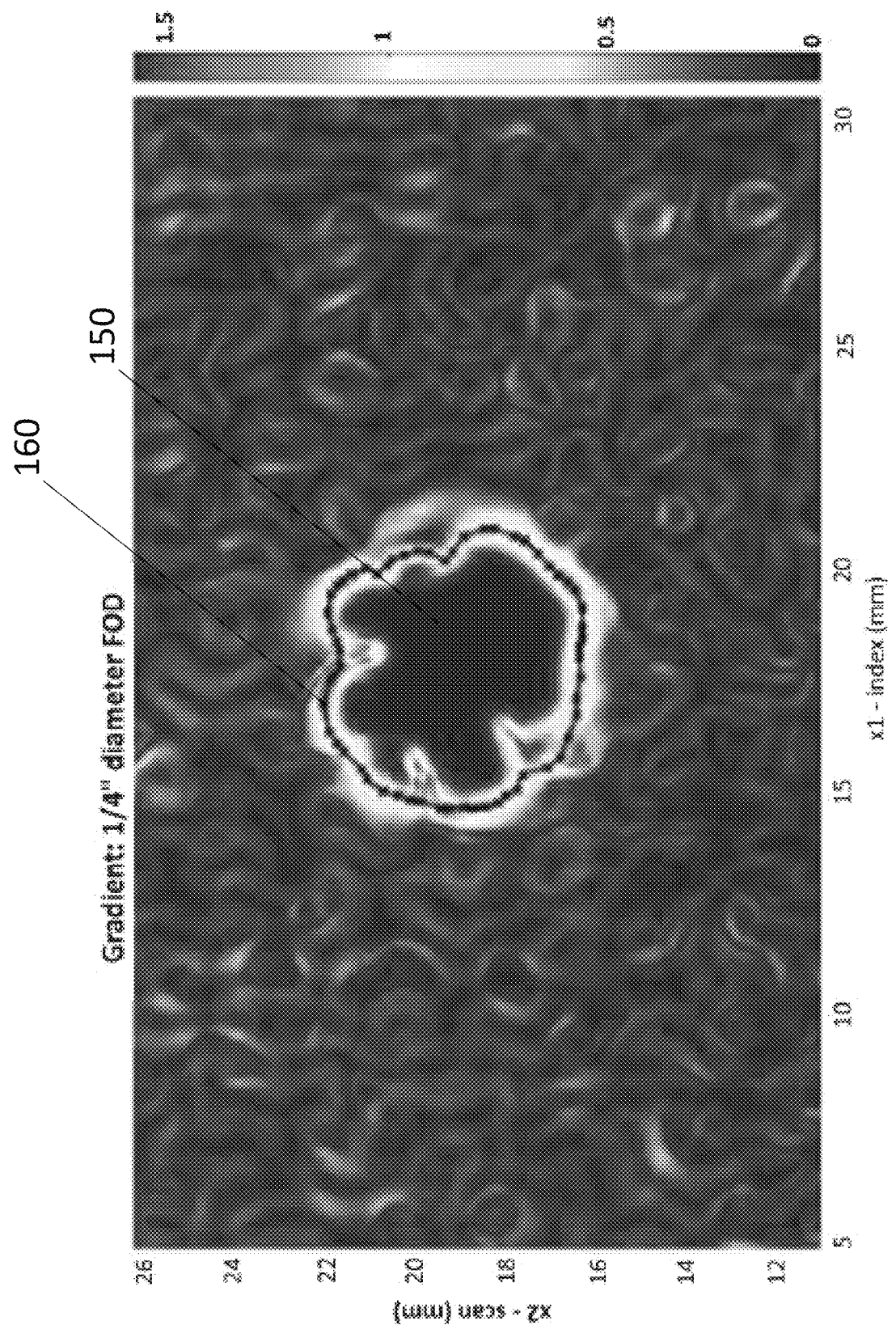
FIG. 20 illustrates a graphical representation of a foreign object in a test material provided by one embodiment of the present invention.

FIG. 20 illustrates a graphical representation of a foreign object in a test material provided by one embodiment of the present invention. FIG. 20 provides a A-scan amplitude gradient map for a cross section of the test material. By plotting the gradient of the A-scan amplitude for each point along a cross-section of the material, a user is better able to visualize areas where there is a large shift in the acoustic impedance within the composite. These areas often correspond to foreign objects 150, as there is a strong acoustic impedance difference between the foreign object 150 and the surrounding composite material. In one embodiment, the GUI includes an editing tool enabling a user to hand trace an enclosed area 160 of the cross-sectional gradient map. The system is then capable of providing data regarding the area of the foreign object 150 and the diameter of the material at specific X or Y coordinates of the cross-sectional gradient map. In another embodiment, the system includes an artificial intelligence that automatically traces out the location of likely foreign objects 150 and provides information regarding area and diameter of the object.

Foreign objects are distinguishable from air pockets or pores, which are frequently caused by different defects such as cracks or delaminations, in the output data and graphical representations produced by the present invention. Because the difference in acoustic impedance between air and a composite material is very high, very few waves or waves of very low amplitude are typically received and detected that travel to areas within the test material beyond an air pocket within the test material. Therefore, A-scans of regions with such defects frequently show a signal similar to the back wall of the material, namely a very sharp spike in amplitude followed by very little activity, at the point where air pocket causing defects are located. However, because foreign objects typically have an acoustic impedance that is closer to that of the overall laminate than air, such objects typically show a small A-scan spike and parts of the test material beyond the foreign object often still return detectable signals. Therefore, the system is able to distinguish between the presence of foreign objects in the material and the presence of air pockets caused by delaminations or cracks, which is useful as the two different defects often have noticeably different effects on the properties of the overall test material. Moreover, in one embodiment, the system includes a material database containing a list of materials with acoustic impedance values for each material. If the properties of a material match one of the materials listed in the material database, then the GUI will return a matching material or a list of potentially matching materials for the user.

In another embodiment, the system includes an artificial intelligence. The artificial intelligence is capable of identifying defects via analysis of the C-scan image 108, the B-scan images 104, 106, and/or the 3-D layered image 110. In one embodiment, the defect identified by the artificial intelligence is a defect 130 visible in a cross-sectional view provided by the C-scan image 108. In another embodiment, a defect is only visible between layers and can only be observed from the B-scan images 104 and 106. In yet another embodiment, the artificial intelligence is capable of identifying defects in the test material that are not easily identifiable by a user via the A-scan, B-scan, and C-scan data associated with the images provided by the GUI.

4. Bond Line Thickness

The integrity of an adhesive between two composite laminates or between a composite laminate and an underlying substrate is key to maintaining desired mechanical properties for the composite laminate. When the bond line thickness between two or more materials, which together form a single combined material, is too thin, the failure load is reduced and so-called kissing bonds or complete disbonds can develop. Kissing bonds occur where a small gap forms between the adhesive and one or more of the materials joined by the adhesive. The gaps formed in kissing bonds are small enough that they are not detectable by current systems available on the market, meaning that while the adhesive appears to be in contact with an adjacent material in a scan, the materials are actually not mechanically and/or chemically coupled. Too large of a disbond between two materials causes premature failure, as the two materials separate entirely under certain loading conditions or cause weakening of the strength of the combined material by a shift of the failure mode of the adhesively bonded structure.

Additionally, when the bond line thickness between two materials is too large, the combined material can suffer from an uneven distribution of bond strength, which can cause load to be unevenly distributed and therefore lead to premature failure of the part. Furthermore, uneven thickness along a bond line can cause issues where the combined material performs differently when loads are applied on different areas or at different angles to the composite laminate, reducing the load carrying capacity and making mechanical performance of the combined material more difficult to accurately predict.

Currently there is no known method of directly measuring spatial variations in bond line thickness using ultrasonic techniques. It is common in the industry today to make use of manufactured calibration wedges with known bond line thicknesses. By comparing signals received from a test material and those from the calibration wedge, technicians attempt to approximate bond line thickness. However, this technique requires that calibration wedges be made for each material and has a precision dependent on the number of calibration wedges used and the difference between thicknesses of the calibration wedges.

Figure 21:
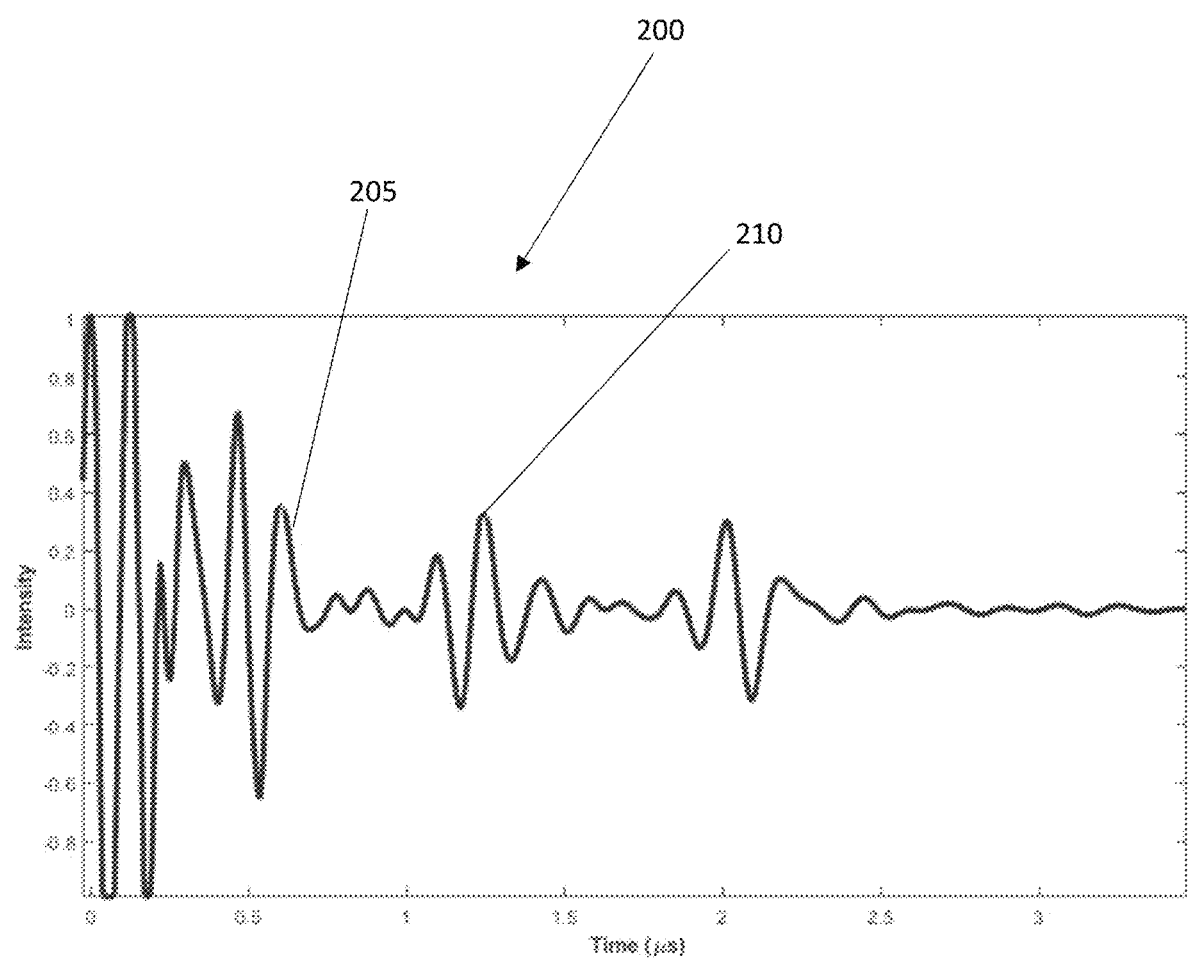
FIG. 21 illustrates an A-scan image generating by one embodiment of the present invention.

FIG. 21 illustrates an A-scan image generating by one embodiment of the present invention. In one embodiment, the depth of a top surface of the adhesive layer at a first point is calculated by taking an A-scan 200 for the first point and finding the final peak 205 before a sharp drop off in amplitude, while the depth of a bottom surface of the adhesive layer is defined as the next maximum intensity peak 210, as shown in FIG. 21.

Figure 22:
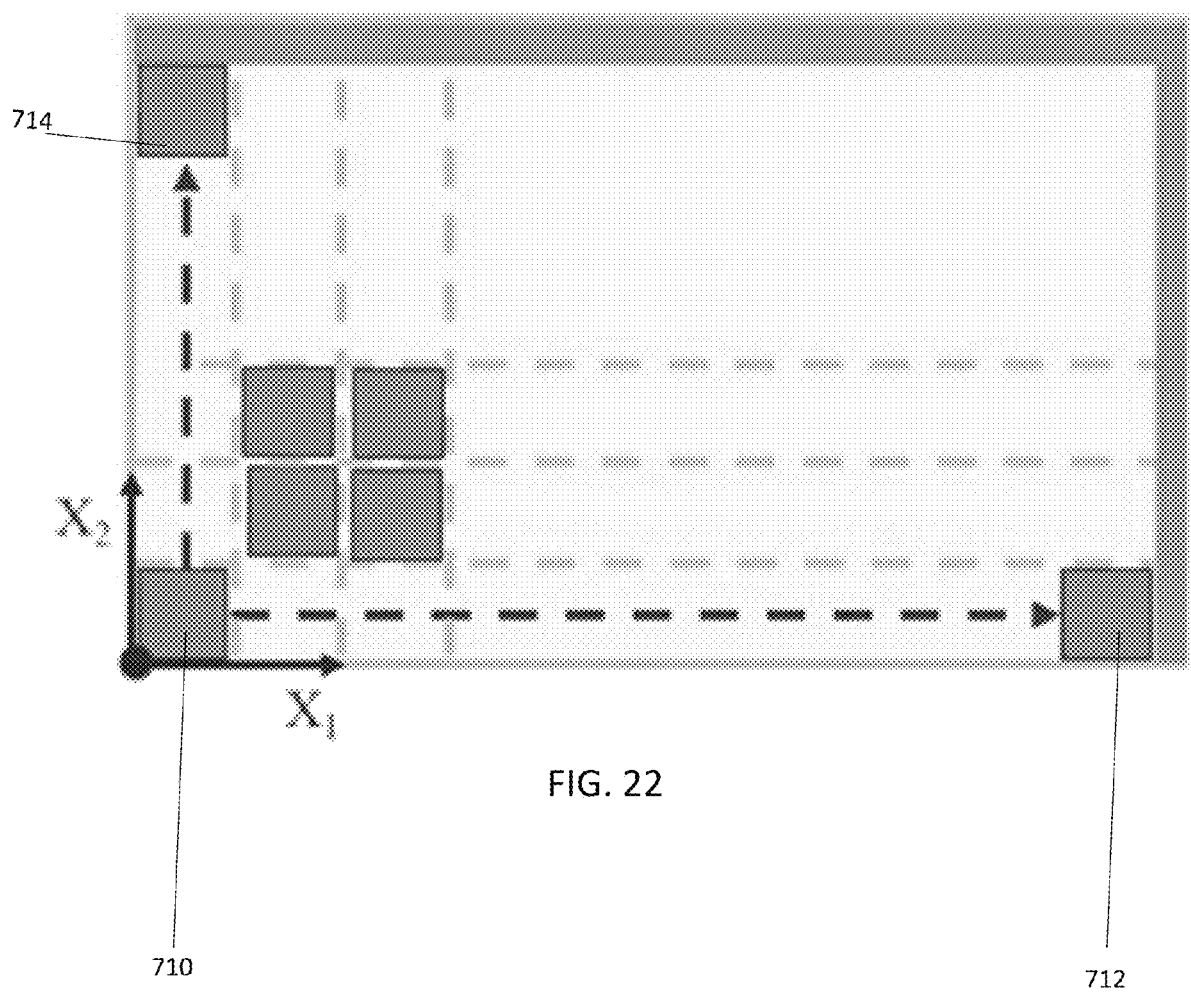
FIG. 22 illustrates a first step in an algorithm used to calculate the depth of an adhesive layer according to one embodiment of the present invention.

FIG. 22 illustrates a first step in an algorithm used to calculate the depth of an adhesive layer according to one embodiment of the present invention. In one embodiment, a series of A-scans are taken of the test material at defined intervals along the axes $X_1$ and $X_2$. The A-scans are divided into groupings, wherein each grouping consists of A-scans covering approximately the same area of the test material. A series of B-scans corresponding to different depths within a gated region are generated for an initial grouping 710, and the system calculates a maximum intensity value for each of the series of B-scans for each of the groupings. A series of B-scans are also generated for a plurality of groupings having the same $X_1$ value as the initial grouping 710 up to a final $X_1$ grouping 712 and for a plurality of groupings having the same $X_2$ value as the initial grouping 710 up to a final $X_2$ grouping 714. For each of the plurality of groupings having the same $X_1$ value as the initial grouping 710 and for each of the plurality of groupings having the same $X_2$ value as the initial grouping 710, the system calculates a maximum intensity value for each of the series of B-scans.

Figure 23:
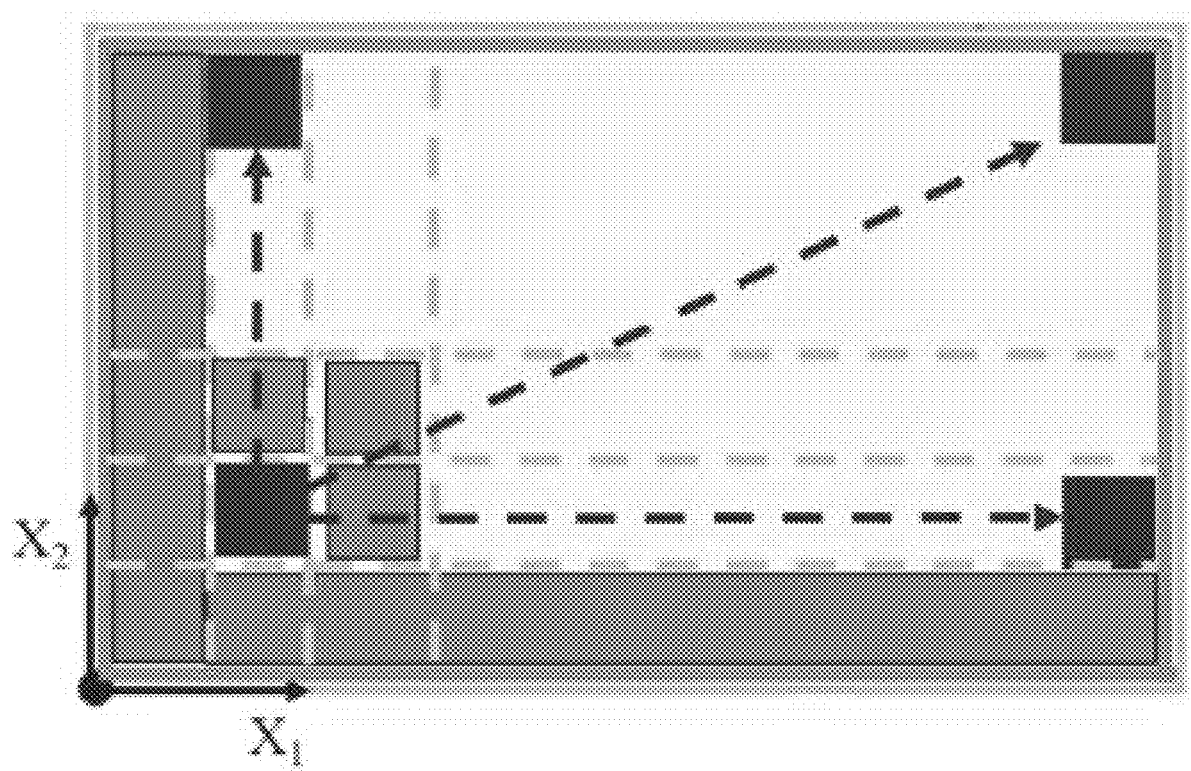
FIG. 23 illustrates a subsequent step in the algorithm used to calculate the depth of an adhesive layer of FIG. 22.

As shown in FIG. 23, after calculating the maximum intensity values for each of the series of B-scans, the system calculates the depth of the top and bottom surfaces of the adhesive bond line for a point adjacent to two groupings for which the maximum intensity value was calculated. The maximum intensity value for the groupings adjacent to the point serve as initial guesses, or seeds, in calculating the depths of the top and bottom surfaces of the adhesive layer at that point. The calculated depths of the top and bottom surfaces of the adhesive layer at each point serve as initial guesses, or seeds, for each subsequent adjacent point until the depths of the top and bottom surfaces for each point in the scanned area of the test material are calculated.

Figure 24:
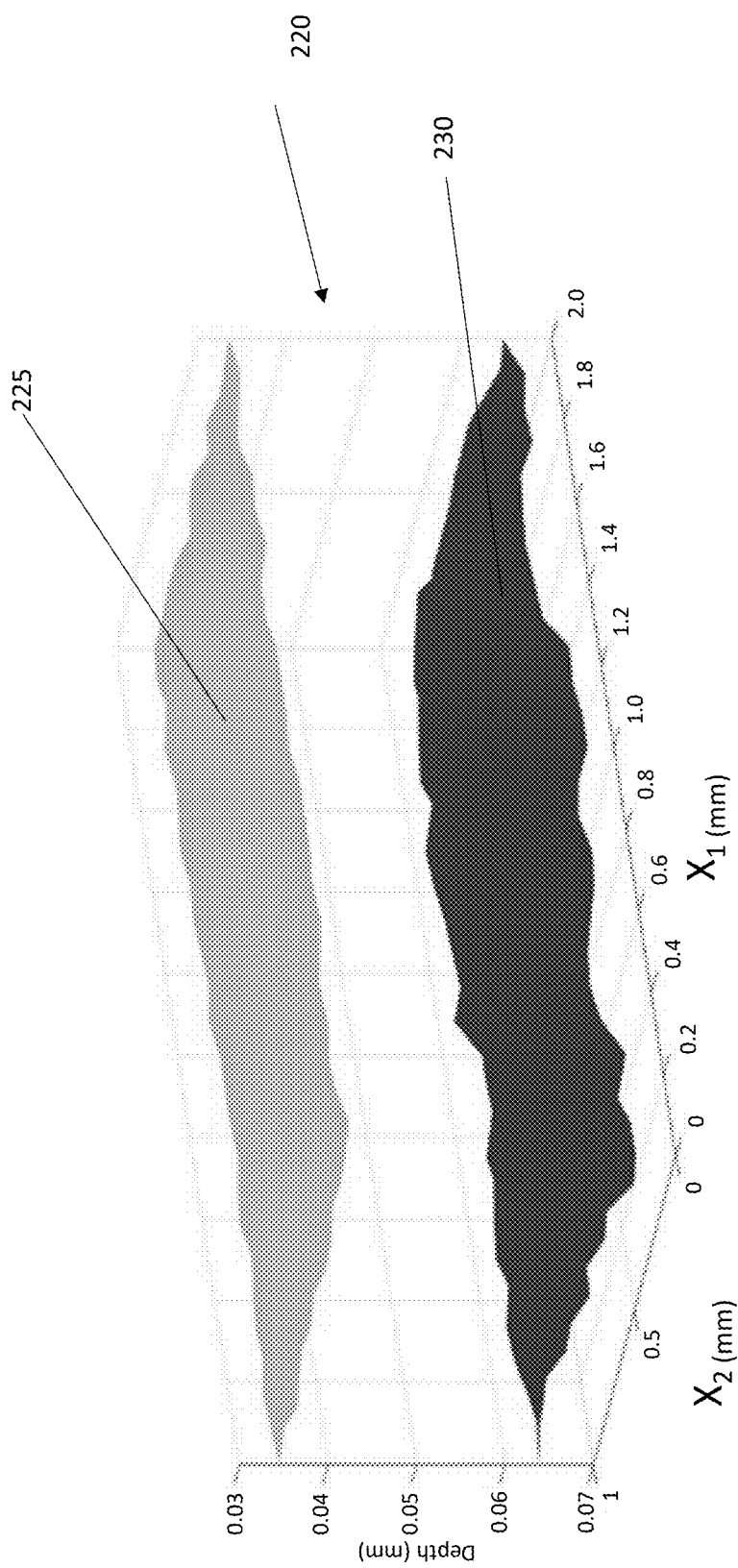
FIG. 24 illustrates top and bottom surfaces of a bond layer according to one embodiment of the present invention.
Figure 25:
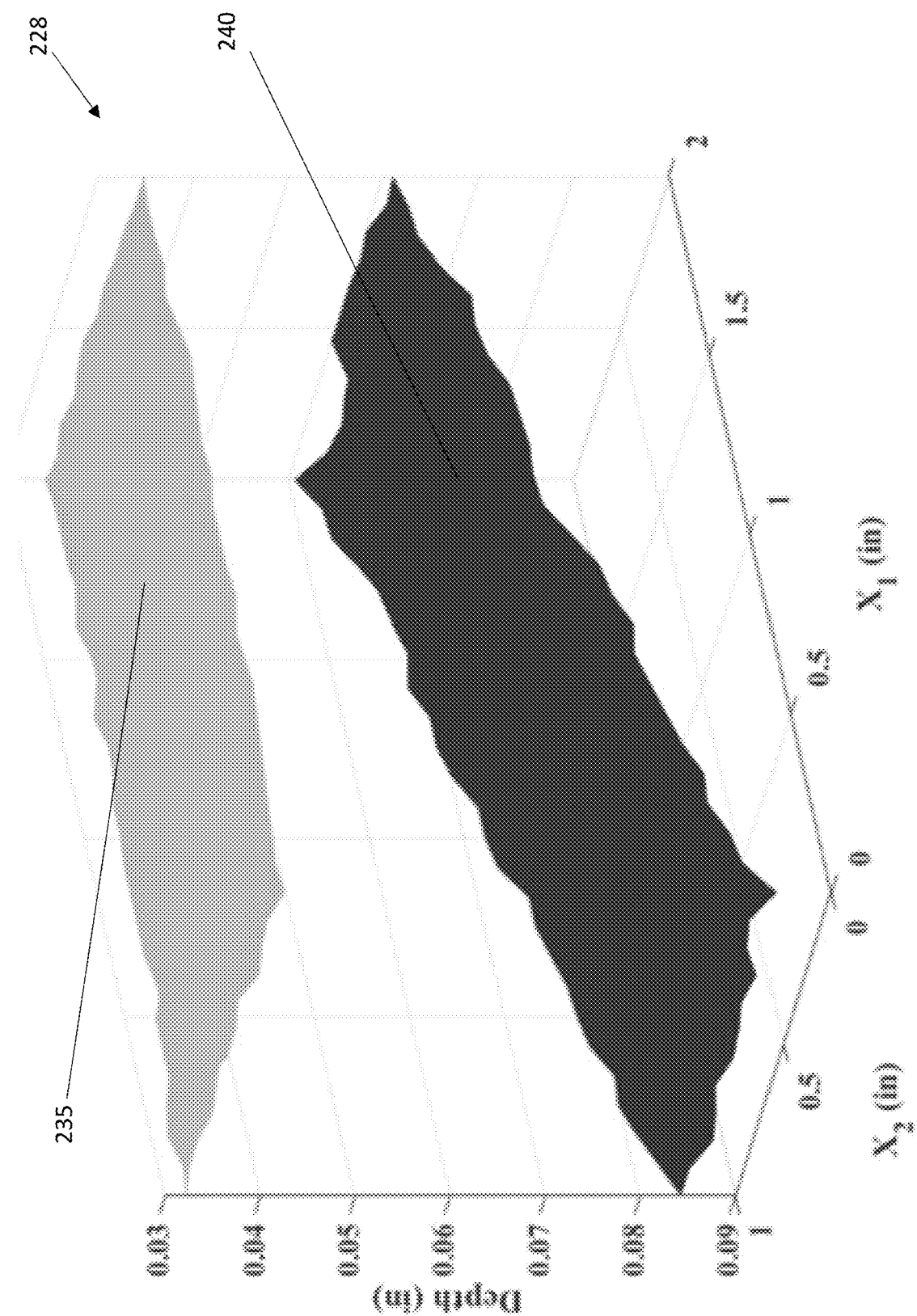
FIG. 25 illustrates top and bottom surfaces of a bond layer according to another embodiment of the present invention.
Figure 26:
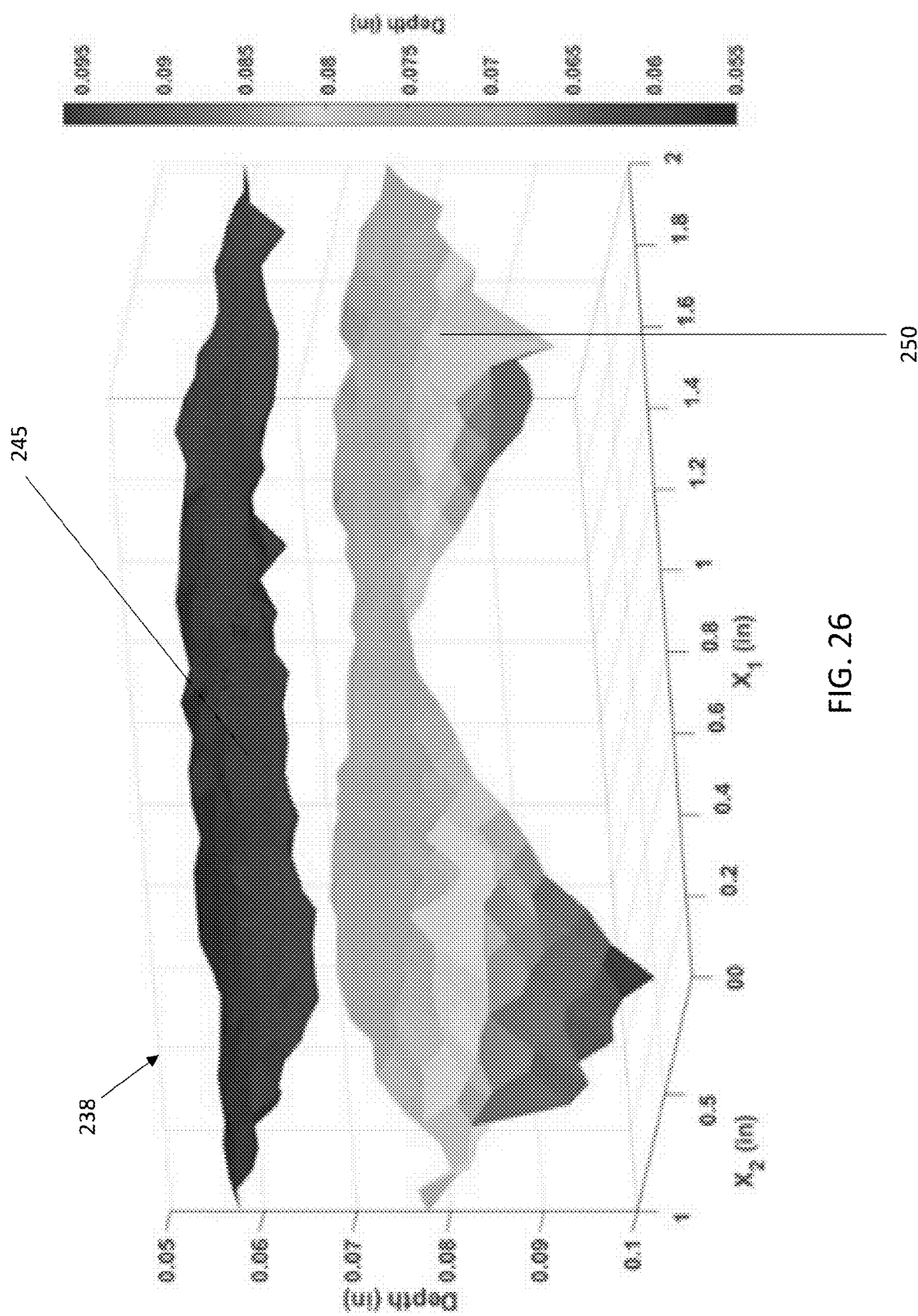
FIG. 26 illustrates top and bottom surfaces of a bond layer according to still another embodiment of the present invention.

As shown in FIG. 24, in one embodiment, the system is capable of producing a visualization 220, displaying constructed surfaces for both a top surface 225 and bottom surface 230 of the adhesive bond line. FIG. 25 illustrates a visualization 228, displaying constructed surfaces for a top surface 235 and a bottom surface 240 of an adhesive bond line, wherein the bottom surface 240 is at an angle relative to the top surface 235. FIG. 26 illustrate illustrates a visualization 238, displaying constructed surfaces for a top surface 245 and bottom surface 250 of an adhesive bond line, wherein the bottom surface 250 has a complex geometry relative to the top surface 245.

In another embodiment, a set of thickness values are generated in the form of an array of numbers for each point along the bond line, where the thickness value for each point is equal to the difference between the depth of the top surface 225 and the bottom surface 230 at that point. The GUI presents constructed surfaces for bond lines when both the top surface 225 and bottom surface 230 are substantially parallel as in FIG. 24, as is commonly the case for bond lines between two straight component materials of a combined material. In another embodiment, as shown in FIGS. 25 and 26, the top surface 235, 245 and bottom surface 240, 250 are not substantially parallel. Evaluating situations where the top surface 235, 245 and the bottom surface 240, 250 of the adhesive bond line are not substantially parallel is critical for the evaluation of combined materials with individual component materials that are curved relative to one another, or for combined materials wherein the bond line has been substantially distorted.

In one embodiment, the visualization 220 of the top surface 225 and the bottom surface 230 is freely interactable by a user. For example, the user is able to rotate the visualization 220 to show the bond line from a multiplicity of angles, which helps to identify areas of weakness or inconsistency that are not visible from a single angle. In another embodiment, the user is able to click on individual points of the top surface 225 or the bottom surface 230, which will cause the system to provide information regarding the bond line at the selected point, including the depth of the top surface 225, the depth of the bottom surface 230, and/or the distance between the top surface 225 and the bottom surface 230 at the selected point, indicating the thickness of the bond line at the selected point. In still another embodiment, the system automatically calculates the curvature of the bond line and/or the roughness of the interface of the bond line.

In one embodiment, a material used for the bond line of the test material is matched to at least one material in a material database. Because the amplitude of the A-scan signal corresponding to the top surface 225 and the bottom surface 230 of the bond line is based on the degree of mismatch in the acoustic impedance of the composite material and the bond line material, an approximate acoustic impedance of the bond line is able to be generated based on the amplitude of the A-scan. In another embodiment, a list of possible materials for the bond line is generated with a probability value assigned to each material. Producing a list is useful as materials often have similar acoustic impedances, meaning that it is feasible for the bond line to be made from several different materials. Furthermore, if the bond line is deeper within the test material, the amplitude of the A-scan is less able to precisely determine what material the bond line is made from, as the amplitude will have a greater margin of error. Therefore, it is useful to provide the user with several different possibilities for the content of the bond line, which, in some situations, would warrant further investigation.

Figure 27:
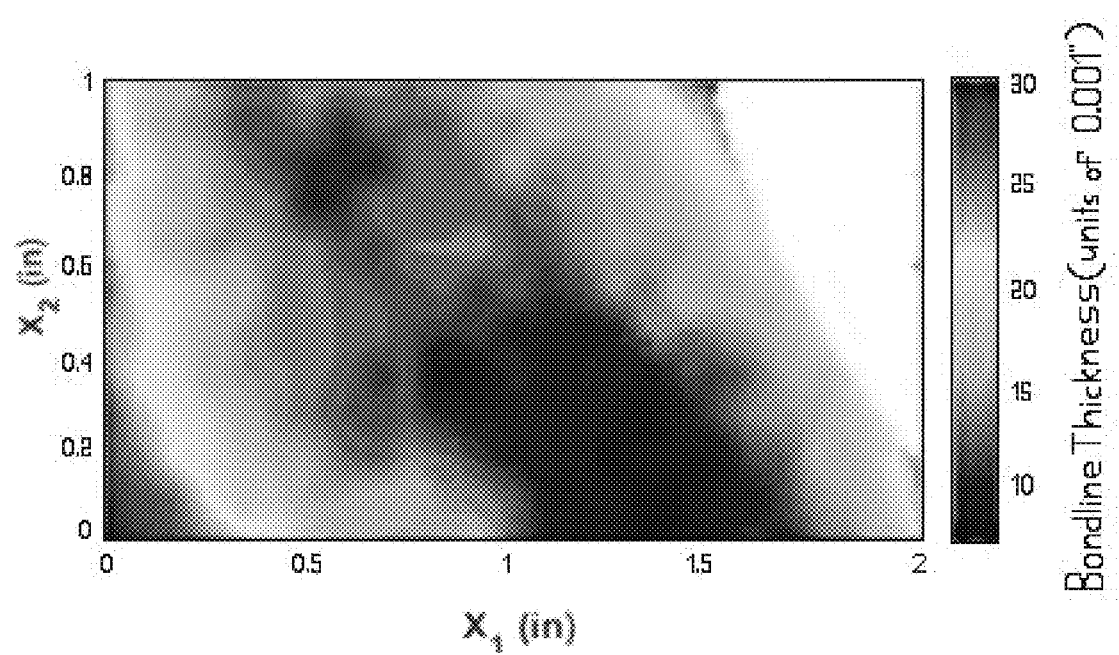
FIG. 27 illustrates a two-dimensional graphical representation of a bond layer according to one embodiment of the present invention.

As shown in FIG. 27, in one embodiment, the system is capable of providing a 2-D view of the adhesive bond line, with a color or hue gradient indicating areas of greater or lower thickness. This view is particularly useful not only for detecting areas at the extremity of the bond line where thickness is reduced or overthickened, but also for interior regions of the adhesive bond line, wherein air pockets could be found due to manufacturing defects or due to fatigue. In another embodiment, the system displays areas of disbond, also referred to as an incomplete bond line, wherein there is a discontinuity between the adhesive layer and adjacent component materials, as white or another color that sharply contrasts with the rest of the 2-D view of the adhesive bond line. In yet another embodiment, the 2-D view utilizes means other than color, such as the use of contour lines, in order to display regions of greater or lower thickness along the adhesive bond line. Discontinuities appear distinct in the waveform generated for the composite material. While a bond line is typically indicated by a distinct peak in the amplitude of one or more A-scans, corresponding to the acoustic mismatch between the bond line and the adjacent layer of the test material, a full discontinuity within the piece appears as a much stronger signal, due to the more substantial acoustic mismatch between air and the surrounding composite. In fact, this mismatch is often so large that no signal is generated for points beyond the discontinuity, while the system is still capable of receiving ultrasonic waves and therefore generating signal data for areas of the material beyond the beginning of a bond line.

In another embodiment, the GUI provides a simplified view of the strength of the bond line. The GUI first takes an input of the desired bond line thickness of a given area of the material. The GUI then presents an image of a surface of the test material, with areas of the surface of the test material associated with a plurality of colors, wherein each different color represents how close the bond line is to a desired bond line thickness. For example, in one embodiment, part of the surface of the test material is colored green, indicating the bond line is close to the desired thickness, part of the surface of the test material is colored yellow, indicating the bond line thickness is close to or just outside of the tolerance range for the desired bond line thickness, and part of the surface is red, indicating the bond line thickness is substantially different from the desired bond line thickness. In one embodiment, the user inputs tolerance ranges for each of the plurality of colors, which indicates at what bond line thicknesses each color would appear. In another embodiment, the user only inputs the desired bond line thickness with acceptable tolerances and the system automatically calculates criteria for each of the other plurality of colors. In one embodiment, the plurality of colors only includes two colors, for situations in which a binary decision is useful or necessary. In another embodiment, the plurality of colors includes more than two colors and the user is able to select how many different colors appear.

5. Barely Visible Impact Damage

One frequent issue with composite laminates occurs when the composite is subjected to high or low velocity impacts during manufacturing or operation. Such impacts often cause cracks, delamination, fiber breakage, or penetration of the composite. In many cases, impact damage seemingly only causes a small, sometimes undiscernible surface defect on the material, while the internal damage can be far greater.

Existing systems have been unable to full characterize defects caused by such impact damage. Impact damage poses a particular issue, as complications such as undesired reflections, wave interactions, refraction, and diffraction has rendered areas near the surface of a composite an imaging "dead zone," making current ultrasonic imaging of such areas highly unreliable with low resolution. One recent study by Zhang et al. attempted to use an ultrasonic pitch-catch procedure to find barely visible impact damage for a composite. However, while the method was able to detect the existence of the damage, it was unable to quantify size, shape, or location of the damage, greatly limiting the usefulness of the result in the field.

Other existing techniques, such as 3-D microscopy have a tendency to substantially underestimate the size of damage, especially for areas of a test material close to the surface. Furthermore, 3-D microscopy cannot be used to precisely measure internal damage in the test material without damaging part of the test material. In fact, the difference between area of surface damage and the cross-sectional area of the largest area of damage within the material can often be substantial. Table 3 demonstrates the percentage difference between the area of surface damage of a material, as found by 3-D microscopy, and the maximum cross-sectional area of damage within the same material found using a portable ultrasonic transducer according to one embodiment of the present invention.

TABLE 3

Percent Difference in Area Between Surface damage and Maximum Damaged Area Found Using Portable Ultrasonic Transducer

| | Value | | | | | | | |
|---|---|---|---|---|---|---|---|---|
| | Sample 1 | | Sample 2 | | Sample 3 | | Sample 4 | |
| | MGA | FSI | MGA | FSI | MGA | FSI | MGA | FSI |
| Difference (%) | 170 | 171 | 149 | 149 | 149 | 149 | 152 | 152 |

Characterizing the actual size and shape of the damaged area caused by an impact is critical in being able to evaluate the effect of the damaged region on the overall mechanical properties of the material. In one study, Finite Element Analysis (FEA) revealed that simulations involving a part whose damage was assumed to be perfectly cylindrical with the same radius as the impact hole significantly underestimated the increase in von Mises stress in the material compared to simulations simulating the actual damage area caused by the impact. Table 4 below shows the percent increase in maximum von Mises stress calculated by an FEA model for three different sample material, for simulation both assuming perfectly cylindrical damage and simulations taking into account the actual damage area.

TABLE 4

Von Mises Stress Increase - Perfectly Cylindrical vs. Actual Damage Area

| Specimen Number | Cylindrical Radius (mm) | 10% Stiffness Reduction - Cylindrical (% increase) | 10% Stiffness Reduction - Actual (% increase) | 90% Stiffness Reduction - Cylindrical (% increase) | 90% Stiffness Reduction - Actual (% increase) |
|---|---|---|---|---|---|
| Specimen 2 | 2.94 | 4.95 | 9.6 | 140 | 320 |
| Specimen 3 | 3.16 | 4.96 | 7.5 | 140 | 220 |
| Specimen 4 | 3.20 | 4.96 | 9.1 | 140 | 290 |

In one embodiment, an initial thermographic scan is taken of a test material using a thermographic testing apparatus. The initial thermographic scan is used to identify an area of potential damage on the test material. Taking an initial thermographic scan is useful particularly for larger parts, such as airplane wings, as performing ultrasonic scans of the entire wing is frequently very expensive and time consuming, especially when only limited areas of the part are exposed to damage. Additionally, identifying areas with barely visible impact damage with the naked eye is difficult, as the surface defects present at those areas are, by their nature, barely visible, potentially even microscopic and invisible to the naked eye. Because the system does not rely on the presence of surface damage in order to quantify the interior damage, the system is able to determine damage area even where there is no surface damage at all.

In another embodiment, a phased array ultrasonic testing apparatus is used to scan the area of potential damage after the initial thermographic scan is performed. The phased array ultrasonic scan is used to identify likely areas of damage to be investigated further. Performing a subsequent sweep with a phased array ultrasonic testing apparatus is useful, as the initial thermographic scan often lacks sufficient specificity or accuracy as to fully narrow down an area of the test material that is more practical for individual testing.

In yet another embodiment, an initial thermographic scan is not performed on the test material and only the phased array ultrasonic testing apparatus and an individual scan transducer are used to scan the test material. In still another embodiment, neither an initial thermographic scan nor a phased array ultrasonic testing apparatus is used and only an individual scan transducer is used to scan the test material.

In one embodiment, the system includes a scan of an area surrounding a surface impact. A transducer emits ultrasonic waves to produce an A-scan of the region, after which a gate is selected for the A-scan, with defined a defined gate start time and gate end time, defining a series of gate time points therebetween. The first gate time point corresponds to a cross section of the test material closest to the surface of the test material, while the final gate time point corresponds to a cross section of the test material furthest from the surface of the test material. In one embodiment, the gate is chosen based on the average thickness of a single lamina of the test material. In another embodiment, the average thickness of a single lamina of the test material is found automatically by the test, based on A-scan data indicating the number of laminae in the test material and the total time of flight between the first and final lamina of the material.

The maximum value for every A-scan in the region for each gate time point is then plotted to produce a series of C-scans from the maximum of the absolute value of the gated A-scan (or MGA C-scans) for each gate time point at each point in the region. In one embodiment, a Fourier transform is performed for the gated data, utilizing a low pass filter of 15 Mhz, with numerical integration of the absolute value of the spectrum produced. This filtered data is then plotted to produce a series of frequency spectrum intensity (FSI) C-scans. A damage area is then determined for each of the MGA C-scans and the FSI C-scans. In one embodiment, the damage area is determined manually by an operator. In another embodiment, the damage area is determined automatically by a processor. Each C-scan of the series of MGA C-scans and FSI C-scans are then compared by the system. The system creates a series of reconciled C-scans, wherein each C-scan in the series of reconciled C-scans is the same as the C-scan of either the series of MGA C-scans or the series of FSI C-scans, depending on which has the largest damage area for a given gate time point. Using both MGA and FSI C-scans is useful, as MGA C-scans on average tend to estimate the damage area as being larger than that shown in FSI C-scans and therefore is the more conservative approach overall. However, FSI C-scans are often better able to resolve small damage areas and therefore are useful in obtaining a clearer picture of the overall change in the properties of the test material.

Figure 28:
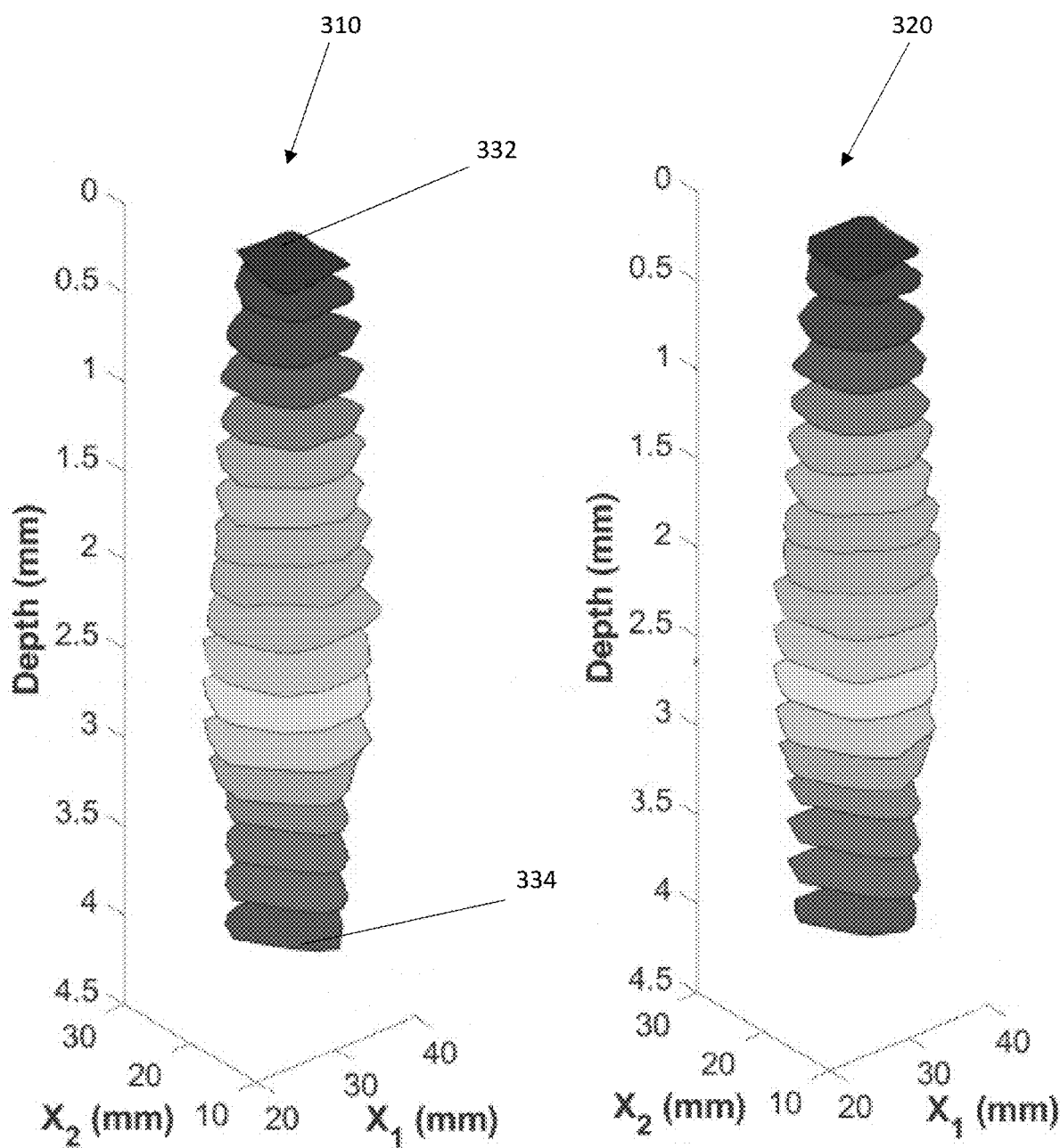
FIG. 28 illustrates a graphical representation of damaged area of a material according to one embodiment of the present invention.
Figure 29:
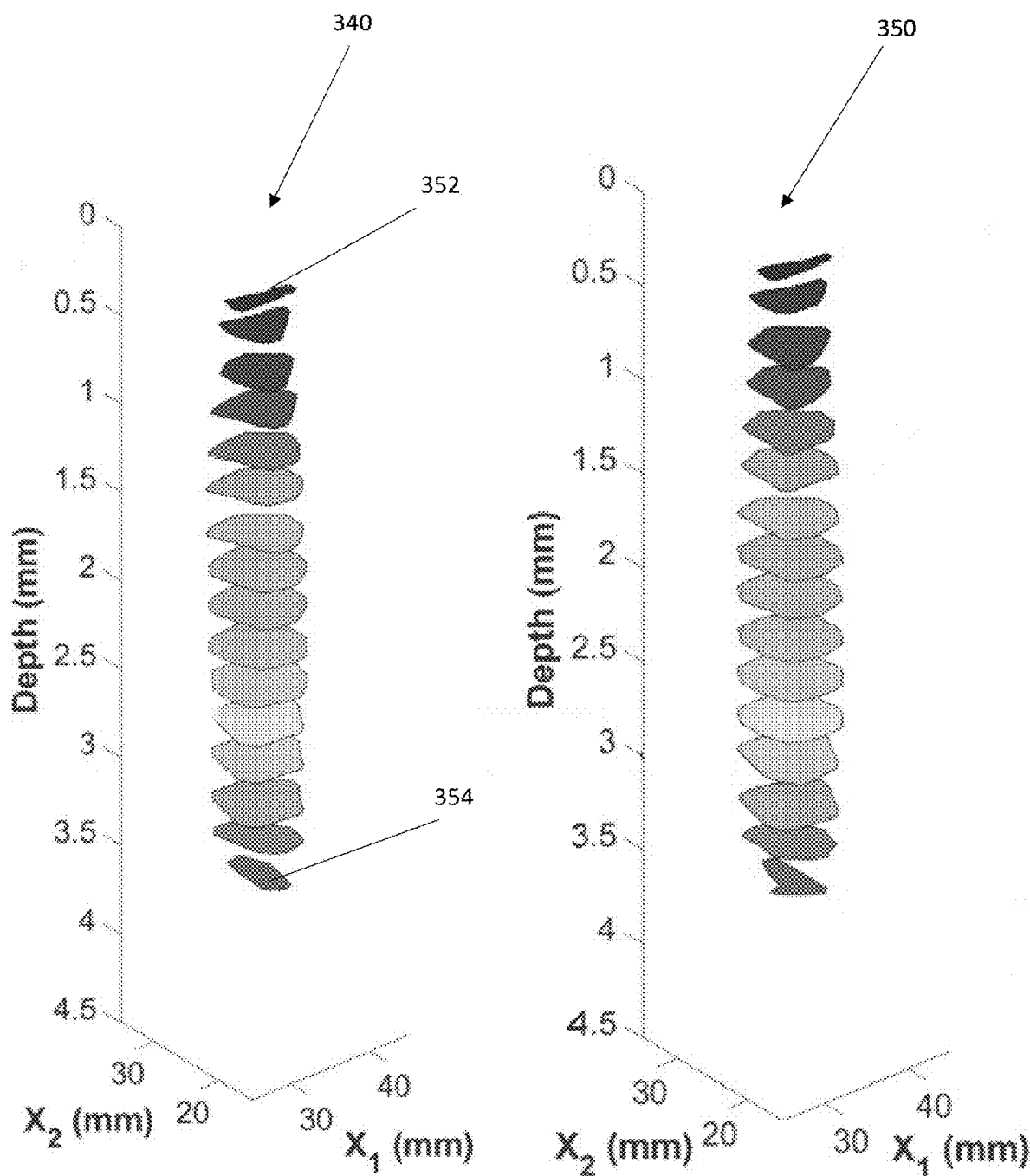
FIG. 29 illustrates a graphical representation of damaged area of a material according to another embodiment of the present invention.

In one embodiment, as shown in FIG. 28, the system is operable to create a visualization 310 of the damage area of each C-scan in the series of MGA C-scans and a visualization 320 of the damage area of each C-scan in the series of FSI C-scans. The damage area 332 corresponding to the first gate time point is at the top of each visualization 310, 320, while the damage area 334 corresponding to the final gate time point is at the bottom of each visualization 310, 320. The system is operable to create a 3-D damage profile for the region consisting of the damage area of each C-scan in the series of reconciled C-scans stacked vertically, with the damage area 332 corresponding to the first gate time point being at the top and the damage area 334 corresponding the final gate time point being at the bottom. In one embodiment, the centroids of each damage area are automatically vertically aligned by the system. In one embodiment, the system creates a visualization 340 of the damage area of each C-scan in the series of MGA C-scans and a visualization 350 of the damage area of each C-scan in the series of FSI C-scans for a test material where there is no visible surface damage, as shown in FIG. 29. The damage area 352 corresponding to the first gate time point is at the top of each visualization 340, 350, while the damage area 354 corresponding to the final gate time point is at the bottom of each visualization 340, 350.

Figure 30:
FIG. 30 illustrates a meshed representation of a damaged area of a material according to one embodiment of the present invention.

In one embodiment, as shown in FIG. 30, the system uses FEA to develop a von Mises stress profile displays this graphically for all or part of the test material. The von Mises stress profile assists in associating the damage area associated with the impact with a quantifiable decrease in the performance of the part in question.

6. Wrinkle Detection

Another defect that has the potential to impact the mechanical properties of a composite laminate is a wrinkle or waviness between the layers of the composite. Wrinkles between layers of the composite frequently occur during manufacturing, when the composite is not fully set and is more amorphous, especially for pieces with complex curves. For thin parts or for parts where wrinkles are quite large, these abnormalities are often spotted early through a simple visual analysis of the surface of the part. However, for thicker composites, especially where the wrinkle is small relative to the thickness of the part and where the wrinkle is in a layer distant from the surface of the part, visual analysis may not reveal an issue, as the part will appear to be smooth on its surface.

When a composite having wrinkles is put into tension, the wrinkled layer is frequently not taut like each of the other layers, meaning it is not engaged in tension and does not contribute to the overall strength of the composite laminate. Additionally, when a composite is placed in compression, the wrinkle is able to buckle instead of engaging the load, leading to a noticeable decrease in the compressive strength of the composite. This frequently causes the composite to fail prematurely. In order to be able to detect the majority of wrinkles big enough to significantly impact the performance of a composite, ultrasonic testing systems need to be able to at least detect wrinkles with an amplitude of 0.4 mm or larger. Current ultrasonic systems are unable to achieve this resolution and therefore are highly likely to miss important defects in a composite. In addition to the size of the wrinkles, of critical importance in evaluating the potential danger of a wrinkle is its aspect ratio. The aspect ratio of a wrinkle is defined as the amplitude of the wrinkle divided by the half wavelength. Wrinkles with low aspect ratios are more difficult to detect because at longer length scales, they often appear to be flat relative to adjacent layers. Therefore, systems being able to detect wrinkles with low aspect ratios is often as critical as being able to detect wrinkles with low amplitudes.

The present system is operable to detect and characterize wrinkles in both unidirectional and woven composites. Additionally, the present invention is able to characterize wrinkles in a variety of materials, including, but not limited to, carbon fiber composites, fiberglass composites, and glass-carbon composites. The present system is able to resolve images of wrinkles having amplitudes of approximately 0.05 mm or larger in unidirectional composites. In woven composites, due to the larger size of the plies themselves, the system is able to resolve images of wrinkles having amplitudes of approximately 0.2 mm or larger. In one embodiment, the system is able to detect wrinkles having aspect ratios of 0.1 or greater.

In one embodiment, the system is able to find Marcel wrinkles propagating within a plane normal to a testing surface of a test object. In most situations, wrinkles are identified as existing between lamina of a test object, with one lamina pushing up into another and vice versa. However, in some situations, such as where the wing of a plane contacts the fuselage of the plane, the wrinkles do not only propagate between the lamina, but rather within individual lamina.

In one embodiment, a plurality of A-scans are generated corresponding to different locations along the surface of the test material. In one embodiment, each A-scan is shifted such that an initial amplitude peak is aligned at approximately the same time point for each A-scan (corresponding to the interface between the surrounding air or water and the actual test material) such that the A-scans are able to be more directly compared. One of ordinary skill in the art will understand that the method of adjusting and aligning A-scans is not one of limited applicability to wrinkle detection, but is able to be used in any of the processes discussed herein as a means of comparing A-scans generated from the same material. In one embodiment, the system utilizes Gaussian averaging (or Gaussian smoothing) to apply a spatial filter for data generated across individual planes of the laminate consisting of a plurality of A-scan data at each depth. In one embodiment, an average A-scan is generated for one or more subregions of the test material and time-of-flight data corresponding to each peak in each A-scan (or each peak in each averaged A-scan for a particular subregion) is recorded in a memory connected to the system. This time-of-flight data is able to be converted to depth data based on the speed of sound of the test material.

Because each peak corresponds to an individual lamina interface, the depths of these interfaces are able to be tracked across the length and width of the test material, indicating local areas where the depth increases or decreases for a particular interface (i.e., corresponding to a potential wrinkle). In one embodiment, each peak is tracked across the length and width of the test material, while, in another embodiment, only time-of-flight data corresponding to a specific peak (e.g., the fourth peak) is saved and compared across A-scans to check for a wrinkle in that particular layer. This method is capable of both identifying the height and base width of each wrinkle so as to be able to also determine the aspect ratio of each wrinkle. In one embodiment, this A-scan data is able to be used to generate a 3-D surface image of each layer, displaying each wrinkle. In one embodiment, Gaussian averaging is also used on the generated 3-D surface image for each layer to smoothen the surface.

Figure 31:
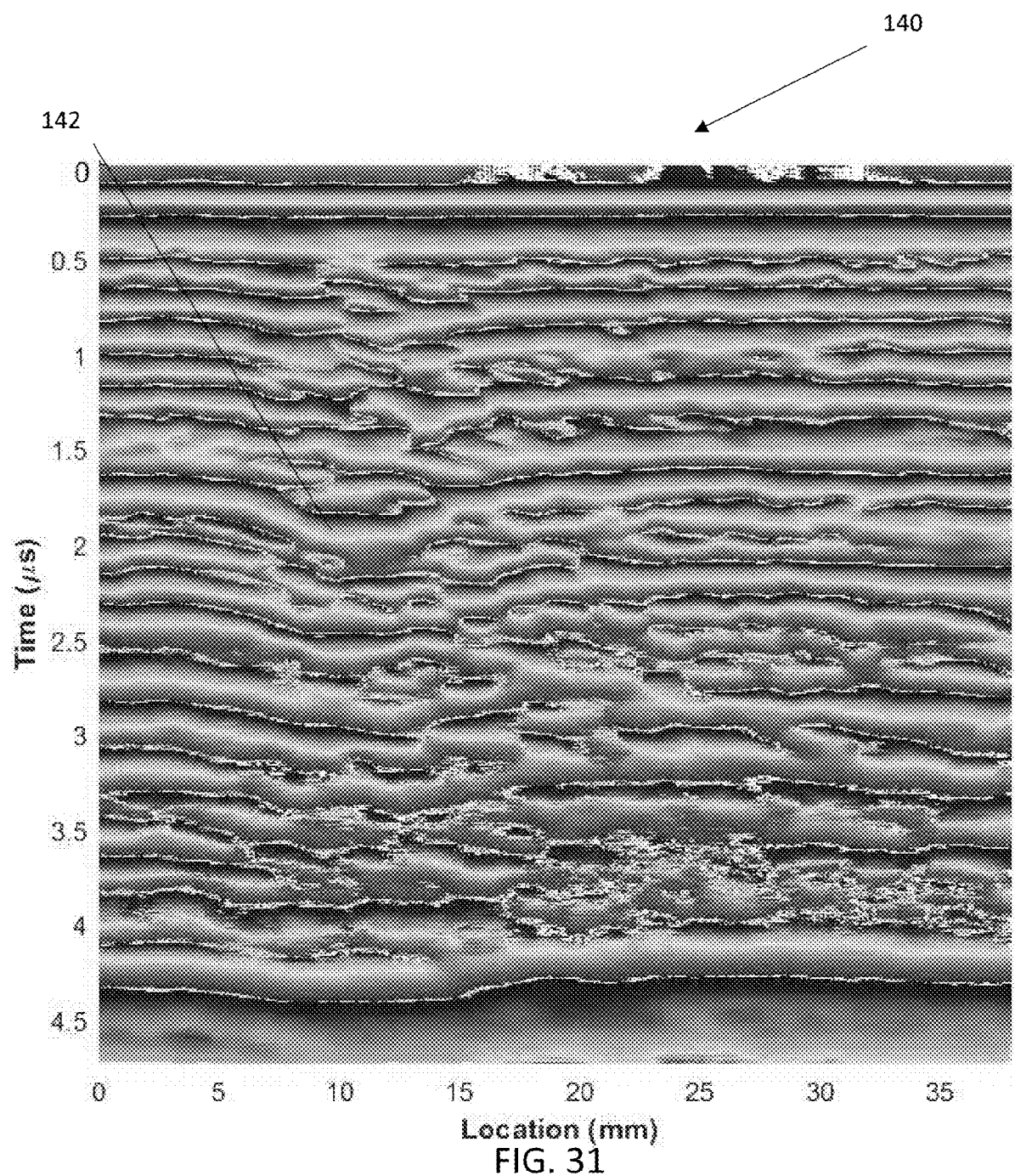
FIG. 31 illustrates a two-dimensional graphical representation of a wrinkle in a test material provided by one embodiment of the present invention.
Figure 32:
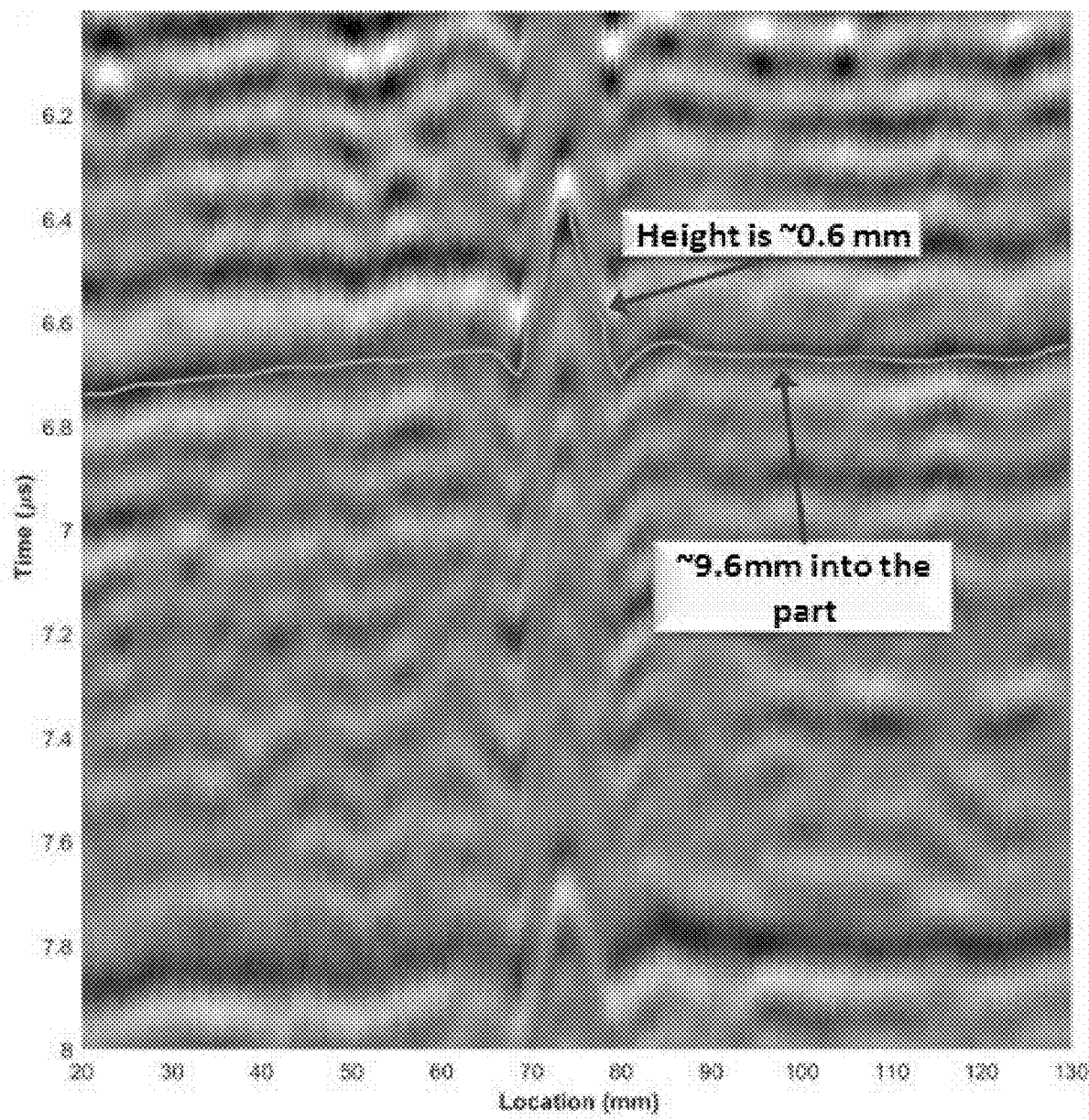
FIG. 32 illustrates a two-dimensional graphical representation with the wrinkle traced and measured by one embodiment of the present invention.

As shown in FIG. 31, in one embodiment, based on the plurality of A-scans, the system produces a series of B-scans 140 of a test material that show a series of cross sections of the test material spanning the entire width of a woven material. In another embodiment, the user is able to select a start gate time and an end gate time so as to only produce a series of B-scans of the test material for a limited range of depths of the test material. Additionally, the user is able to select a start distance, indicating at what distance from the surface of the test object the first B-scan shows and an end distance, indicating at what distance from the surface of the test object the final B-scan shows. By showing a series of B-scans 140 through the thickness of the test material, an operator is able to see areas where the relative position of two layers of the material differ through the width of the test material, which commonly indicates the presence of a wrinkle 142 in the test material. In one embodiment, an artificial intelligence system automatically detects wrinkle areas from the series of B-scans and highlights the problem areas for the user. In another embodiment, the system automatically determines at what depth from a surface of the test material that the amplitude of the wrinkle 142 exceeds a predetermined threshold and at what distance from the outside surface of the test material that the amplitude of the wrinkle 142 falls below the predetermined threshold for each layer of the composite. By detecting where the wrinkle ends within each layer within the composite, the complex geometry of the wrinkle, rather than simply its height at a given cross-section, is provided. As shown in FIG. 32, in one embodiment, the system provides a two-dimensional view of the test material with the wrinkle area traced. Additionally, in one embodiment, the system is capable of providing graphics showing information related to the wrinkle, such as the height of the wrinkle, the depth of the wrinkle, the length of the wrinkle, and/or the aspect ratio of the wrinkle.

Figure 33:
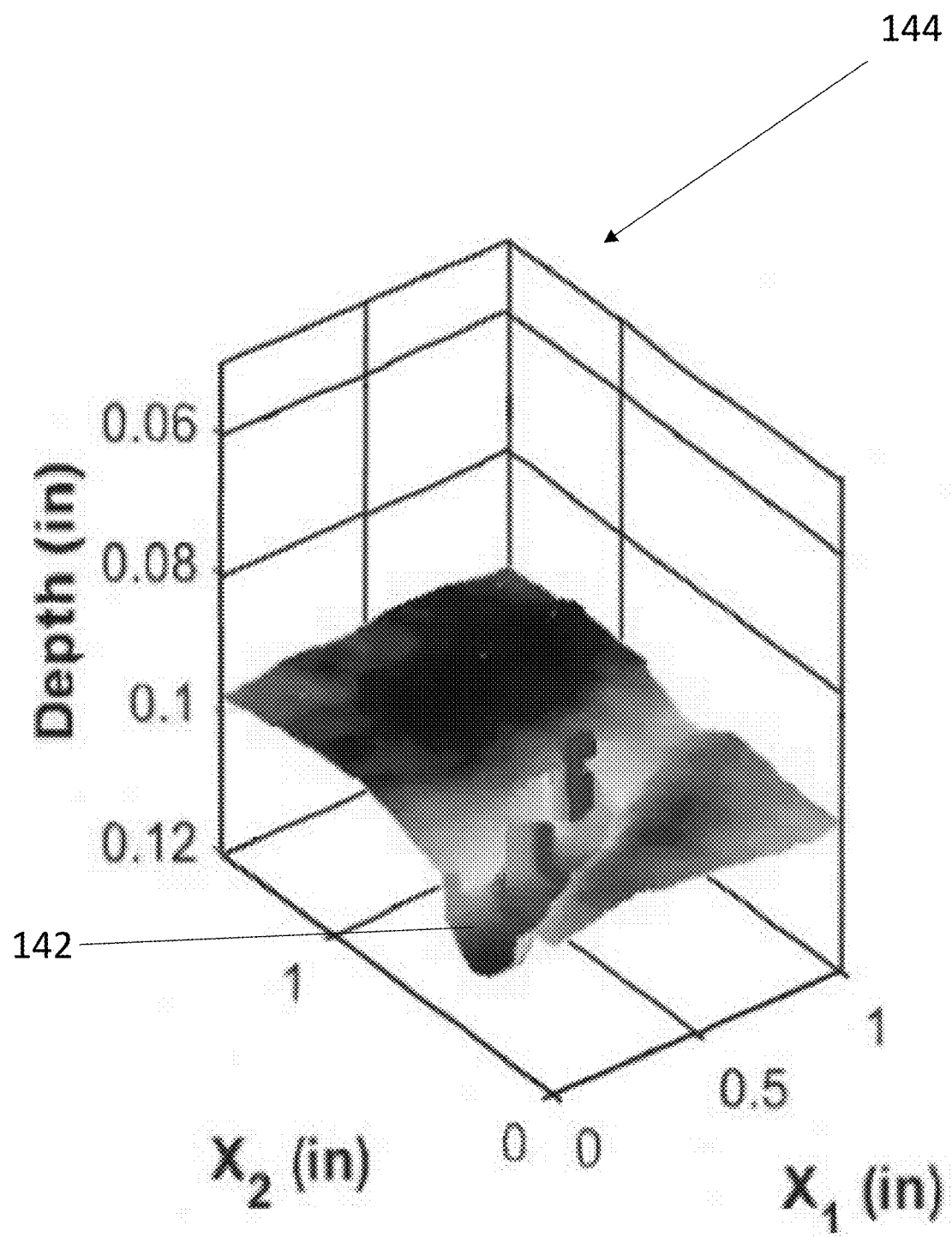
FIG. 33 illustrates a three-dimensional graphical representation of a wrinkle in a test material provided by one embodiment of the present invention.
Figure 34:
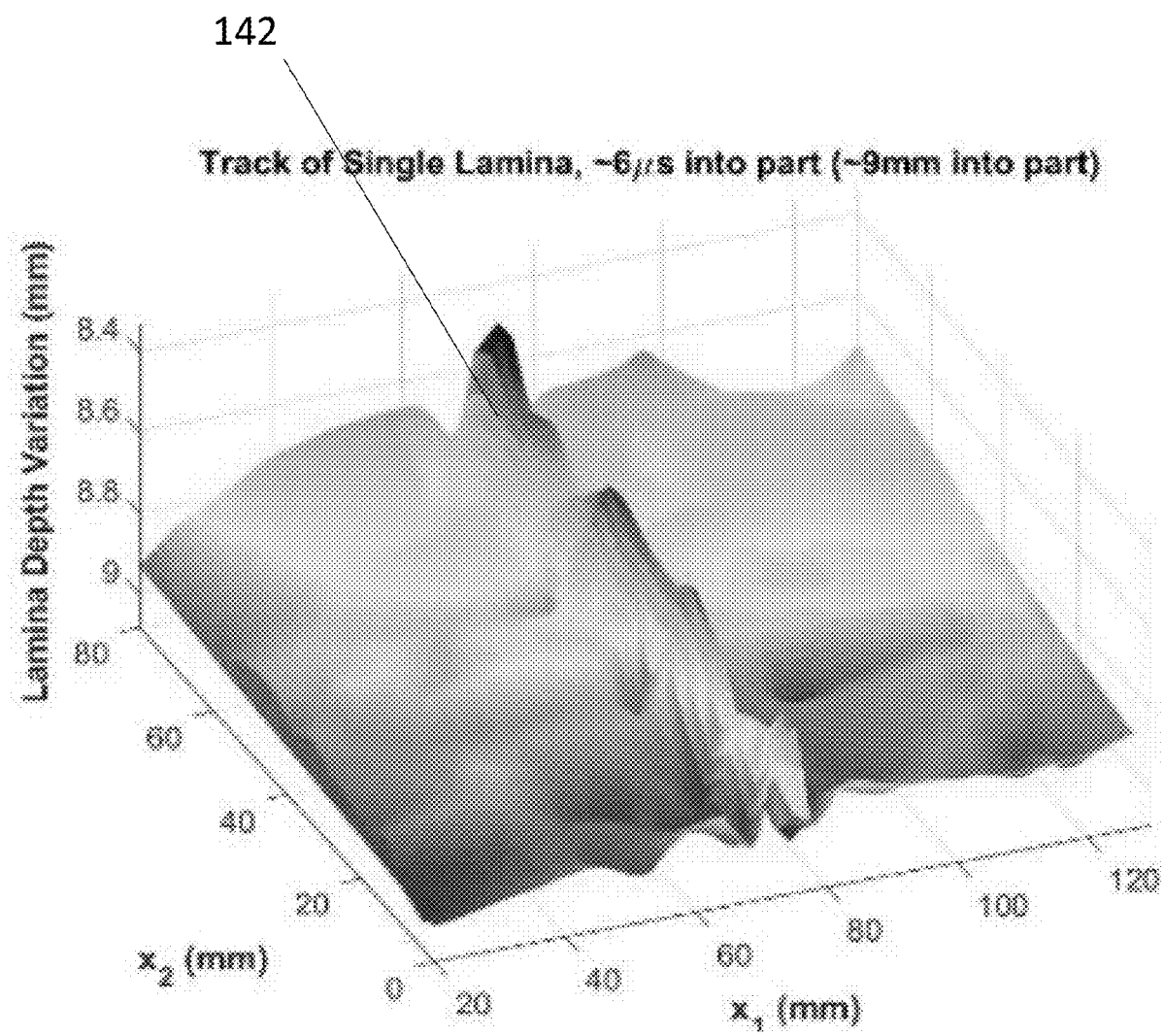
FIG. 34 illustrates a three-dimensional graphical representation of a wrinkle in a test material provided by another embodiment of the present invention.

FIGS. 33 and 34 illustrates a three-dimensional graphical representation 144 of a wrinkle 142 in a test material provided by one embodiment of the present invention. In addition to providing a cross section of a test material, the present system is further able to produce a 3-D representation 144 of an individual layer of a test material, including variations in the depth of the layer indicating curvature of the layer or a wrinkle 142 in the layer. After the system compiles A-scan data for a series of cross-sections of a test material to produce a series of C-scans, the system is able to perform gradient analysis on the series of C-scans in order to construct a series of X, Y, and Z coordinates corresponding to the interface between two layers. The system is then able to plot these coordinates in a 3-D graphical representation 144, indicating the dimensions of width, length, and depth of the test material. In one embodiment, the system further assigns coloration to sections of the 3-D graphical representation 144, with different colors corresponding to different depths of the layer. In another embodiment, the system includes a graphical editing module, with which users manually map out the interface or part of the interface, which creates a series of X, Y, and Z coordinates that are then plotted.

Figure 35:
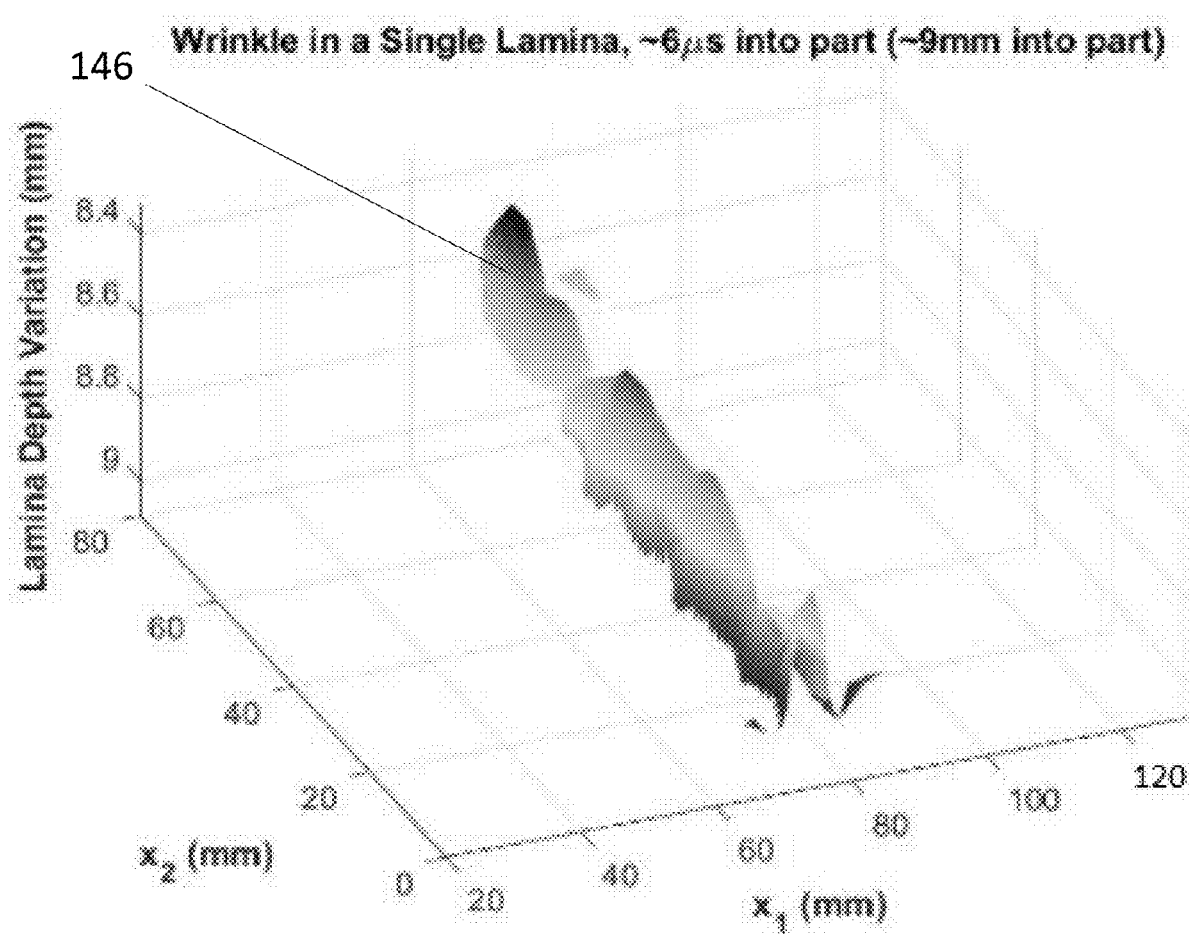
FIG. 35 illustrates a three-dimensional graphical representation featuring an isolated version of the wrinkle of FIG. 34.
Figure 36:
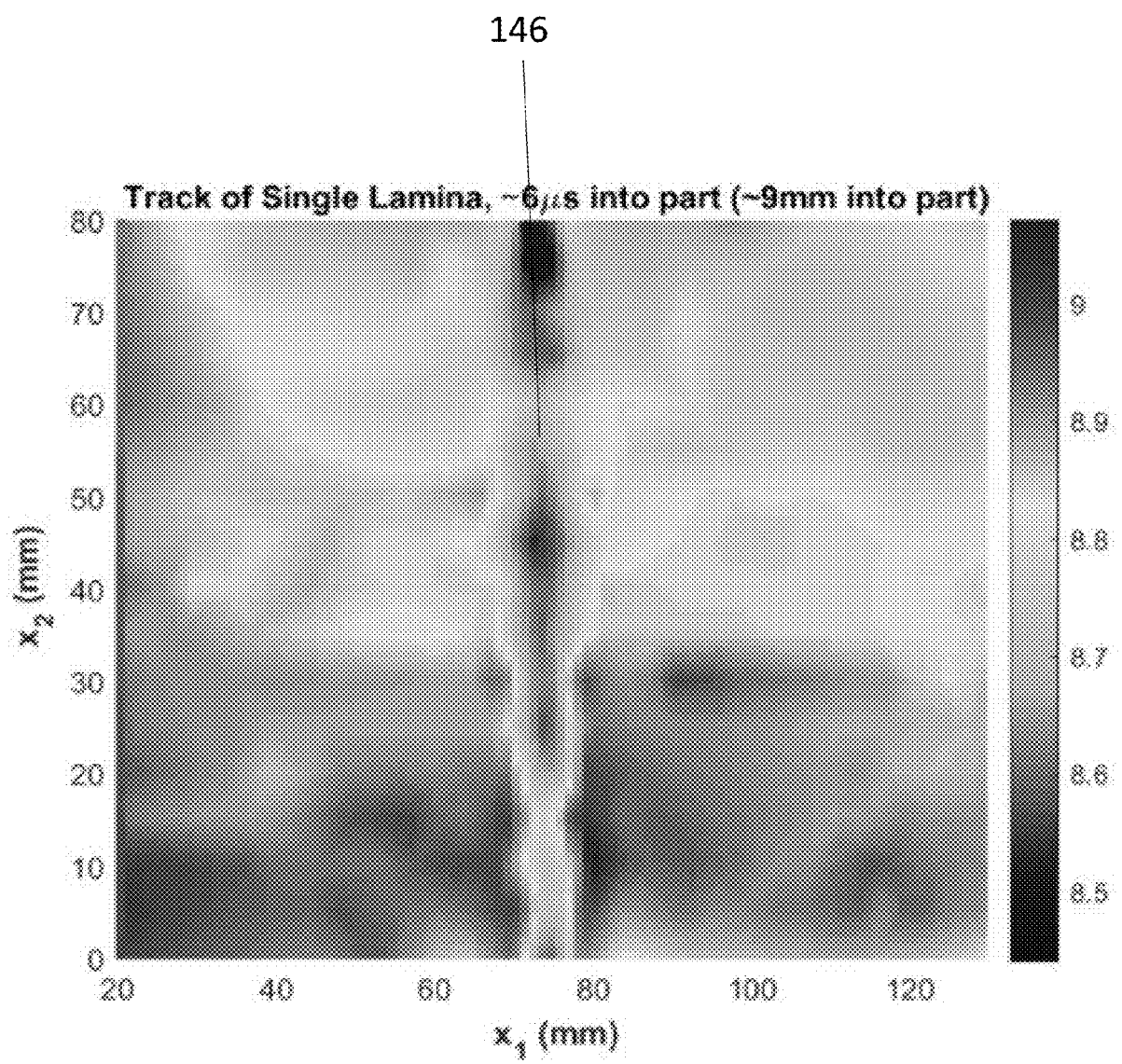
FIG. 36 illustrates a two-dimensional view of the wrinkle of FIG. 34.

As shown in in FIG. 35, in one embodiment, the system is able to automatically isolate the wrinkle 146 from the surrounding test material. In one embodiment, the wrinkle is isolated by finding the local curvature at each point along the lamina and finding points along the surface where the curvature of the surface extends a predetermined threshold. In another embodiment, a portion of the surface of the lamina is able to be manually selected and excised to be shown independently of the non-selected portion of the lamina. As shown in FIG. 36, in another embodiment, the system is able to display a 2-D top view of the wrinkle 146. In one embodiment, the 2-D top view of the wrinkle uses coloration to denote the relative depth and/or height of different sections of the displayed lamina.

7. Porosity Determination

The porosity of a material has substantial effects on the mechanical properties of that material. Pores are small holes in a material, commonly filled with air. Increased number of size of pores within a material frequently causes materials to show decreased strength, which occasionally lead to premature failure.

In order to evaluate the porosity of a material, current ultrasonic systems utilize calibration blocks of materials with known porosity, which are first measured by the device in through-transmission mode. In evaluating the amplitude and timing of the ultrasonic signals captured by a receiver on the opposite side of the calibration block to the transducer, current systems are able to develop baseline measurements with which to compare the test material. However, these current systems face several key issues. Calibration blocks often need to be uniquely formed for individual test materials depending on what material is to be tested and the geometry of the material to be tested. For parties seeking to measure the porosity of many different objects, calibration blocks often become expensive and time consuming to produce. Additionally, relying on the use of calibration blocks limits the accuracy of a system, as the system is only able to determine the calibration block that the test material most closely matches, which limits accuracy to depend on the minimum difference in porosity between calibration blocks.

Furthermore, these systems frequently rely on through-transmission modes in order to operate. However, through-transmission ultrasonic testing often cannot be performed, as the user is unable to access a second side of the test material or the test material is too thick for through transmission techniques to work reliably. However, for situations where only a single surface of a test material is available, current ultrasonic systems lack sufficient resolution to evaluate the porosity of the sample in pulse echo mode.

In one embodiment, the system determines the porosity of a test material. The system is able to directly and quantifiably measure the overall average porosity of a test material, without the need to compare to a calibration block. In another embodiment, the system provides statistical information regarding the average size of pores, such as the standard deviation and variance of the pore size. In one embodiment, the system is able to determine the overall average porosity of a test material while in pulse echo mode. In one embodiment, the system is able to determine an overall void percentage for a test material, including carbon fiber and/or fiberglass, as low as 2%.

In addition to determining the overall average porosity of a test material, it is also critical to indicate the size and location of outlier pores, as conveying overall average porosity alone is potentially misleading if the average is significantly affected by a large void in the material. These outlier pores frequently serve as initiation points for crack formation or help to facilitate the propagation of existing cracks in the test material. However, existing systems lack sufficient spatial resolution to detect and report many potentially disqualifying pores, especially in deeper areas of a multi-layered composite, where spatial resolution decreases. Therefore, in addition to conveying the overall average porosity of the material, the system is able to detect and identify individual pores with sizes of 1.5 mm or greater within any layer of a composite having up to 18 total layers.

In one embodiment, the system B-scan, C-scan and/or three-dimensional images of the test material containing an outlier pore. The system indicates the pore using a visible outline, shading, or any other visual indication method. The system is able to automatically provide the effective diameter, area, and depth of the pore. In one embodiment, the system automatically fits an ellipse around the pore in order to model it and reports the dimensions of the major and minor axis of the ellipse in order to provide better information regarding its shape.

8. Degree of Cure Evaluation

Another frequent defect in a test material is improper curing of the test material and/or improper curing of the adhesive used to bind individual layers of the test material. Composite laminates are often formed by first providing a series of prepeg sheets of a woven base material, such as carbon fiber or fiberglass. The prepeg sheets are impregnating with a resin, such as epoxy, polyester, polyurethane, or another plastic, within a furnace until the resin and prepeg solidify into a single solid plastic part. Critical in this process is the temperature at which the furnace is kept, the viscosity of the resin used, and the time taken to perform the curing process. Setting the furnace to too high of a temperature or heating the material for too long causes the material to be overcured and become overly brittle, which often leads to premature failure. On the other hand, setting the furnace to too low of a temperature or heating the material for an insufficient amount of time causes the material to be undercured and lack the desired strength needed to resist high load scenarios. Therefore, a system is needed that is able to evaluate both if a material is undercured or overcured.

In one embodiment, an ultrasonic emitter probe is inserted into a furnace during the curing process. The ultrasonic emitter probe emits ultrasonic waves into the test material during heating. Waves reflected by the material are captured by an ultrasonic receiver probe and processed by the system to produce data concerning the degree of cure over the duration of the curing process. In one embodiment, the ultrasonic emitter probe and the ultrasonic receiver probe are the same device. In one embodiment, the system is in connection with a control unit for the furnace and the heat and/or timing of the furnace used for the curing process is automatically adjusted based on the data produced while the curing process is ongoing.

In another embodiment, an ultrasonic emitter probe is placed outside of the furnace and emits ultrasonic waves in to the test material shortly after the curing process is complete. The system produces data regarding the degree of cure of the test material based on the reflected ultrasonic waves. In one embodiment, the system is connected to a heat control unit for the furnace and the data is used to automatically update the temperature, timing, and/or resin viscosity for subsequent curing processes. In another embodiment, a user manual updates the heat control unit for the furnace based on the data produced by the system.

9. Layer Orientation

As discussed in U.S. Pat. No. 10,697,941, which is hereby incorporated by reference, test materials, such as composite laminates, are often composed of individual layers that have directionally dependent material properties. For example, if each layer of the material is oriented in the same direction, the material is likely to have much stronger properties in the direction of orientation than in a direction orthogonal to the orientation of the layers.

Currently, the majority of ultrasonic testing systems are incapable of determining the ply orientation of a test material. Instead, several studies have proposed the use of computed tomography (CT) imaging in order to determine ply orientation. However, CT scans require high initial investment costs and are unable to be used on large parts.

Figure 37:
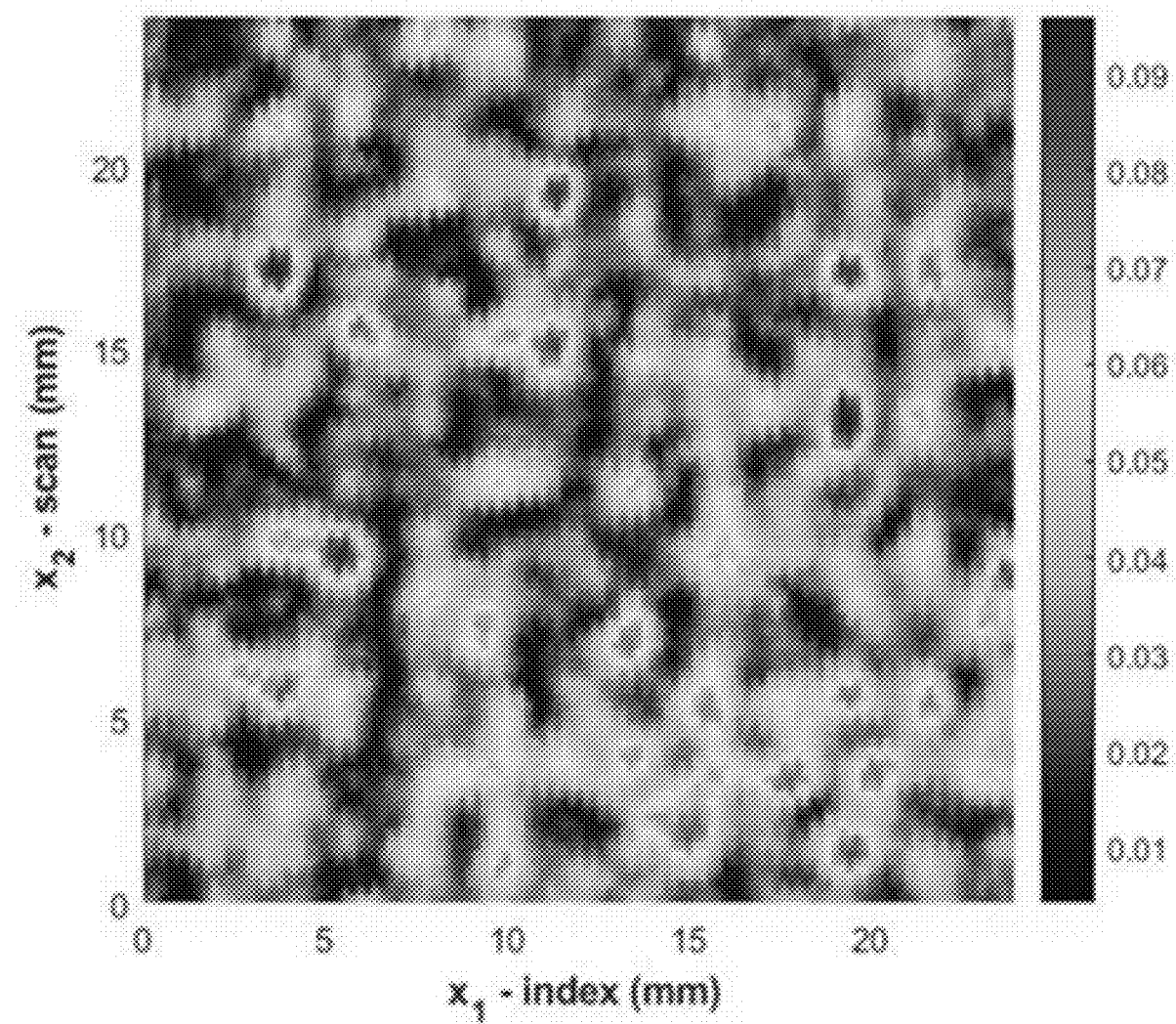
FIG. 37 illustrates an unfiltered C-scan of a test material with fibers aligned at 0 degrees according to one embodiment of the present invention.
Figure 38:
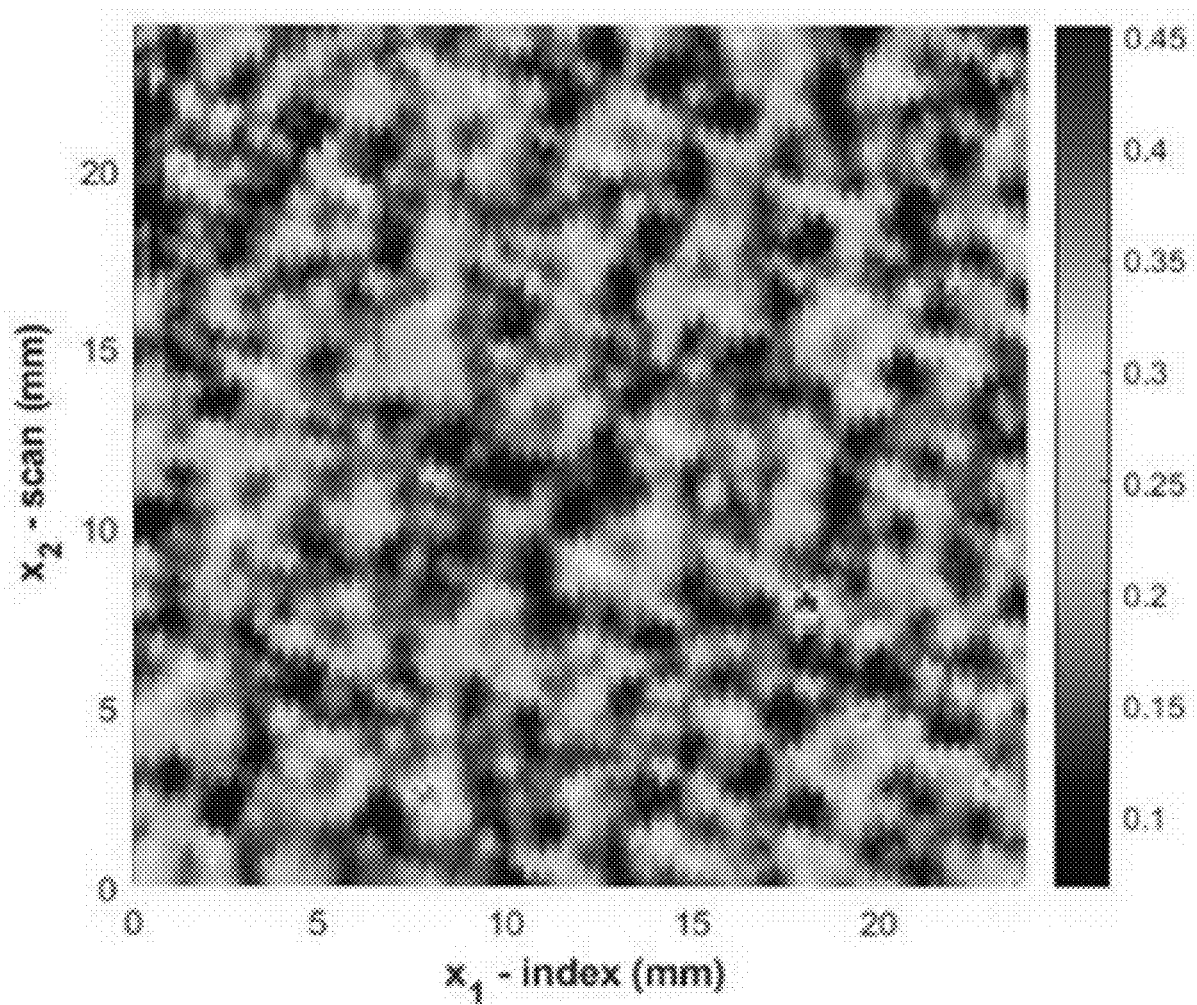
FIG. 38 illustrates an unfiltered C-scan of a test material with fibers aligned at 30 degrees according to one embodiment of the present invention.
Figure 39:
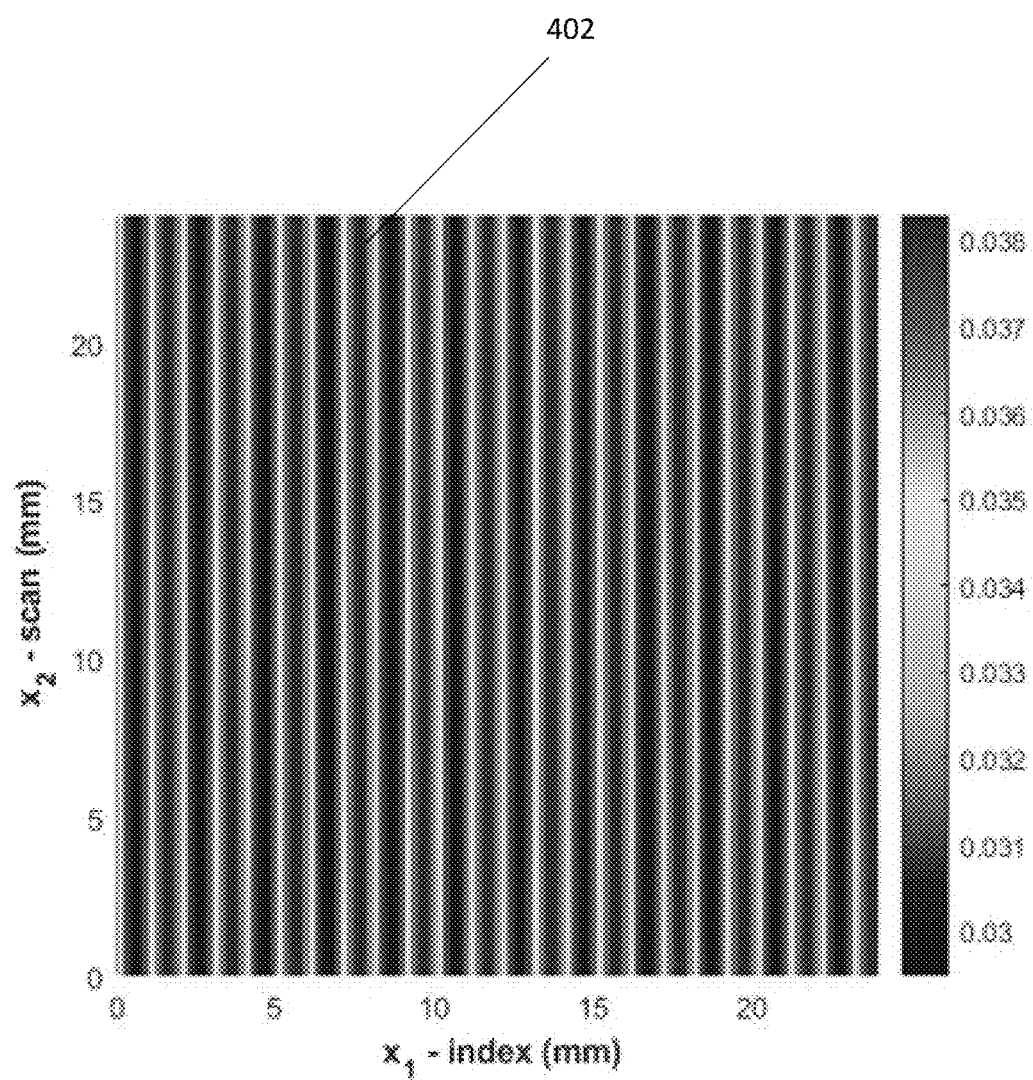
FIG. 39 illustrates a filtered C-scan of a test material with fibers aligned at 0 degrees according to one embodiment of the present invention.
Figure 40:
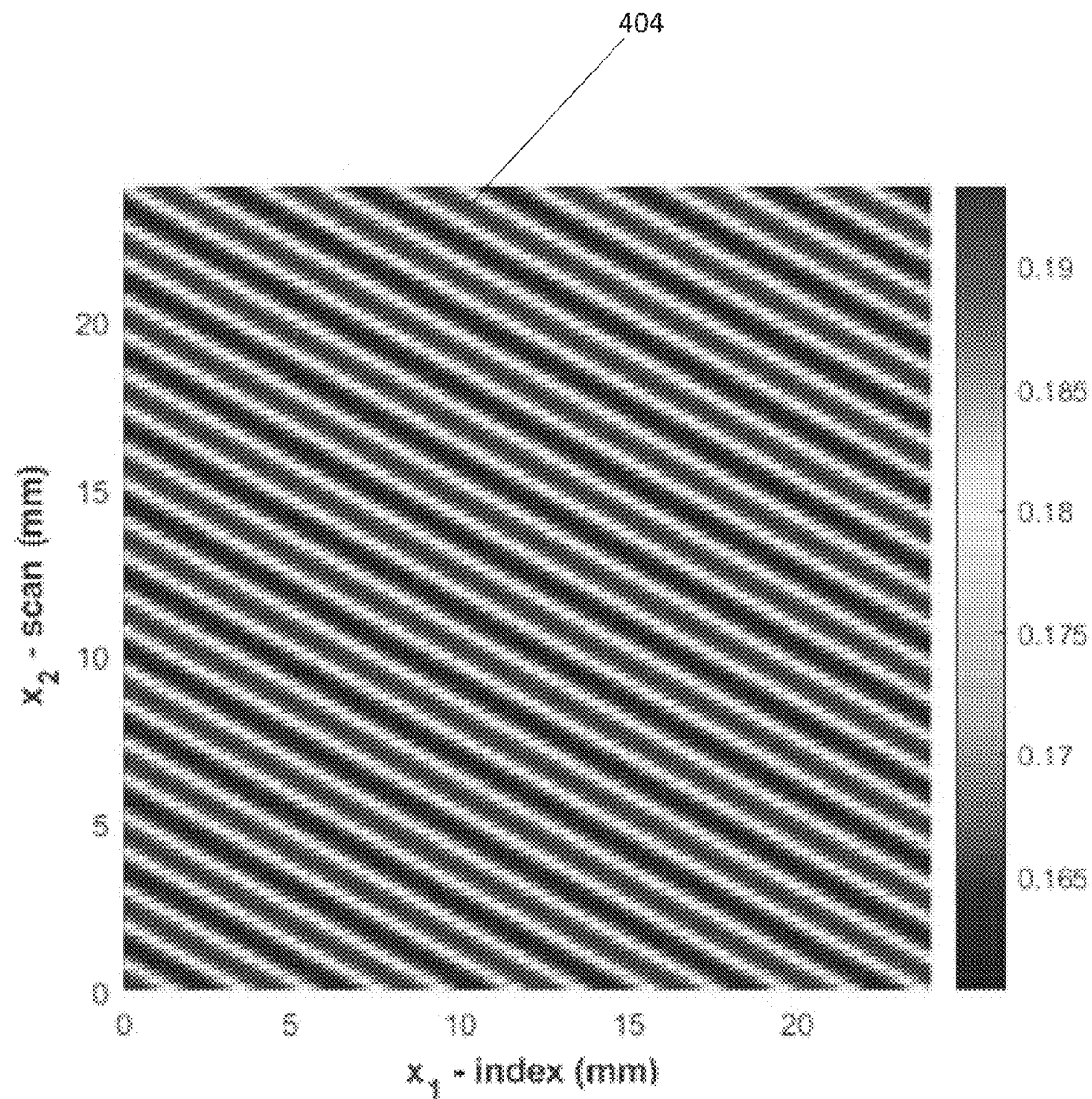
FIG. 40 illustrates a filtered C-scan of a test material with fibers aligned at 30 degrees according to one embodiment of the present invention.

In one embodiment, the system is able to determine the relative orientations of the fibers within each layer of the composite. A series of A-scans are generated for a region of a test material. For each of the series of A-scans, a plurality of gates are selected. The plurality of gates are chosen to be smaller than an individual lamina of the test material, often as small as 1/10 the thickness of a lamina of the test material. For each of the plurality of gates, a C-scan is generated from the amplitude data for each of the A-scans at a given gate. A user is able to view unfiltered C-scan data, such as the C-scans shown in FIGS. 37 and 38. In one embodiment, a two-dimensional (2-D) Fast Fourier Transform (FFT) is applied to the C-scan data to produce clearer C-scan representations, such as those shown in FIGS. 39 and 40. As illustrated in FIG. 35, fibers 402 with a zero degree orientation relative to a reference line are clearly identifiable. As illustrated in FIG. 40, fibers 404 with a non-zero degree orientation relative to a reference line are also clearly identifiable. In another embodiment, the system then uses a Radon transforms, Hough transforms, Eigensystem analysis, and/or other data transforms to determine the principal fiber directions utilizing the C-scans. Transformation of the C-scan data allows a user to individually determine the thickness of each ply in each layer of the material, in addition to determining the relative orientation the fibers in each generated C-scan. In one embodiment, values for the average ply thickness and orientations of the fiber in each generated C-scan is automatically generated.

In another embodiment, the system is also able to determine other properties regarding the layering of the composite, including the number of layers, thickness of each layer, weave type of the fibers of each layer, and/or the total thickness of the sample.

Figure 41:
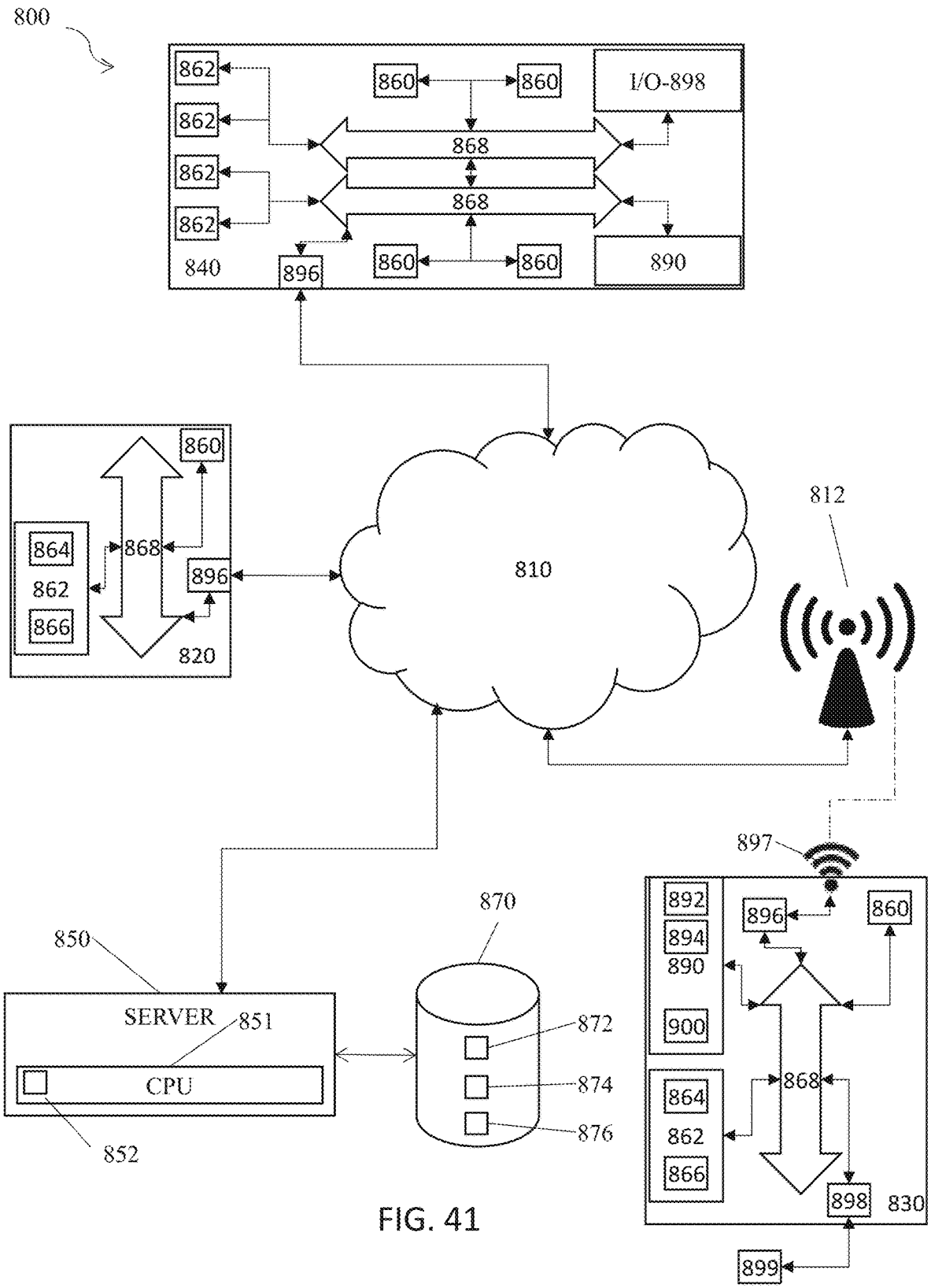
FIG. 41 is a schematic diagram of a system of the present invention.

FIG. 41 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 41, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 41, is operable to include other components that are not explicitly shown in FIG. 41, or is operable to utilize an architecture completely different than that shown in FIG. 41. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Other and further embodiments utilizing one or more aspects of the invention described above can be devised without departing from the spirit of Applicant's invention. For example, various seals and seal configurations can seal the components to form the chamber in the transducer housing assembly; various translation devices can be used to move the transducer housing assembly along a component surface in space; various quick disconnect configurations can be used to attach the lens housing; various ultrasonic signal generation and receive devices (combined or separate) can be used to send and/or receive signals from the transducer; and the like can be used to form the transducer housing assembly and the other system equipment, along with other variations can occur in keeping within the scope of the claims.

Composite materials include materials comprising two or more materials connected to form one single material. Composite materials include two or more separate materials joined by an adhesive bond layer in addition to two or more separate materials joined without adhesive. For example, composite materials include materials created by joining two or more isotropic material, materials created by joining two or more anisotropic materials, or materials created by joining an isotropic material to an anisotropic material. By way of example and not of limitation, composite materials include reinforced plastic materials, such as fiberglass, carbon fiber, or other fiber-reinforced polymers. Furthermore, by way of example and not of limitation, composite materials also include composite wood, reinforced concrete, and metal on metal composite materials. For example, composite materials includes materials comprising two or more layers of aluminum.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for non-destructive testing of composite materials, comprising:
   an ultrasonic transducer in communication with a processor and a display means;

wherein the ultrasonic transducer is operable to emit ultrasonic waves into and receive ultrasonic waves from a test object to produce scan data;

wherein the test object includes a multiplicity of layers;

wherein one or more of the multiplicity of layers includes at least one wrinkle having an average wavelength, an average amplitude, and an average aspect ratio;

wherein the processor calculates the average aspect ratio, the average amplitude, and/or the average wavelength of the at least one wrinkle;

wherein, if the at least one wrinkle exists within the test object, the processor determines an initial depth at which the amplitude of each of the at least one wrinkle exceeds a predetermined threshold amplitude and a final depth at which the amplitude of each of the at least one wrinkle falls below a predetermined amplitude;

wherein the processor generates a plurality of three-dimensional coordinates corresponding to a surface of the at least one wrinkle;

wherein the processor determines a local curvature at each depth and locates points where the local curvature exceeds a predetermined threshold to detect the presence of the at least one wrinkle; and wherein the processor automatically isolates the at least one wrinkle from surrounding material in a graphical representation.

2. The system of claim 1, wherein the average amplitude of at least one wrinkle is less than about 0.2 millimeters.

3. The system of claim 1, wherein the processor receives signals from the ultrasonic transducer corresponding to a full waveform of the ultrasonic waves received by the ultrasonic transducer.

4. The system of claim 1, wherein the processor calculates the average aspect ratio, the average amplitude, and/or the average wavelength of the at least one wrinkle without the use of a calibration block.

5. The system of claim 1, wherein the ultrasonic transducer operates at a frequency between about 5 MHz and about 15 MHz.

6. The system of claim 1, wherein the processor generates a plurality of B-scans for the test object, and wherein, based on the plurality of B-scans, the processor determines between which layers the at least one wrinkle is located.

7. The system of claim 6, wherein the processor generates at least one three-dimensional (3-D) graphical representation of one of the multiplicity of layers having at least one wrinkle based on the plurality of B-scans.

8. The system of claim 1, wherein the processor is in communication with an artificial intelligence module, wherein the processor generates a plurality of B-scans for the test object, and wherein the artificial intelligence module automatically highlights the at least one wrinkle on each of the plurality of B-scans.

9. A system for non-destructive testing of composite materials, comprising:

an ultrasonic transducer in communication with a processor and a display means;

wherein the ultrasonic transducer is operable to emit ultrasonic waves into and receive ultrasonic waves from a test object to produce scan data;

wherein the test object includes a multiplicity of layers;

wherein the processor generates a plurality of B-scans for the test object;

wherein, based on the plurality of B-scans, the processor determines whether at least one wrinkle exists between any two of the multiplicity of layers;

wherein the processor determines a local curvature at each depth and locates points where the local curvature exceeds a predetermined threshold to detect the presence of the at least one wrinkle; and wherein the processor automatically isolates the at least one wrinkle from surrounding material in a graphical representation.

10. The system of claim 9, wherein the processor calculates an aspect ratio, an average amplitude, and/or an average wavelength of the at least one wrinkle.

11. The system of claim 10, wherein the processor calculates the aspect ratio, the average amplitude, and/or the average wavelength of the at least one wrinkle without the use of a calibration block.

12. The system of claim 9, wherein the at least one wrinkle has an aspect ratio less than about 0.1.

13. The system of claim 9, wherein the at least one wrinkle has an average amplitude of less than about 0.2 millimeters.

14. The system of claim 9, wherein the ultrasonic transducer operates at a frequency between about 5 MHz and about 15 MHz.

15. The system of claim 9, wherein the ultrasonic transducer is disposed within a coupling fluid-filled chamber of a portable transducer housing assembly.

16. The system of claim 9, wherein the processor generates at least one three-dimensional (3-D) graphical representation of one of the multiplicity of layers having the at least one wrinkle based on the plurality of B-scans.

* * * * *